US012333739B2

(12) United States Patent
Toni et al.

(10) Patent No.: US 12,333,739 B2
(45) Date of Patent: Jun. 17, 2025

(54) MACHINE LEARNING-BASED RE-IDENTIFICATION OF SHOPPERS IN A CASHIER-LESS STORE FOR AUTONOMOUS CHECKOUT

(71) Applicant: STANDARD COGNITION, CORP., San Francisco, CA (US)

(72) Inventors: Michele Toni, Castelnuovo di Garfagnana (IT); Atul Dhingra, Sunnyvale, CA (US); Jordan Fisher, San Francisco, CA (US)

(73) Assignee: STANDARD COGNITION, CORP., San Francisco, CA (US)

( * ) Notice: Subject to any disclaimer, the term of this patent is extended or adjusted under 35 U.S.C. 154(b) by 454 days.

(21) Appl. No.: 17/988,650

(22) Filed: Nov. 16, 2022

(65) Prior Publication Data
US 2023/0088414 A1 Mar. 23, 2023

Related U.S. Application Data

(63) Continuation-in-part of application No. 17/572,590, filed on Jan. 10, 2022, now Pat. No. 11,948,313, (Continued)

(51) Int. Cl.
*G06T 7/246* (2017.01)
*G06N 20/00* (2019.01)

(52) U.S. Cl.
CPC ............ *G06T 7/248* (2017.01); *G06N 20/00* (2019.01); *G06T 2207/20081* (2013.01)

(58) Field of Classification Search
CPC .......... G06T 7/248; G06T 2207/20081; G06N 20/00; G06N 3/0464; G06N 3/09; G06V 20/53; G06V 10/82
(Continued)

(56) References Cited

U.S. PATENT DOCUMENTS 6,154,559 A 11/2000 Beardsley
6,561,417 B1 5/2003 Gadd
(Continued)

FOREIGN PATENT DOCUMENTS

CN 104778690 B 6/2017
EP 1574986 B1 7/2008
(Continued)

OTHER PUBLICATIONS

EP 20791434.2—Communication pursuant to Rules 161(2) and 162 EPC dated Nov. 25, 2021, 3 pages.
(Continued)

*Primary Examiner* — Sheela C Chawan
(74) *Attorney, Agent, or Firm* — Haynes Beffel & Wolfeld LLP; Andrew L. Dunlap

(57) ABSTRACT

Systems and methods for tracking and re-identifying tracked subjects in an area of real space are disclosed. The method includes generating first and second reidentification feature vectors of a first subject identified from a first time interval from the respective first and second sequences of images as obtained from the first time interval. The method includes generating third and fourth reidentification feature vectors of a second subject identified from a second time interval from the respective first and second sequences of images. The method includes matching a second subject identified from a second time interval with the first subject identified from the first time interval when at least one of a first similarity score between the first and the third reidentification feature vectors and a second similarity score between the second and the fourth reidentification feature vectors is above a pre-defined threshold.

20 Claims, 28 Drawing Sheets

Related U.S. Application Data which is a continuation of application No. 16/388,765, filed on Apr. 18, 2019, now Pat. No. 11,232,575.

(58) Field of Classification Search
USPC .................................................. 382/100, 103
See application file for complete search history.

(56) References Cited

U.S. PATENT DOCUMENTS

| | | | |
|---|---|---|---|
| 7,050,624 B2 | 5/2006 | Dialameh et al. |
| 7,050,652 B2 | 5/2006 | Stanek |
| 7,742,623 B1 | 6/2010 | Moon et al. |
| 8,009,863 B1 | 8/2011 | Sharma et al. |
| 8,219,438 B1 | 7/2012 | Moon et al. |
| 8,261,256 B1 | 9/2012 | Adler et al. |
| 8,279,325 B2 | 10/2012 | Pitts et al. |
| 8,577,705 B1 | 11/2013 | Baboo et al. |
| 8,624,725 B1 | 1/2014 | MacGregor |
| 8,749,630 B1 | 6/2014 | Alahi et al. |
| 9,036,028 B2 | 5/2015 | Buehler |
| 9,058,523 B2 | 6/2015 | Merkel et al. |
| 9,262,681 B1 | 2/2016 | Mishra |
| 9,269,012 B2 | 2/2016 | Fotland |
| 9,269,093 B2 | 2/2016 | Lee et al. |
| 9,294,873 B1 | 3/2016 | MacGregor |
| 9,449,233 B2 | 9/2016 | Taylor |
| 9,489,623 B1 | 11/2016 | Sinyavskiy et al. |
| 9,494,532 B2 | 11/2016 | Xie et al. |
| 9,536,177 B2 | 1/2017 | Chalasani et al. |
| 9,582,891 B2 | 2/2017 | Geiger et al. |
| 9,595,127 B2 | 3/2017 | Champion et al. |
| 9,652,751 B2 | 5/2017 | Aaron et al. |
| 9,846,810 B2 | 12/2017 | Partis |
| 9,881,221 B2 | 1/2018 | Bala et al. |
| 9,886,827 B2 | 2/2018 | Schoner |
| 9,911,290 B1 | 3/2018 | Zalewski et al. |
| 10,055,853 B1 | 8/2018 | Fisher et al. |
| 10,083,453 B2 | 9/2018 | Campbell |
| 10,127,438 B1 | 11/2018 | Fisher et al. |
| 10,133,933 B1 | 11/2018 | Fisher et al. |
| 10,165,194 B1 | 12/2018 | Baldwin |
| 10,169,677 B1 | 1/2019 | Ren et al. |
| 10,175,340 B1 | 1/2019 | Abari et al. |
| 10,176,452 B2 | 1/2019 | Rizzolo et al. |
| 10,192,408 B2 | 1/2019 | Schoner |
| 10,202,135 B2 | 2/2019 | Mian et al. |
| 10,210,603 B2 | 2/2019 | Venable et al. |
| 10,210,737 B2 | 2/2019 | Zhao |
| 10,217,120 B1 | 2/2019 | Shin et al. |
| 10,242,393 B1 | 3/2019 | Kumar et al. |
| 10,262,331 B1 | 4/2019 | Sharma et al. |
| 10,282,720 B1 | 5/2019 | Buibas et al. |
| 10,282,852 B1 | 5/2019 | Buibas et al. |
| 10,332,089 B1 | 6/2019 | Asmi et al. |
| 10,354,262 B1 | 7/2019 | Hershey et al. |
| 10,373,322 B1 | 8/2019 | Buibas et al. |
| 10,387,896 B1 | 8/2019 | Hershey et al. |
| 10,438,277 B1 | 10/2019 | Jiang et al. |
| 10,445,694 B2 | 10/2019 | Fisher et al. |
| 10,474,877 B2 | 11/2019 | Huang et al. |
| 10,474,988 B2 | 11/2019 | Fisher et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,529,137 B1 | 1/2020 | Black et al. |
| 10,535,146 B1 | 1/2020 | Buibas et al. |
| 10,650,545 B2 | 5/2020 | Fisher et al. |
| 10,776,926 B2 | 9/2020 | Shrivastava |
| 10,810,539 B1 | 10/2020 | Mohanty et al. |
| 10,853,965 B2 | 12/2020 | Fisher et al. |
| 10,929,829 B1 | 2/2021 | Hazelwood et al. |
| 11,132,810 B2 | 9/2021 | Kume et al. |
| 11,232,575 B2 | 1/2022 | Fisher |
| 11,232,687 B2 * | 1/2022 | Fisher ..................... G06T 13/80 |
| 11,354,683 B1 | 6/2022 | Shin et al. |
| 2003/0078849 A1 | 4/2003 | Snyder |
| 2003/0107649 A1 | 6/2003 | Flickner et al. |
| 2004/0099736 A1 | 5/2004 | Neumark |
| 2004/0131254 A1 | 7/2004 | Liang et al. |
| 2005/0177446 A1 | 8/2005 | Hoblit |
| 2005/0201612 A1 | 9/2005 | Park et al. |
| 2006/0132491 A1 | 6/2006 | Riach et al. |
| 2006/0268111 A1 * | 11/2006 | Zhang ................... G01S 3/7864 348/169 |
| 2006/0279630 A1 | 12/2006 | Aggarwal et al. |
| 2007/0021863 A1 | 1/2007 | Mountz et al. |
| 2007/0021864 A1 | 1/2007 | Mountz et al. |
| 2007/0182718 A1 | 8/2007 | Schoener et al. |
| 2007/0188318 A1 | 8/2007 | Cole et al. |
| 2007/0282665 A1 | 12/2007 | Buehler et al. |
| 2008/0001918 A1 | 1/2008 | Hsu et al. |
| 2008/0101652 A1 | 5/2008 | Zhao et al. |
| 2008/0159634 A1 | 7/2008 | Sharma et al. |
| 2008/0170776 A1 | 7/2008 | Albertson et al. |
| 2008/0181453 A1 * | 7/2008 | Xu ......................... G06T 7/194 382/103 |
| 2008/0181507 A1 | 7/2008 | Gope et al. |
| 2008/0211915 A1 | 9/2008 | McCubbrey |
| 2008/0243614 A1 | 10/2008 | Tu et al. |
| 2008/0246613 A1 | 10/2008 | Linstrom et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2009/0307226 A1 | 12/2009 | Koster et al. |
| 2010/0021009 A1 | 1/2010 | Yao |
| 2010/0103104 A1 | 4/2010 | Son et al. |
| 2010/0208941 A1 | 8/2010 | Broaddus et al. |
| 2010/0283860 A1 | 11/2010 | Nader |
| 2011/0141011 A1 | 6/2011 | Lashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0320322 A1 | 12/2011 | Roslak et al. |
| 2012/0119879 A1 | 5/2012 | Estes et al. |
| 2012/0159290 A1 | 6/2012 | Pulsipher et al. |
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2012/0324001 A1 | 12/2012 | Leacock et al. |
| 2013/0011007 A1 | 1/2013 | Muriello et al. |
| 2013/0011049 A1 | 1/2013 | Kimura |
| 2013/0076898 A1 | 3/2013 | Philippe et al. |
| 2013/0156260 A1 | 6/2013 | Craig |
| 2013/0182114 A1 | 7/2013 | Zhang et al. |
| 2013/0201339 A1 | 8/2013 | Venkatesh |
| 2013/0266181 A1 | 10/2013 | Brewer et al. |
| 2014/0168477 A1 | 6/2014 | David |
| 2014/0188648 A1 | 7/2014 | Argue et al. |
| 2014/0207615 A1 | 7/2014 | Li et al. |
| 2014/0214608 A1 | 7/2014 | Pedley et al. |
| 2014/0222501 A1 | 8/2014 | Hirakawa et al. |
| 2014/0282162 A1 | 9/2014 | Fein et al. |
| 2014/0285660 A1 | 9/2014 | Jamtgaard et al. |
| 2014/0304123 A1 | 10/2014 | Schwartz |
| 2014/0347479 A1 | 11/2014 | Givon |
| 2014/0363059 A1 | 12/2014 | Hurewitz |
| 2015/0002675 A1 | 1/2015 | Kundu et al. |
| 2015/0009323 A1 | 1/2015 | Lei |
| 2015/0012396 A1 | 1/2015 | Puerini et al. |
| 2015/0019391 A1 | 1/2015 | Kumar et al. |
| 2015/0023562 A1 | 1/2015 | Moshfeghi |
| 2015/0026010 A1 | 1/2015 | Ellison |
| 2015/0026646 A1 | 1/2015 | Ahn et al. |
| 2015/0039458 A1 | 2/2015 | Reid |
| 2015/0049914 A1 | 2/2015 | Alves |
| 2015/0124107 A1 | 5/2015 | Muriello et al. |
| 2015/0127485 A1 | 5/2015 | Kakizawa et al. |
| 2015/0170354 A1 | 6/2015 | Mukai |
| 2015/0193761 A1 | 7/2015 | Svetal |

(56) References Cited

U.S. PATENT DOCUMENTS

| | | |
|---|---|---|
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0363868 A1 | 12/2015 | Kleinhandler et al. |
| 2015/0379366 A1 | 12/2015 | Nomura et al. |
| 2016/0055499 A1 | 2/2016 | Hawkins et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0155011 A1 | 6/2016 | Sulc et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0024806 A1 | 1/2017 | High et al. |
| 2017/0032193 A1 | 2/2017 | Yang |
| 2017/0068861 A1 | 3/2017 | Miller et al. |
| 2017/0116473 A1 | 4/2017 | Sashida et al. |
| 2017/0124096 A1 | 5/2017 | Hsi et al. |
| 2017/0148005 A1 | 5/2017 | Murn |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0169440 A1 | 6/2017 | Dey et al. |
| 2017/0178226 A1 | 6/2017 | Graham et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0276480 A1 | 9/2018 | Peterson et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365481 A1 | 12/2018 | Tolbert et al. |
| 2018/0365755 A1 | 12/2018 | Bekbolatov et al. |
| 2018/0373928 A1 | 12/2018 | Glaser et al. |
| 2018/0374233 A1* | 12/2018 | Zhou ................ G06F 18/22 |
| 2019/0005479 A1 | 1/2019 | Glaser et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0188876 A1 | 6/2019 | Song et al. |
| 2019/0244386 A1 | 8/2019 | Fisher et al. |
| 2019/0244500 A1* | 8/2019 | Fisher ............ G08B 13/19682 |
| 2019/0251340 A1 | 8/2019 | Brown et al. |
| 2019/0331273 A1 | 10/2019 | Vos et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0134588 A1 | 4/2020 | Nelms et al. |
| 2020/0151692 A1 | 5/2020 | Gao et al. |
| 2020/0193507 A1 | 6/2020 | Glaser et al. |
| 2020/0234463 A1 | 7/2020 | Fisher et al. |
| 2020/0258241 A1 | 8/2020 | Liu et al. |
| 2020/0293992 A1 | 9/2020 | Bogolea et al. |
| 2020/0334834 A1 | 10/2020 | Fisher |
| 2020/0334835 A1 | 10/2020 | Buibas et al. |
| 2020/0410713 A1 | 12/2020 | Auer et al. |
| 2021/0067744 A1 | 3/2021 | Buibas et al. |
| 2021/0158430 A1 | 5/2021 | Buibas et al. |
| 2021/0201253 A1 | 7/2021 | Fisher et al. |
| 2021/0295081 A1 | 9/2021 | Berry et al. |
| 2022/0130220 A1 | 4/2022 | Fisher et al. |

FOREIGN PATENT DOCUMENTS

| | | |
|---|---|---|
| EP | 2555162 A1 | 2/2013 |
| EP | 3002710 A1 | 4/2016 |
| GB | 2560387 A | 9/2018 |
| GB | 2566762 A | 3/2019 |
| JP | 2011253344 A | 12/2011 |
| JP | 2013196199 A | 9/2013 |
| JP | 2014089626 A | 5/2014 |
| JP | 2016206782 A | 12/2016 |
| JP | 2017157216 A | 9/2017 |
| JP | 2018099317 A | 6/2018 |
| KR | 1020180032400 A | 3/2018 |
| KR | 102223570 B1 | 3/2021 |
| TW | 201911119 A | 3/2019 |
| WO | 0021021 A1 | 4/2000 |
| WO | 0243352 A2 | 5/2002 |
| WO | 02059836 A3 | 5/2003 |
| WO | 2008029159 A1 | 3/2008 |
| WO | 2013041444 A1 | 3/2013 |
| WO | 2013103912 A1 | 7/2013 |
| WO | 2014133779 A1 | 9/2014 |
| WO | 2015133699 A1 | 9/2015 |
| WO | 2016136144 A1 | 9/2016 |
| WO | 2016166508 A1 | 10/2016 |
| WO | 2017015390 A1 | 1/2017 |
| WO | 2017151241 A2 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018162929 A1 | 9/2018 |
| WO | 2018209156 A1 | 11/2018 |
| WO | 2018237210 A1 | 12/2018 |
| WO | 2019032304 A1 | 2/2019 |
| WO | 2019032305 A2 | 2/2019 |
| WO | 2019032306 A1 | 2/2019 |

(56) References Cited

FOREIGN PATENT DOCUMENTS

| | | |
|---|---|---|
| WO | 2019032307 A1 | 2/2019 |
| WO | 2020023795 | 1/2020 |
| WO | 2020023796 | 1/2020 |
| WO | 2020023798 | 1/2020 |
| WO | 2020023799 | 1/2020 |
| WO | 2020023801 | 1/2020 |
| WO | 2020023926 | 1/2020 |
| WO | 2020023930 | 1/2020 |
| WO | 2020047555 A1 | 3/2020 |
| WO | 2020214775 A1 | 10/2020 |
| WO | 2020225562 A1 | 11/2020 |

OTHER PUBLICATIONS

EP 20791434.2—Response to Communication pursuant to Rules 161(2) and 162 EPC dated Nov. 25, 2021, filed May 18, 2022, 18 pages.

PCT/US2019/043775—International Preliminary Report on Patentability dated Feb. 4, 2021, 7 pages.

PCT/US2019/043775—International Search Report and Written Opinion dated Nov. 13, 2019, 10 pages.

PCT/US2020/028454—International Search Report and Written Opinion dated Jul. 27, 2020, 12 pages.

PCT/US2020/028454—International Preliminary Report on Patentability dated Oct. 28, 2021, 9 pages.

Longuet-Higgens, "A computer algorithm for reconstructing a scene from two projections," Nature 293, Sep. 10, 1981, pp. 133-135.

He et al. "Deep Residual Learning for Image Recognition," (published at https://arxiv.org/abs/1512.03385), Dec. 10, 2015, 12 pages.

Simonyan et al. "Very Deep Convolutional Networks for Large-Scale Image Recognition" (published at https://arxiv.org/abs/1409.1556), Apr. 10, 2015, 14 pages.

Zheng et al., "Joint Discriminative and Generative Learning for Person Re-Identification," Proceedings of the IEEE/CVF Conference on Computer Vision and Pattern Recognition (CVPR), Jun. 16-20, 2019, pp. 2138-2147.

Black et al., "Multi View Image Surveillance and Tracking," IEEE Proceedings of the Workshop on Motion and Video Computing, 2002, pp. 1-6.

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, Issn: 1047-3203, DOI: 10.1016/J.JVCIR.2013.03.009.

Ceballos, Scikit-Learn Decision Trees Explained, https://towardsdatascience.com/scikit-learn-decision-trees-explained-803f-3812290d, Feb. 22, 2019, 13 pages.

DeTone et al, SuperPoint: Self-Supervised Interest Point Detection and Description, Apr. 19, 2018, arXiv:1712.07629v4 [cs.CV] Apr. 19, 2018, 13 pages.

Erdem et al. "Automated camera layout to satisfy task-specific and floor plan-specific coverage requirements," Computer Vision and Image Undertanding 103, Aug. 1, 2006, 156-169.

Gkioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Identity mappings in deep residual networks" (published at https://arxiv.org/pdf/1603.05027.pdf), Jul. 25, 2016, 15 pages.

Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.

Jayabalan, et al., "Dynamic Action Recognition: A convolutional neural network model for temporally organized joint location data," Cornell University, Computer Science, Dec. 20, 2016, 11 pages.

Redmon et al., "You Only Look Once: Unified, Real-Time Object Detection," University of Washington, Allen Institute for Aly, Facebook AI Research, May 9, 2016, 10 pages.

Redmon et al., YOLO9000: Better, Faster, Stronger, (available at https://arxiv.org/pdf/1612.08242.pdf), Dec. 25, 2016, 9 pages.

Rossi et al., "Tracking and Counting Moving People," IEEE Int'l Conf. on Image Processing, ICIP-94, Nov. 13-16, 1994. 5 pages.

Symons, "Data Fusion Methods for Netted Sensors with Limited Communication Bandwidth", QinetiQ Ltd and University College London, 2004.

Toshev et al. "DeepPose: Human Pose Estimation via Deep Neural Networks," IEEE Conf. on Computer Vision and Pattern Recognition, Aug. 2014, 8 pages.

Vincze, "Robust tracking of ellipses at frame rate," Pattern Recognition, vol. 34, Issue 2, Feb. 2001, pp. 487-498.

Yusoff et al. "Optimal Camera Placement for 3D Environment," ICSECS 2011: Software Engineering and Computer Systems, Jun. 27-29, 2011, 448-459.

Zhang "A Flexible New Technique for Camera Calibration," IEEE Transactions on Pattern Analysis and Machine Intelligence, vol. 22, No. 11, Nov. 2000, 22pages.

EP 20791434.2—Extended European Search Report dated Apr. 17, 2023, 12 pages.

Jan Prokaj et al.: "Inferring tracklets for multi-object tracking," Computer Vision and Pattern Recognition Workshops OCVPRW), 2011 IEEE Computer Society Conference on IEEE, Jun. 20, 2011, pp. 37-44.

Raul Mohedano et al.: "Robust 3D people tracking and positioning system in a semi-overlapped multi-camera environment," 15th IEEE International Conference on Image Processing: ICIP 2008; San Diego, CA, USA, Oct. 12-15, 2008, pp. 2656-2659.

US Office Action in U.S. Appl. No. 17/572,500 dated Aug. 25, 2023, 13 pages.

* cited by examiner

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 310

FIG. 3A

```
Subject = {  Key   = frame_number
             Value = { Key   = camera_id
                       Value = Assigned joints to subject
                       [
                         [x of joint1, y of joint1, z of joint1],
                         [x of joint2, y of joint2, z of joint2],
                         ......
                         [x of joint18, y of joint18, z of joint18],
                       ]
                     }
          }
```

Subject Data Structure 320

FIG. 3B

MACHINE LEARNING-BASED RE-IDENTIFICATION OF SHOPPERS IN A CASHIER-LESS STORE FOR AUTONOMOUS CHECKOUT

PRIORITY APPLICATIONS

This application is a continuation-in-part of the U.S. patent application Ser. No. 17/572,590, filed on 10 Jan. 2022, which is a continuation of U.S. patent application Ser. No. 16/388,765, filed on 18 Apr. 2019, both applications are incorporated by reference herein in their entirety.

BACKGROUND

Field

The technology disclosed relates to systems and methods that track subjects in an area of real space more specifically, the technology disclosed provides systems and method to re-identify incorrectly tracked subjects.

Description of Related Art

A difficult problem in image processing arises when images of subjects from cameras are used to identify and track subjects in an area of real space such as a shopping store. The system needs to keep track of subjects in the area of real space for the duration of subject's presence. The subjects can leave the area of real space without communicating with the system. The system may also lose track of a subject due to other reasons. For example, when a subject is temporarily obscured, or moves to a location in the area of real space that is not in the field of view of cameras or sensors used to track the subjects or due to errors in the system. As multiple subjects are present in the area of real space, one or more subjects can be occluded by other subjects or by structures present in the environment. Crowded areas with high frequency of entries and exits in the area of real space make it more challenging to correctly track every subject throughout their presence in the area of real space or in two different areas of real space (e.g., one area of real space inside a store and another area of real space outside the store, such as an outdoor shopping area or a fuel pump).

The identifiers assigned to subjects may be swapped at any time during their presence in the area of real space. As new subjects are located in the area of real space, the system needs to determine whether a new subject is a tracked subject who went missing for a period of time or a new subject who has recently entered the area of real space.

It is desirable to provide a system that cannot only track subjects in the area(s) of real space but automatically detect and correct errors in tracking of subjects.

SUMMARY

A system, and method for operating a system, are provided for re-identifying previously identified subjects in an area of real space. The method includes receiving respective first and second sequences of images of corresponding fields of view in the area of real space from at least two cameras with overlapping fields of view. The method includes generating first and second reidentification feature vectors of a first subject identified from a first time interval by performing the following operations. The generation of the first and second reidentification feature vectors of the first subject include providing first and second images of the first subject from the respective first and second sequences of images to a trained machine learning model to produce respective first and second reidentification feature vectors. The first and second images are obtained from the first time interval. The method includes matching a second subject identified from a second time interval with the first subject identified from the first time interval by performing the following operations. The method includes providing third and fourth images of the second subject, from the respective first and second sequences of images to the trained machine learning model to produce respective third and fourth reidentification feature vectors. The third and fourth images of the second subject are obtained from the second time interval. The method includes calculating (i) a first similarity score between the first and the third reidentification feature vectors and (ii) a second similarity score between the second and the fourth reidentification feature vectors. The method includes re-identifying the second subject identified from the second time interval as the first subject identified from the first time interval when at least one of the first similarity score and the second similarity score is above a pre-defined threshold.

In one implementation, the re-identifying of the second subject identified from the second time interval, further includes calculating an average of the first similarity score and the second similarity score. The method includes re-identifying the second subject identified from the second time interval as the first subject identified from the first time interval when the average similarity score is above the pre-defined threshold.

In one implementation, the generation of the first, the second, the third, and the fourth reidentification feature vectors, further includes placing first, second, third, and fourth bounding boxes respectively around at least a portion of first, second, third, and fourth poses of the identified subjects, as identified from the first, the second, the third, and the fourth images of the respective sequences of images. The method includes providing first, second, third, and fourth cropped out images as the first, the second, the third, and the fourth images to the trained machine learning model.

The first pose, as identified from the first image, is identified from the first sequence of images from a first camera. The second pose, as identified from the second image, is identified from the second sequence of images from a second camera. The third pose, as identified from the third image, is identified from the first sequence of images from the first camera. The fourth pose, as identified from the fourth image, is identified from the second sequence of images from the second camera.

The first pose of the first subject from the first time interval is one of the at least a front pose, a side pose, and a back pose of the first subject from the first time interval. It is understood that the technology disclosed can capture other poses of the subjects in the area of real space.

In one implementation, the method further includes comparing a count of a number of identified subjects in the second time interval with a number of identified subjects in the first time interval. When the count of the number of identified subjects in the second time interval is less than the count of the number of identified subjects in the first time interval, the method includes performing a matching of the subjects identified in the second time interval with subjects identified in a time interval preceding the first time interval.

The first similarity score and the second similarity score are cosine similarity measures respectively between (i) the first and the third reidentification feature vectors and (ii) the second and the fourth reidentification feature vectors. It is understood that other types of similarity scores or distances, e.g., Hamming distance, Jaccard distance, L1 norm, Mahalanobis distance etc., can be used to determine the similarity between reidentification feature vectors.

In one implementation, the method further includes identifying an error in tracking of the first subject identified from the first time interval, when the first similarity score and the second similarity score are below the pre-defined threshold.

The subject tracking error can be a single-swap error when the first subject from the first time interval is incorrectly matched to a third subject from the second time interval.

The subject tracking error can be an enter-exit-swap error indicating that the second subject from the second time interval does not match the first subject from the first time interval. The second subject is a new subject who entered the area of real space in the second time interval and was not in the area of real space in the first time interval and the first subject is not present in the second time interval.

Each of the respective first and second reidentification feature vectors represents learned visual features of the first subject and each of the respective third and fourth reidentification vectors represents learned visual features of the second subject.

The first, the second, the third and the fourth reidentification feature vectors further comprise first, second, third and fourth visual identifiers concatenated with respective first, second, third and fourth learned visual features. The visual identifiers represent at least a color of hair of the first subject and the second subject and a color of clothing of the first subject and the second subject captured from the first, the second, the third and the fourth images of the respective sequences of images.

In one implementation, the method further includes generating fifth and sixth reidentification feature vectors of a third subject identified from the first time interval by performing the following operations. The method includes providing fifth and sixth images of the third subject from the respective first and second sequences of images to the trained machine learning model to produce respective fifth and sixth reidentification feature vectors. The fifth and sixth images are obtained from the first time interval. The method includes matching the second subject identified from the second time interval with the first subject and the third subject identified from the first time interval by performing the following operations. The method includes calculating (i) a third similarity score between the between the fifth and the third reidentification feature vectors and (ii) a fourth similarity score between the sixth and the fourth reidentification feature vectors. The method includes re-identifying the second subject identified from the second time interval as the first subject identified from the first time interval when at least one of the first similarity score and the second similarity score is above a pre-defined threshold. The third and fourth similarity scores are below the threshold therefore, the second subject from the second time interval is not matched to the third subject from the first time interval.

Systems and computer program products which can be executed by computer systems implementing the methods presented above are also described herein.

Functions described herein, including but not limited to re-identifying and tracking a subject at a particular identification interval (or time interval) in an area of real space and to matching the subject to a tracked subject at different identification intervals (or time intervals) and data structure configured for use to match the subject to the tracked subject present complex problems of computer engineering, relating for example to the type of image data to be processed, what processing of the image data to perform, and how to determine actions from the image data with high reliability.

Other aspects and advantages of the technology disclosed can be seen on review of the drawings, the detailed description and the claims, which follow.

BRIEF DESCRIPTION OF THE DRAWINGS

FIG. 3A shows an example data structure for storing joints information of subjects.

FIG. 3B is an example data structure for storing a subject including the information of associated joints.

DETAILED DESCRIPTION

The following description is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

System Overview

A system and various implementations of the subject technology are described with reference to FIGS. 1-20. The system and processes are described with reference to FIG. 1, an architectural level schematic of a system in accordance with an implementation. Because FIG. 1 is an architectural diagram, certain details are omitted to improve the clarity of the description.

Figure 1:
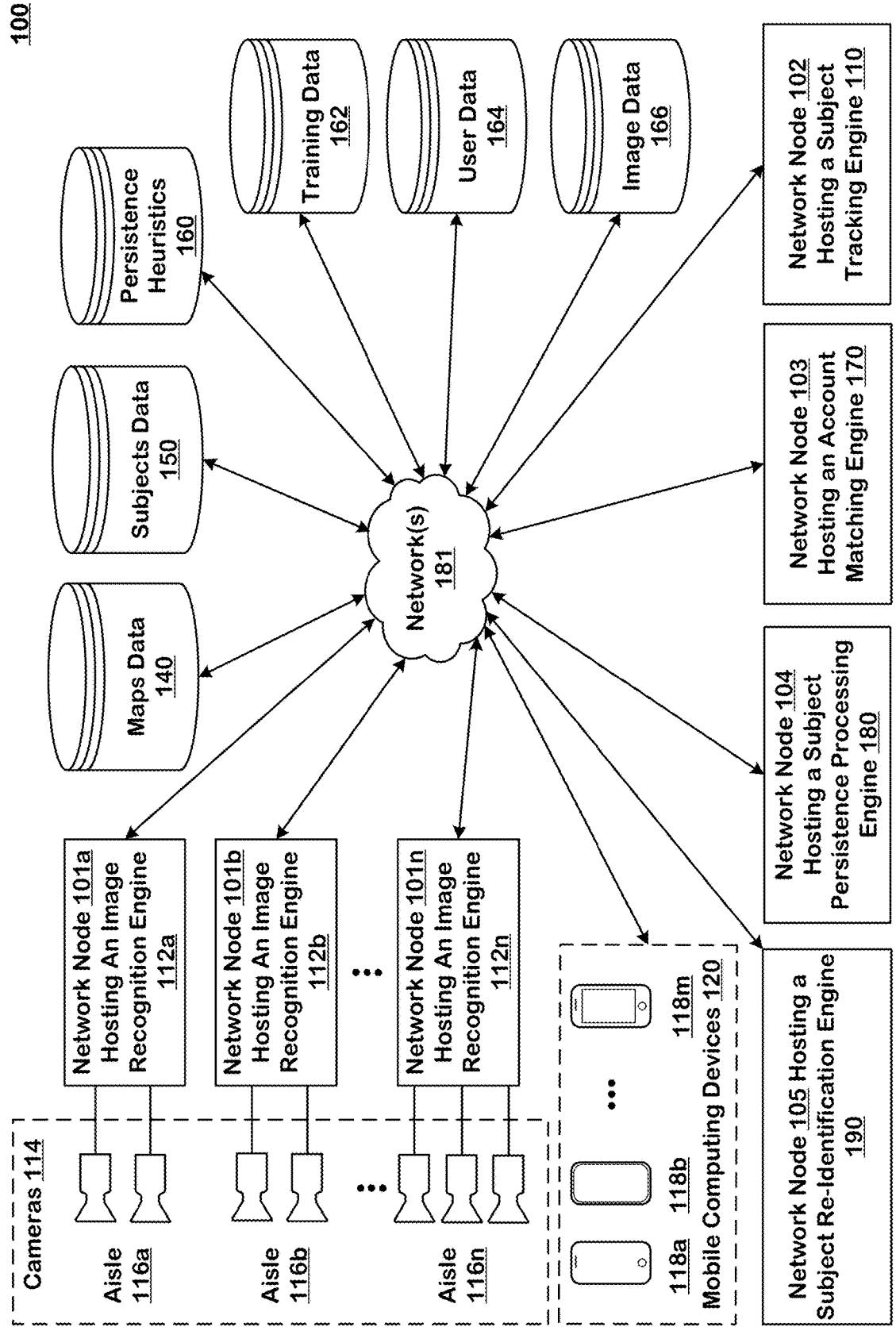
FIG. 1 illustrates an architectural level schematic of a system in which a subject re-identification engine detects and corrects errors in tracking of subjects in an area of real space.

The description of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes 101a, 101b, and 101n hosting image recognition engines 112a, 112b, and 112n, a network node 102 hosting a subject tracking engine 110, a network node 103 hosting an account matching engine 170, a network node 104 hosting a subject persistence processing engine 180 and a network node 105 hosting a subject re-identification engine 190. The network nodes 101a, 101b, 101n, 102, 103, 104 and/or 105 can include or have access to memory supporting tracking of subjects, subject re-identification, subject persistence, and matching anonymously tracked subjects to their user accounts. The system 100 includes mobile computing devices 118a, 118b, 118m (collectively referred as mobile computing devices 120). The system 100 further includes, in this example, a maps database 140, a subjects database 150, a persistence heuristics database 160, a training database 162, a user account database 164, an image database 166, and a communication network or networks 181. Each of the maps database 140, the subjects database 150, the persistence heuristics database 160, the training database 162, the user account database 164 and the image database 166 can be stored in the memory that is accessible to the network nodes 101a, 101b, 101n, 102, 103, 104 and/or 105. The network nodes 101a, 101b, 101n, 102, 103, 104 and/or 105 can host only one image recognition engine, or several image recognition engines.

The implementation described here uses cameras 114 in the visible range which can generate for example RGB color output images. In other implementations, different kinds of sensors are used to produce sequences of images. Examples of such sensors include, ultrasound sensors, thermal sensors, and/or Lidar, etc., which are used to produce sequences of images, point clouds, distances to subjects and inventory items and/or inventory display structures, etc. in the real space. The image recognition engines 112a, 112b, and 112n can also function as sensor fusion engines 112a, 112b, and 112n to further provide non-image data such as point clouds or distances, etc. In one implementation, sensors can be used in addition to the cameras 114. Multiple sensors can be synchronized in time with each other, so that frames are captured by the sensors at the same time, or close in time, and at the same frame capture rate (or different rates). All of the implementations described herein can include sensors other than or in addition to the cameras 114.

As used herein, a network node (e.g., network nodes 101a, 101b, 101n, 102, 103, 104 and/or 105) is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system and/or a local system. More than one virtual device configured as a network node can be implemented using a single physical device.

The databases 140, 150, 160, 162, 164 and 166 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 1, the databases 140, 150, 160, 162, 164 and 166 can be considered to be a single database. The system can include other databases such as a shopping cart database storing logs of items or shopping carts of shoppers in the area of real space, an items database storing data related to items (identified by unique SKUs) in a shopping store. The system can also include a calibration database storing various camera models with respective intrinsic and extrinsic calibration parameters for respective shopping stores or areas of real space.

For the sake of clarity, only three network nodes 101a, 101b and 101n hosting image recognition engines 112a, 112b, and 112n are shown in the system 100. However, any number of network nodes hosting image recognition engines can be connected to the subject tracking engine 110 through the network(s) 181. Similarly, the image recognition engines 112a, 112b, and 112n, the subject tracking engine 110, the account matching engine 170, the subject persistence processing engine 180, the subject re-identification engine 190 and/or other processing engines described herein can execute various operations using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 104 hosting the subject persistence processing engine 180, the network node 102 hosting the subject tracking engine 110, the network node 103 hosting the account matching engine 170, the network node 105 hosting the subject re-identification engine 190, the maps database 140, the subjects database 150, the persistence heuristics database 160, the training database 162, the user database 164, the image database 166 and the mobile computing devices 120. Cameras 114 are connected to the subject tracking engine 110, the account matching engine 170, the subject persistence processing engine 180, and the subject re-identification engine 190 through network nodes hosting image recognition engines 112a, 112b, and 112n. In one implementation, the cameras 114 are installed in a shopping store, such that sets of cameras 114 (two or more) with overlapping fields of view are positioned to capture images of an area of real space in the store. Two cameras 114 can be arranged over a first aisle within the store, two cameras 114 can be arranged over a second aisle in the store, and three cameras 114 can be arranged over a third aisle in the store. Cameras 114 can be installed over open spaces, aisles, and near exits and entrances to the shopping store. In such an implementation, the cameras 114 can be configured with the goal that customers moving in the shopping store are present in the field of view of two or more cameras 114 at any moment in time. Examples of entrances and exits to the shopping store or the area of real space also include doors to restrooms, elevators or other designated unmonitored areas in the shopping store where subjects are not tracked.

Cameras 114 can be synchronized in time with each other, so that images are captured at the image capture cycles at the same time, or close in time, and at the same image capture rate (or a different capture rate). The cameras 114 can send respective continuous streams of images at a predetermined rate to network nodes 101a, 101b, and 101n hosting image recognition engines 112a, 112b and 112n. Images captured in all the cameras 114 covering an area of real space at the same time, or close in time, are synchronized in the sense that the synchronized images can be identified in processing engines 112a, 112b, 112n, 110, 170, 180 and/or 190 as representing different views of subjects having fixed positions in the real space. For example, in one implementation, the cameras 114 send image frames at the rates of 30 frames per second (fps) to respective network nodes 101a, 101b and 101n hosting image recognition engines 112a, 112b and 112n. Each frame has a timestamp, identity of the camera (abbreviated as "camera_id"), and a frame identity (abbreviated as "frame_id") along with the image data. As described above other implementations of the technology disclosed can use different types of sensors such as image sensors, ultrasound sensors, thermal sensors, and/or Lidar, etc. Images can be captured by sensors at frame rates greater than 30 frames per second, such as 40 frames per second, 60 frames per second or even at higher image capturing rates. In one implementation, the images are captured at a higher frame rate when an inventory event such as a put or a take of an item is detected in the field of view of a camera 114. Images can also be captured at higher image capturing rates when other types of events are detected in the area of real space such as when entry or exit of a subject from the area of real space is detected or when two subjects are positioned close to each other, etc. In such an implementation, when no inventory event is detected in the field of view of a camera 114, the images are captured at a lower frame rate.

Cameras 114 are connected to respective image recognition engines 112a, 112b and 112n. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example. In an implementation of a subject tracking system described herein, the cameras 114 can be installed overhead and/or at other locations, so that in combination the fields of view of the cameras encompass an area of real space in which the tracking is to be performed, such as in a shopping store.

In one implementation, each image recognition engine 112a, 112b and 112n is implemented as a deep learning algorithm such as a convolutional neural network (abbreviated CNN). In such an implementation, the CNN is trained using the training database 162. In an implementation described herein, image recognition of subjects in the area of real space is based on identifying and grouping features of the subjects such as joints, recognizable in the images, where the groups of joints (e.g., a constellation) can be attributed to an individual subject. For this joints-based analysis, the training database 162 has a large collection of images for each of the different types of joints for subjects. In the example implementation of a shopping store, the subjects are the customers moving in the aisles between the shelves. In an example implementation, during training of the CNN, the system 100 is referred to as a "training system." After training the CNN using the training database, the CNN is switched to production mode to process images of customers in the shopping store in real time.

In an example implementation, during production, the system 100 is referred to as a runtime system (also referred to as an inference system). The CNN in each image recognition engine produces arrays of joints data structures for images in its respective stream of images. In an implementation as described herein, an array of joints data structures is produced for each processed image, so that each image recognition engine 112a, 112b, and 112n produces an output stream of arrays of joints data structures. These arrays of joints data structures from cameras having overlapping fields of view are further processed to form groups of joints, and to identify such groups of joints as subjects. The subjects can be tracked by the system using a tracking identifier referred to as "tracking_id" or "track_ID" during their presence in the area of real space. The tracked subjects can be saved in the subjects database 150. As the subjects move around in the area of real space, the subject tracking engine 110 keeps track of movement of each subject by assigning track_IDs to subjects in each time interval (or identification interval). The subject tracking engine 110 identifies subjects in a current time interval and matches a subject from the previous time interval with a subject identified in the current time interval. The track_ID of the subject from the previous time interval is then assigned to the subject identified in the current time interval. Sometimes, the track_IDs are incorrectly assigned to one or more subjects in the current time interval due to incorrect matching of subjects across time intervals. The subject re-identification engine 190 includes logic to detect the errors in assignment of track_IDs to subjects. The subject re-identification engine 190 can then re-identify subjects that correctly match across the time intervals and assign correct track_IDs to subjects. Further details of the subject tracking engine 110, the subject persistence processing engine 180 and subject re-identification engine 190 are presented below.

Subject Tracking Engine

The subject tracking engine 110, hosted on the network node 102 receives, in this example, continuous streams of arrays of joints data structures for the subjects from image recognition engines 112a, 112b and 112n and can retrieve and store information from and to a subjects database 150 (also referred to as a subject tracking database). The subject tracking engine 110 processes the arrays of joints data structures identified from the sequences of images received from the cameras at image capture cycles. It then translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is used to locate subjects in the area of real space during identification intervals. One image in each of the plurality of sequences of images, produced by the cameras, is captured in each image capture cycle.

The subject tracking engine 110 uses logic to determine groups or sets of candidate joints having coordinates in real space as subjects in the real space. For the purposes of analogy, each set of candidate points is like a constellation of candidate joints at each point in time. In one implementation, these constellations of joints are generated per identification interval as representing a located subject. Subjects are located during an identification interval using the constellation of joints. The constellations of candidate joints can move over time. A time sequence analysis of the output of the subject tracking engine 110 over a period of time, such as over multiple temporally ordered identification intervals (or time intervals), identifies movements of subjects in the area of real space. The system can store the subject data including unique identifiers, joints and their locations in the real space in the subject database 150.

In an example implementation, the logic to identify sets of candidate joints (i.e., constellations) as representing a located subject comprises heuristic functions is based on physical relationships amongst joints of subjects in real space. These heuristic functions are used to locate sets of candidate joints as subjects. The sets of candidate joints comprise individual candidate joints that have relationships according to the heuristic parameters with other individual candidate joints and subsets of candidate joints in a given set that has been located, or can be located, as an individual subject.

Located subjects in one identification interval can be matched with located subjects in other identification intervals based on location and timing data that can be retrieved from and stored in the subjects database 150. Located subjects matched this way are referred to herein as tracked subjects, and their location can be tracked in the system as they move about the area of real space across identification intervals. In the system, a list of tracked subjects from each identification interval over some time window can be maintained, including for example by assigning a unique tracking identifier to members of a list of located subjects for each identification interval, or otherwise. Located subjects in a current identification interval are processed to determine whether they correspond to tracked subjects from one or more previous identification intervals. If they are matched, then the location of the tracked subject is updated to the location of the current identification interval. Located subjects not matched with tracked subjects from previous intervals are further processed to determine whether they represent newly arrived subjects, or subjects that had been tracked before, but have been missing from an earlier identification interval.

Tracking all subjects in the area of real space is important for operations in a cashier-less store. For example, if one or more subjects in the area of real space are missed and not tracked by the subject tracking engine 110, it can lead to incorrect logging of items taken by the subject, causing errors in generation of an item log (e.g., shopping list or shopping cart data) for this subject. The technology disclosed can implement a subject persistence engine 180 to find any missing subjects in the area of real space.

Another issue in tracking of subjects is incorrect assignment of track_IDs to subjects caused by swapping of tracking identifiers (track_IDs) amongst tracked subjects. This can happen more often in crowded spaces and places with high frequency of entries and exits of subjects in the area of real space. The subject-reidentification engine 190 includes logic to detect errors when tracking identifiers are swapped and/or incorrectly assigned to one or more subjects. The subject re-identification engine can correct the tracking errors by matching the subjects across time intervals across multiple cameras 114. The subject re-identification engine 190 performs the matching of subjects using feature vectors (or re-identification feature vectors) generated by one or more trained machine learning models. Therefore, the subject re-identification engine 190 processes image frames captured by cameras which is separate from the processing of image frames by the subject tracking engine 110 to match subjects across time intervals. The technology disclosed provides a robust mechanism to correct any tracking errors and incorrect assignment of tracking identifiers to tracked subjects in the area of real space. Details of both subject persistence and subject re-identification technologies are presented below. Note that any one of these technologies can be deployed independently in a cashier-less shopping store. Both subject persistence and subject re-identification technologies can be used simultaneously as well to address the issues related to missing subjects and swapped tracking identifiers.

Subject Persistence Processing Engine

For the purposes of tracking subjects, the subject persistence processing engine 180 compares the newly located (or newly identified) subjects in the current identification interval with one or more preceding identification intervals. The system includes logic to determine if the newly located subject is a missing tracked subject previously tracked in an earlier identification interval and stored in the subjects database but who was not matched with a located subject in an immediately preceding identification interval. If the newly located subject in the current identification interval is matched to the missing tracked subject located in the earlier identification interval, the system updates the missing tracked subject in the subject database 150 using the candidate located subject located from the current identification interval.

In one implementation, in which the subject is represented as a constellation of joints as discussed above, the positions of the joints of the missing tracked subject is updated in the database with the positions of the corresponding joints of the candidate located subject located from the current identification interval. In this implementation, the system stores information for tracked subject in the subjects database 150. This can include information such as the identification intervals in which the tracked subject is located. Additionally, the system can also store, for a tracked subject, the identification intervals in which the tracked subject is not located. In another implementation, the system can store missing tracked subjects in a missing subjects database, or tag tracked subjects as missing, along with additional information such as the identification interval in which the tracked subject went missing and last known location of the missing tracked subject in the area of real space. In some implementations, the subject status as tracked and located, can be stored per identification interval.

The subject persistence processing engine 180 can process a variety of subject persistence scenarios. For example, a situation in which more than one candidate located subjects are located in the current identification interval but not matched with tracked subjects, or a situation when a located subject moves to a designated unmonitored location in the area of real space but reappears after some time and is located near the designated unmonitored location in the current identification interval. The designated unmonitored location in the area of real space can be a restroom, for example. The technology can use persistence heuristics to perform the above analysis. In one implementation, the subject persistence heuristics are stored in the persistence heuristics database 160.

Subject Re-Identification Engine

The subject re-identification engine 190 can detect a variety of errors related to incorrect assignments of track_IDs to subjects. The subject tracking engine 110 tracks subjects represented as constellation of joints. Errors can occur when tracked subjects are closely positioned in the area of real space. One subject may fully or partially occlude one or more other subjects. The subject tracking engine 110 can assign incorrect track_IDs to subjects over a period of time. For example, track_ID "X" assigned to a first subject in a first time interval can be assigned to a second subject in a second time interval. A time interval can be a period of time such as from a few milli seconds to a few seconds. There can be other time intervals between the first time interval and the second time interval. Any image frame captured during any time interval can be used for analysis and processing. A time interval can also represent one image frame at a particular time stamp. If the errors related to incorrect assignment of track_IDs are not detected and fixed, the subject tracking can result in generation of incorrect item logs associated with subjects, resulting in incorrect billing of items taken by subjects. The subject re-identification engine detects errors in assignment of track_IDs to subjects over multiple time intervals in a time duration during which the subject is present in the area of real space, e.g., a shopping store, a sports arena, an airport terminal, a gas station, etc.

The subject re-identification engine 190 can receive image frames from cameras 114 with overlapping fields of view. The subject re-identification engine 190 can include logic to pre-process the image frames received from the cameras 114. The pre-processing can include placing bounding boxes around at least a portion of the subject identified in the image. The bounding box logic attempts to include the entire pose of the subject within the boundary of the bounding box e.g., from the head to the feet of the subject and including left and right hands. However, in some cases, a complete pose of a subject may not be available in an image frame due to occlusion, location of the camera (e.g., the field of view of the camera) etc. In such instance, a bounding box can be placed around a partial pose of the subject. In some cases, a previous images frame or a next image frame in a sequence of image frames from a camera can be selected for cropping out images of subjects in bounding boxes. Examples of poses of subjects that can be captured in bounding boxes include a front pose, a side pose, a back pose, etc.

The cropped out images of subjects can be provided to a trained machine learning model to generate re-identification feature vectors. The re-identification feature vector encodes visual features of the subject's appearance. The technology disclosed can use a variety of machine learning models. ResNet (He et al. CVPR 2016 available at <<arxiv.org/abs/1512.03385>>) and VGG (Simonyan et al. 2015 available at <<arxiv.org/abs/1409.1556>>) are examples of convolutional neural networks (CNNs) that can be used to identify and classify objects. In one implementation, ResNet-50 architecture of ResNet Model (available at <<github.com/layumi/Person_reID_baseline_pytorch>>) is used to encode visual features of subjects. The model can be trained using open source training data or custom training data. In one implementation, the training data is generated using scenes (or videos) recorded in a shopping store. The scenes comprise different scenarios with a variety of complexity. For example, different scenes are generated using one person, three persons, five persons, ten persons, and twenty five persons, etc. Image frames are extracted from the scenes and labeled with tracking errors to generate ground truth data for training of the machine learning model. The training data set can include videos or sequences of image frames (or other types of information described herein) captured by cameras (or other sensors described herein) in the area of real space. The labels of the training examples can be subject tracking identifiers per image frame (or other segment of data) for the subjects detected in respective image frames. In one implementation, the training examples can include tracking errors (e.g., swap error, single swap error, split error, enter-exit swap error, etc.) detected per image frame. In this case, the labels of the training examples can include errors detected in respective image frames. The training dataset can be used to train the subject re-identification engine.

The subject re-identification engine 190 includes logic to match re-identification feature vectors for a subject in a second time interval with re-identification feature vectors of subjects in a first time interval to determine if the tracking identifier is correctly assigned to the subject in the second time interval. The matching includes calculating a similarity score between respective re-identification feature vectors. Different similarity measures can be applied to calculate the similarity score. For example, in one case the subject re-identification engine 190 calculates a cosine similarity score between two re-identification feature vectors. Higher values of cosine similarity scores indicate a higher probability that the two re-identification feature vectors represent a same subject in two different time intervals. The similarity score can be compared with a pre-defined threshold for matching the subject in the second time interval with the subject in the first time interval. In one implementation, the similarity score values range from negative 1.0 to positive 1.0 [−1.0, 1.0]. The threshold values can be set at 0.5 or higher than 0.5. Different values of the threshold can be used in production or inference. The threshold values can dynamically change in dependence upon time of day, locations of camera, density (e.g., number) of subjects within the store, etc. In one implementation, the threshold values range from 0.35 to 0.5. A specific value of the threshold can be selected for a specific production use case based on tradeoffs between model performance parameters such as precision and recall for detecting errors in subject tracking. Precision and recall values can be used to determine performance of a machine learning model. Precision parameters (values) indicate proportions of predicted errors that correspond to actual errors. A precision value of 0.8 indicates that when a model or a classifier predicts an error, the prediction is correct 80 percent of the time. Recall on the other hand indicates the proportion of all errors that are correctly predicted by the model. For example, a recall value of 0.1 indicates that the model predicts 10 percent of all errors in the presented data. As threshold values are increased, the subject re-identification engine 190 can detect more tracking errors but such errors can include false positive detections. When threshold values are reduced fewer tracking errors are detected by the subject re-identification engine 190. Therefore, higher values of threshold result in better recall results and lower threshold values result in better precision results. Threshold values are selected to strike a balance between the two performance parameters. Other ranges of threshold values that can be used include, 0.25 to 0.6 or 0.15 to 0.7.

In the example of a shopping store the customers (also referred to as subjects above) move in the aisles and in open spaces. The customers take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf.

In one implementation, the image analysis is anonymous, i.e., a unique tracking identifier assigned to a subject created through joints analysis does not identify personal identification details (such as names, email addresses, mailing addresses, credit card numbers, bank account numbers, driver's license number, etc.) of any specific subject in the real space. The data stored in the subjects database 150 does not include any personal identification information. The operations of the subject persistence processing engine 180 and the subject tracking engine 110 do not use any personal identification including biometric information associated with the subjects.

In one implementation, the tracked subjects are identified by linking them to respective "user accounts" containing for example preferred payment method provided by the subject. When linked to a user account, a tracked subject is characterized herein as an identified subject. Track subjects are linked with items picked up on the store, and linked with a user account, for example, and upon exiting the store, an invoice can be generated and delivered to the identified subject, or a financial transaction executed online to charge the identified subject using the payment method associated to their accounts. The identified subjects can be uniquely identified, for example, by unique account identifiers or subject identifiers, etc. In the example of a cashier-less store, as the customer completes shopping by taking items from the shelves, the system processes payment of items bought by the customer.

The system includes the account matching engine 170 (hosted on the network node 103) to process signals received from mobile computing devices 120 (carried by the subjects) to match the identified subjects with user accounts. The account matching can be performed by identifying locations of mobile devices executing client applications in the area of real space (e.g., the shopping store) and matching locations of mobile devices with locations of subjects, without use of personal identifying biometric information from the images.

The actual communication path to the network node 102 hosting the subject tracking engine 110, the network node 103 hosting the account matching engine 170, the network node 104 hosting the subject persistence processing engine 180 and the network node 105 hosting the subject re-identification engine 190, through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a Big- Table™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Camera Arrangement

The cameras 114 are arranged to track subjects (or entities) in a three dimensional (abbreviated as 3D) real space. In the example implementation of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2A:
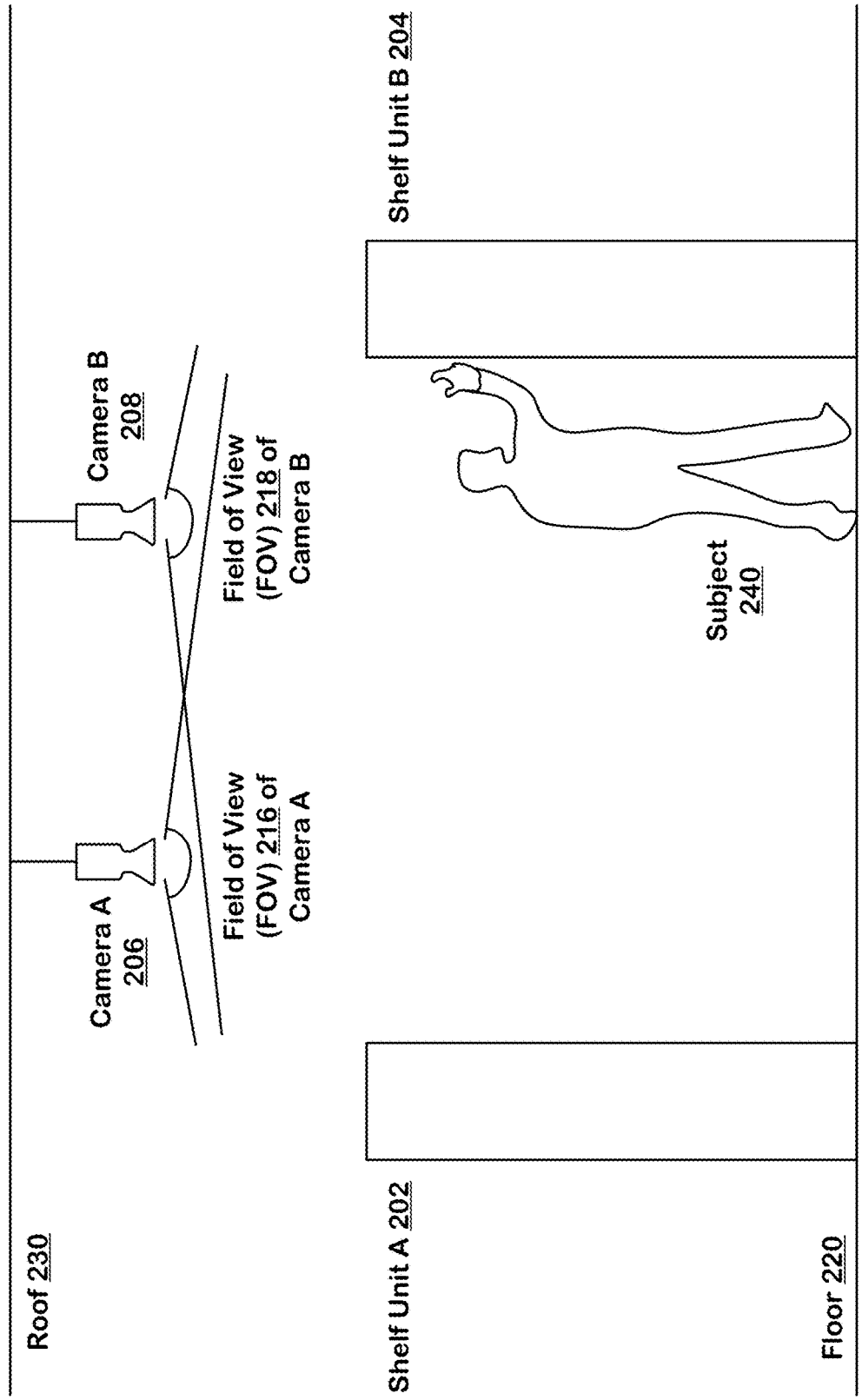
FIG. 2A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 2A shows an arrangement of shelf unit A 202 and shelf unit B 204, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelf units A 202 and shelf unit B 204. The cameras 114 comprise cameras disposed over and having fields of view encompassing respective parts of the inventory display structures and floor area in the real space. For example, the field of view 216 of camera A 206 and field of view 218 of camera B 208 overlap as shown in FIG. 2A. The locations of subjects are represented by their positions in three dimensions of the area of real space. In one implementation, the subjects are represented as constellation of joints in real space. In this implementation, the positions of the joints in the constellation of joint are used to determine the location of a subject in the area of real space. The cameras 114 can be any of Pan-Tilt-Zoom cameras, 360-degree cameras, and/or combinations thereof that can be installed in the real space.

In the example implementation of the shopping store, the real space can include the entire floor 220 in the shopping store. Cameras 114 are placed and oriented such that areas of the floor 220 and shelves can be seen by at least two cameras. The cameras 114 also cover floor space in front of the shelves 202 and 204. Camera angles are selected to have both steep perspective, straight down, and angled perspectives that give more full body images of the customers. In one example implementation, the cameras 114 are configured at an eight (8) foot height or higher throughout the shopping store. In one implementation, the area of real space includes one or more designated unmonitored locations such as restrooms.

Entrances and exits for the area of real space, which act as sources and sinks of subjects in the subject tracking engine, are stored in the maps database. Also, designated unmonitored locations are not in the field of view of cameras 114, which can represent areas in which tracked subjects may enter, but must return into the area being tracked after some time, such as a restroom. The locations of the designated unmonitored locations are stored in the maps database 140. The locations can include the positions in the real space defining a boundary of the designated unmonitored location and can also include location of one or more entrances or exits to the designated unmonitored location. Examples of entrances and exits to the shopping store or the area of real space also include doors to restrooms, elevators or other designated unmonitored areas in the shopping store where subjects are not tracked.

Three Dimensional Scene Generation

Figure 2B:
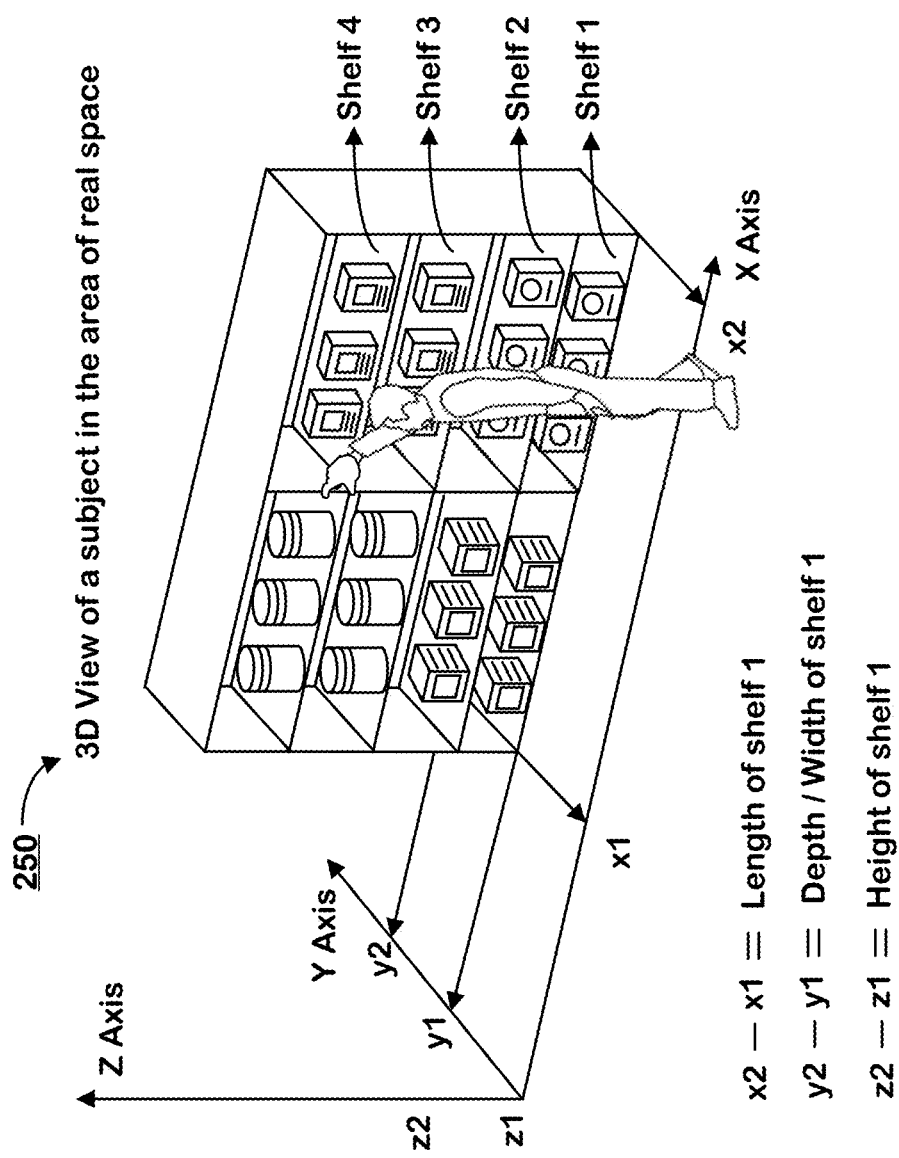
FIG. 2B is a perspective view, illustrating a subject taking an item from a shelf in the inventory display structure in the area of real space.

In FIG. 2A, a subject 240 is standing by an inventory display structure shelf unit B 204, with one hand positioned close to a shelf (not visible) in the shelf unit B 204. FIG. 2B is a perspective view of the shelf unit B 204 with four shelves, shelf 1, shelf 2, shelf 3, and shelf 4 positioned at different levels from the floor. The inventory items are stocked on the shelves.

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints in the area of real space. This section presents a description of the process to generate 3D coordinates of joints. The process is also referred to as 3D scene generation.

Before using the system 100 in training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one implementation, one subject (also referred to as a multi-joint subject), such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a, 112b, and 112n for the purposes of the external calibration. The image recognition engines identify the position of a joint as (x, y) coordinates, such as row and column numbers, of pixels in the 2D image space of respective cameras 114. In one implementation, a joint is one of 19 different types of joints of the subject. As the subject moves through the fields of view of different cameras, the subject tracking engine 110 receives (x, y) coordinates of each of the 19 different types of joints of the subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one implementation, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a subject is used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures, which are data structures that include information about physiological and other types of joints of a subject) of different image recognition engines 112a, 112b and 112n, processing images of cameras 114 with overlapping fields of view. The results of the internal and external camera calibration are stored in a calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space.

In an implementation of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [[x, x, x], [x, x, x], [x, x, x]],
    distortion_coefficients: [x, x, x, x, x, x, x, x]
  },
}
```

The camera recalibration method can be applied to 360 degree or high field of view cameras. The radial distortion parameters described above can model the (barrel) distortion of a 360 degree camera. The intrinsic and extrinsic calibration process described here can be applied to the 360 degree cameras. However, the camera model using these intrinsic calibration parameters (data elements of K and distortion coefficients) can be different.

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
  1: {
    2: {
      F: [[x, x, x], [x, x, x], [x, x, x]],
      E: [[x, x, x], [x, x, x], [x, x, x]],
      P: [[x, x, x, x], [x, x, x, x], [x, x, x, x]],
```

-continued

```
       R: [[x, x, x], [x, x, x], [x, x, x]],
       t: [x, x, x],
       homography_floor_coefficients: [x, x, x, x, x, x, x, x]
   }
},
   ......
}
```

Two Dimensional and Three Dimensional Maps

An inventory location, such as a shelf, in a shopping store can be identified by a unique identifier in a map database (e.g., shelf_id). Similarly, a shopping store can also be identified by a unique identifier (e.g., store_id) in a map database. The two dimensional (2D) and three dimensional (3D) maps database 140 identifies inventory locations in the area of real space along the respective coordinates. For example, in a 2D map, the locations in the maps define two dimensional regions on the plane formed perpendicular to the floor 220 i.e., XZ plane as shown in FIG. 2B. The map defines an area for inventory locations where inventory items are positioned. In FIG. 3, a 2D location of the shelf unit shows an area formed by four coordinate positions (x1, y1), (x1, y2), (x2, y2), and (x2, y1). These coordinate positions define a 2D region on the floor 220 where the shelf is located. Similar 2D areas are defined for all inventory display structure locations, entrances, exits, and designated unmonitored locations in the shopping store. This information is stored in the maps database 140.

In a 3D map, the locations in the map define three dimensional regions in the 3D real space defined by X, Y, and Z coordinates. The map defines a volume for inventory locations where inventory items are positioned. In FIG. 2B, a 3D view 250 of shelf 1 in the shelf unit shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the maps database 140. The coordinate positions along the three axes can be used to calculate length, depth and height of the inventory locations as shown in FIG. 2B.

In one implementation, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations, entrances, exits and designated unmonitored locations in the shopping store.

The items in a shopping store are arranged in some implementations according to a planogram which identifies the inventory locations (such as shelves) on which a particular item is planned to be placed. For example, as shown in an illustration 250 in FIG. 2B, a left half portion of shelf 3 and shelf 4 are designated for an item (which is stocked in the form of cans).

Joints Data Structure

The image recognition engines 112*a*-112*n* receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one implementation, the image recognition engines 112*a*-112*n* identify one of the 19 possible joints of a subject at each element of the image, usable to identify subjects in the area who may be moving in the area of real space, standing and looking at an inventory item, or taking and putting inventory items. The possible joints can be grouped in two categories: foot joints and non-foot joints. The 19$^{th}$ type of joint classification is for all non-joint features of the subject (i.e. elements of the image not classified as a joint). In other implementations, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

Foot Joints:
Ankle joint (left and right)
Non-foot Joints:
Neck
Nose
Eyes (left and right)
Ears (left and right)
Shoulders (left and right)
Elbows (left and right)
Wrists (left and right)
Hip (left and right)
Knees (left and right)
Not a joint An array of joints data structures for a particular image classifies elements of the particular image by joint type, time of the particular image, and the coordinates of the elements in the particular image. In one implementation, the image recognition engines 112*a*-112*n* are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 310 as shown in FIG. 3A is used to store the information of each joint. The joints data structure 310 identifies x and y positions of the element in the particular image in the 2D image space of the camera from which the image is received. A joint number identifies the type of joint identified. For example, in one implementation, the values range from 1 to 19. A value of 1 indicates that the joint is a left ankle, a value of 2 indicates the joint is a right ankle and so on. The type of joint is selected using the confidence array for that element in the output matrix of CNN. For example, in one implementation, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one implementation, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Using a Data Structure Including Joint Information

The tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181. The tracking engine 110 translates the coordinates of the elements in the arrays of joints data structures from 2D image space corresponding to images in different sequences into candidate joints having coordinates in the 3D real space. A location in the real space is covered by the field of views of two or more cameras. The tracking engine 110 comprises logic to determine sets of candidate joints having coordinates in real space (constellations of joints) as located subjects in the real space. In one implementation, the tracking engine 110 accumulates arrays of joints data structures from the image recognition engines for all the cameras at a given moment in time and stores this information as a dictionary in a subject database, to be used for identifying a constellation of candidate joints corresponding to located subjects. The dictionary can be arranged in the form of key-value pairs, where keys are camera ids and values are arrays of joints data structures from the camera. In such an implementation, this dictionary is used in heuristics-based analysis to determine candidate joints and for assignment of joints to located subjects. In such an implementation, a high-level input, processing and output of the tracking engine 110 is illustrated in table 1. Details of the logic applied by the subject tracking engine 110 to create subjects by combining candidate joints and track movement of subjects in the area of real space are presented in U.S. patent application Ser. No. 15/847,796, entitled, "Subject Identification and Tracking Using Image Recognition Engine," filed on 19 Dec. 2017, now issued as U.S. Pat. No. 10,055,853, which is fully incorporated into this application by reference.

TABLE 1

Inputs, processing and outputs from subject tracking engine 110 in an example implementation.

| Inputs | Processing | Output |
| --- | --- | --- |
| Arrays of joints data structures per image and for each joints data structure Unique ID Confidence number Joint number 2D (x, y) position in image space | Create joints dictionary Reproject joint positions in the fields of view of cameras with overlapping fields of view to candidate joints | List of located subjects located in the real space at a moment in time corresponding to an identification interval |

Subject Data Structure

The subject tracking engine 110 uses heuristics to connect joints identified by the image recognition engines 112a-112n to locate subjects in the area of real space. In doing so, the subject tracking engine 110, at each identification interval, creates new located subjects for tracking in the area of real space and updates the locations of existing tracked subjects matched to located subjects by updating their respective joint locations. The subject tracking engine 110 can use triangulation techniques to project the locations of joints from 2D image space coordinates (x, y) to 3D real space coordinates (x, y, z). FIG. 3B shows the subject data structure 320 used to store the subject. The subject data structure 320 stores the subject related data as a key-value dictionary. The key is a "frame_id" and the value is another key-value dictionary where key is the camera_id and value is a list of 18 joints (of the subject) with their locations in the real space. The subject data is stored in the subjects database 150. A subject is assigned a unique identifier that is used to access the subject's data in the subject database.

In one implementation, the system identifies joints of a subject and creates a skeleton (or constellation) of the subject. The skeleton is projected into the real space indicating the position and orientation of the subject in the real space. This is also referred to as "pose estimation" in the field of machine vision. In one implementation, the system displays orientations and positions of subjects in the real space on a graphical user interface (GUI). In one implementation, the subject identification and image analysis are anonymous, i.e., a unique identifier assigned to a subject created through joints analysis does not identify personal identification information of the subject as described above.

For this implementation, the joints constellation of a subject, produced by time sequence analysis of the joints data structures, can be used to locate the hand of the subject. For example, the location of a wrist joint alone, or a location based on a projection of a combination of a wrist joint with an elbow joint, can be used to identify the location of hand of a subject.

Subject Persistence Analysis

The joints analysis performed by the subject tracking engine 110 in an identification interval identifies constellation of joints. The identification interval can correspond to one image capture cycle or can include multiple image capture cycles. The constellation of joints located in an identification interval can belong to new subjects who have entered the area of real space in the current identification interval or can represent updated locations of the previously tracked subjects in earlier identification intervals. Sometimes, a subject located and tracked in an earlier identification interval can be missing in an intermediate identification interval before the current identification interval. This can happen for a variety of reasons, including, due to the subject moving to a designated unmonitored location in the area of real space or due to an error in subject tracking.

When a located subject is identified in the current identification interval, the technology disclosed performs the subject persistence analysis before tracking the located subject as a new subject and assigning it a new unique identifier. The system matches located subjects from the current identification interval with tracked subjects from an immediately preceding identification interval. Located subjects that are matched with tracked subjects can be tagged as the matching tracked subject. Located subjects that are not matched with tracked subjects are subjected to additional processing. For example, the system determines if a tracked subject in one or more earlier identification intervals is missing (i.e. not matched to a located subject) in the immediately preceding identification interval. Such a missing tracked subject can be evaluated as a potential match for the unmatched located subject (candidate subject) in the current identification interval.

For example, the system can include logic that processes the set of tracked subjects in the subject database 150 to detect a missing tracked subject present in the database. The missing tracked subject is not located in a first preceding identification interval but is tracked in a second preceding identification interval. The first preceding identification interval follows the second preceding identification interval. The system includes logic to locate a candidate located subject located from the current identification interval which follows the first preceding identification interval. The current identification interval can also be referred to as the third identification interval.

The technology disclosed matches the candidate located subject located from the current identification interval to the missing tracked subject located in the second preceding identification interval. If the missing tracked subject matches the candidate located subject, the missing tracked subject is updated in the database using the location of the candidate subject, and marked as no longer missing. This enables persistence of subjects in the area of real space even when a tracked subject is missed and not located in an identification interval.

It is understood that variations of subject persistence analysis are possible. For example, the system can match newly located candidate subject in the current identification interval to a missing tracked subject who is not located and tracked by the system for more than one intermediate identification intervals before the current identification interval.

The following sections present three example scenarios in which subject persistence analysis can be performed in an area of real space.

Single New Subject Persistence Analysis

The first example includes performing subject persistence over three identification intervals to match a missing tracked subject located in the second preceding identification interval to a candidate located subject located from the current (or third) identification interval. The system detects a condition in which a number of located subjects in the current set does not match the number of located subjects from a first preceding identification interval in the plurality of previous intervals. Upon detection of the condition, the system compares at least one of the located subjects in the current set with the set of located subjects from a second preceding identification interval in the plurality of previous identification intervals, that precedes the first preceding identification interval. The following example uses three identification intervals to illustrate this scenario. However, the process can be applied to more than three identification intervals.

Figure 4A:
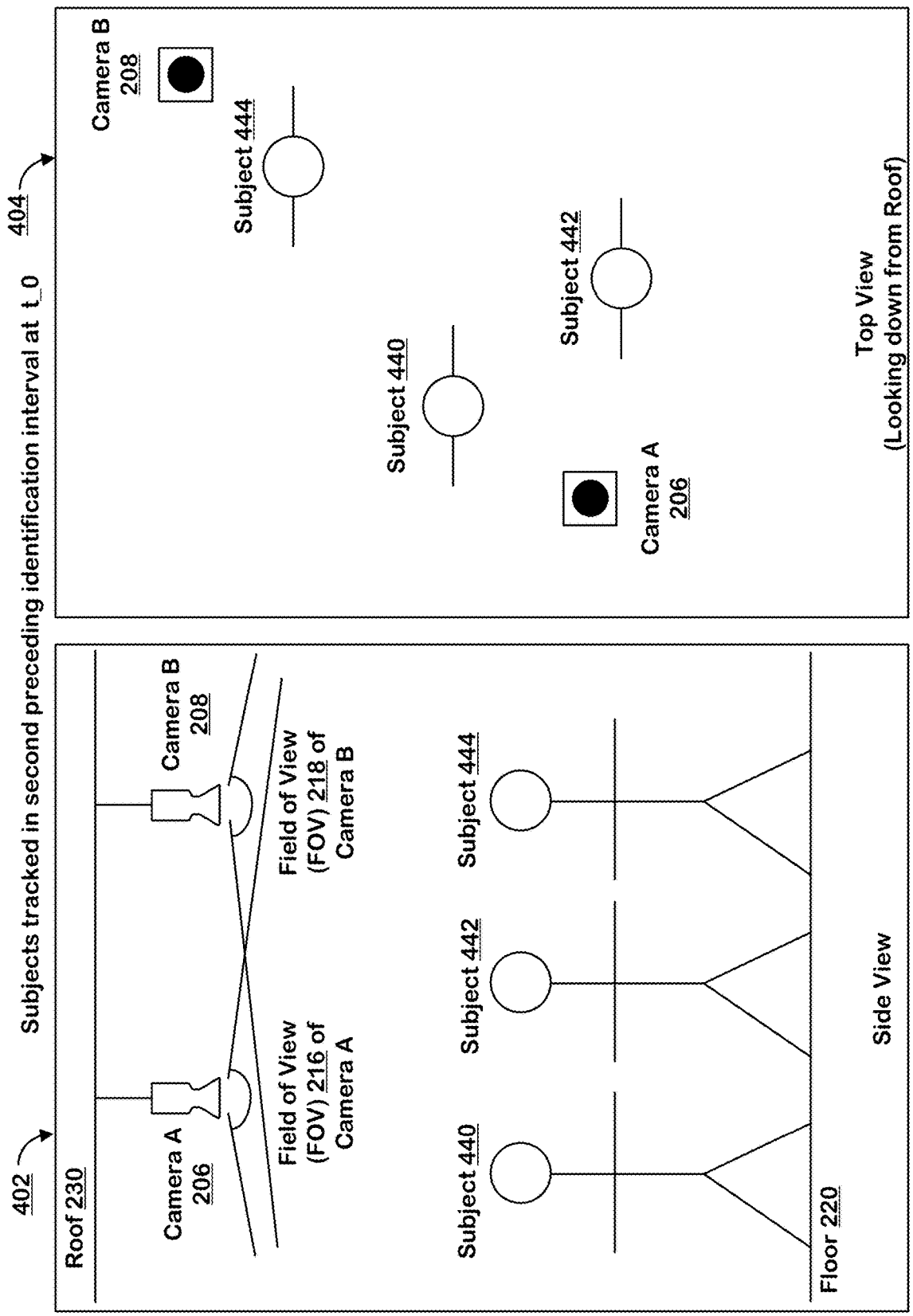
FIG. 4A shows tracked subjects in an area of real space in a second preceding identification interval.
Figure 4B:
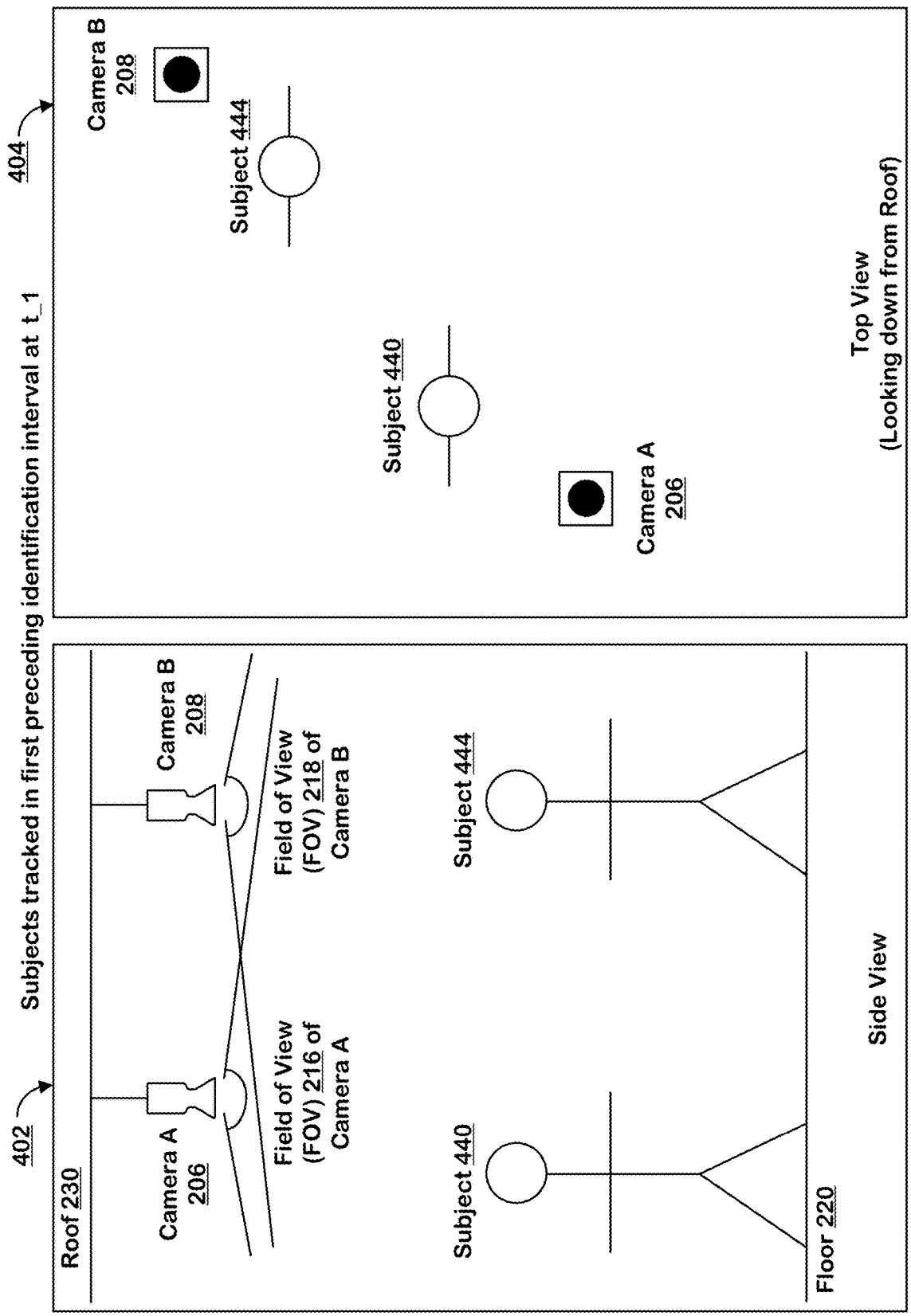
FIG. 4B shows tracked subjects in an area of real space in a first preceding identification interval in which one tracked subject located in the second preceding identification interval is missing.

FIG. 4A presents a side view 402 of an area of real space in which three subjects 440, 442 and 444 are tracked in a second preceding identification interval at time t_0. The subjects are stored in the database with their respective unique tracking identifiers and location information. The positions of the three subjects in a top view 404 (looking down from roof) is also shown in a top view 404. As described above, the positions of the subjects in the area of real space is identified by their respective subject data structures 320. The subject data structures include locations of joints in three dimensions (x, y, z) of the area of real space. In another implementation, the positions of the joints or other feature of the subjects are represented in the two dimensional (abbreviated 2D) image space (x, y). The subject 442 who is tracked in the second preceding identification interval is missing in a first preceding identification interval at time t_1 as shown in FIG. 4B. Both side view (402) and top view (404) show subjects 440 and 444 tracked in the first preceding identification intervals. A candidate subject 442A is located in a current identification interval at time t_2 as shown FIG. 4C. The candidate located subject is visible in the side view 402 and the top view 404.

The technology disclosed performs the subject persistence analysis to determine if the candidate located subject 442A is a new subject who entered the area of real space during the current identification interval or if the candidate located subject 442A is the missing tracked subject 442 who was tracked in the second preceding identification interval but is missing in the first preceding identification interval.

Figure 5:
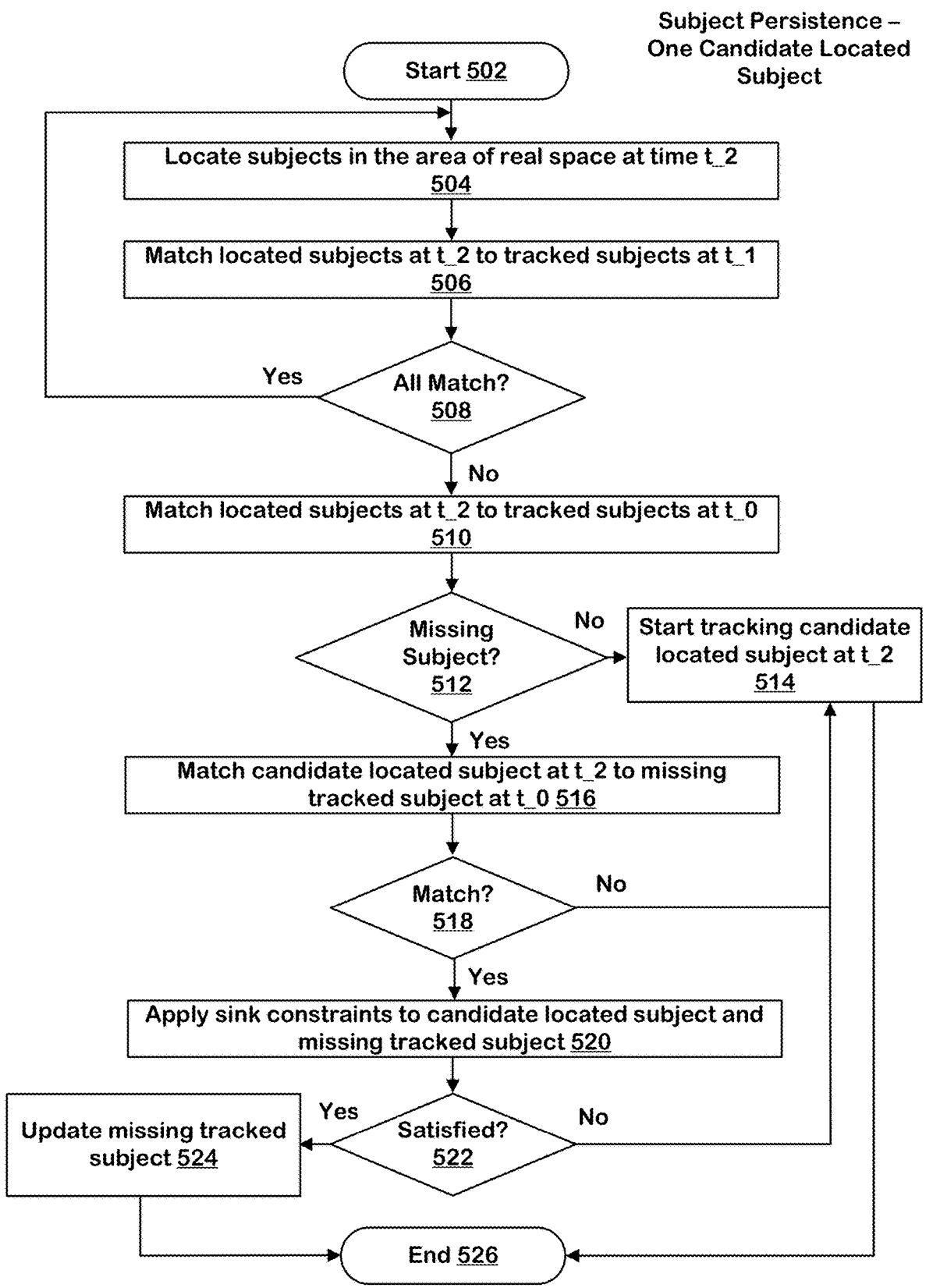
FIG. 5 is an example flow chart for matching a candidate located subject to a missing tracked subject.
Figure 6:
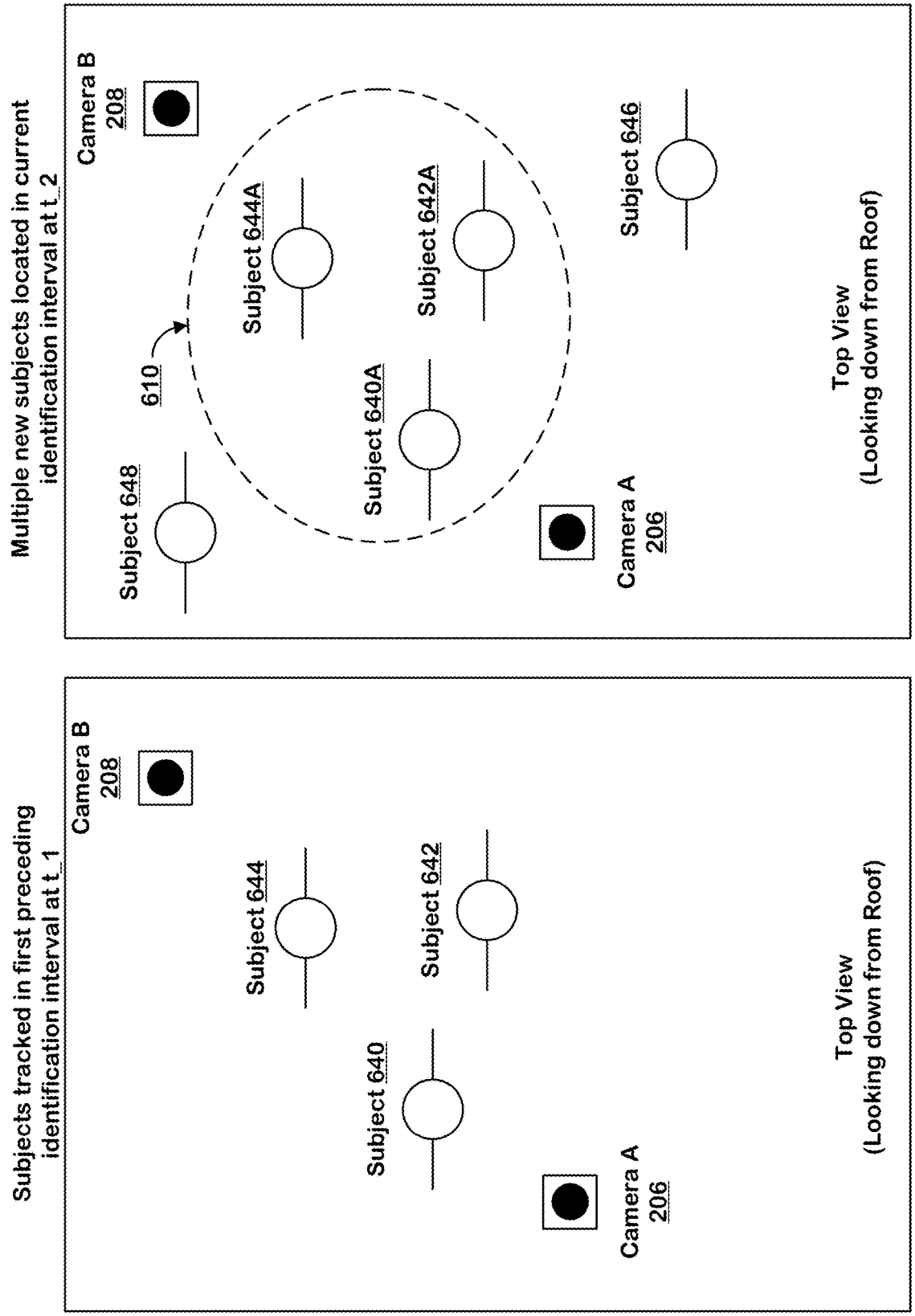
FIG. 6A shows tracked subjects in the area of real space located in a first preceding identification interval.
FIG. 6B shows subjects located in the area of real space in a current identification interval with more than one located subject not matched with tracked subjects located in a first preceding identification interval.

FIG. 5 presents a flowchart with example operations to perform the subject persistence for one candidate located subject located from the current identification interval. The process starts at operation 502. The system locates subjects in the current identification cycle at time t_2. In one implementation, the system uses joints analysis as described above to locate subjects as constellation of joints. In another implementation, the system can use other features of the subjects such as facial features independently or in combination with joints to locate subjects in the area of real space.

At operation 506, the process matches the subjects located in the current identification interval at t_2 to tracked subjects located in the first preceding identification interval at time t_1. In one implementation, the process uses the logic applied by the subject tracking engine 110 to create subjects by combining candidate joints and track movement of subjects in the area of real space as presented in U.S. patent application Ser. No. 15/847,796, entitled, "Subject Identification and Tracking Using Image Recognition Engine," filed on 19 Dec. 2017, now issued as U.S. Pat. No. 10,055,853, which is fully incorporated into this application by reference. At operation 508, the system determines if all subjects located in the current identification interval match to the tracked subjects in the first preceding identification interval. If all subjects match then the system repeats operations 504 and 506 for a next identification interval. In one implementation, in this step, the system detect a condition in which a number of located subjects in the current set does not match the number of located subjects from a first preceding identification interval in the plurality of previous intervals. If the condition is true (operation 508), then the system compares at least one of the located subjects in the current set with the set of tracked subjects from a second preceding identification interval in the plurality of previous identification intervals, that precedes the first preceding identification interval.

If a candidate located subject located from the current identification interval does not match to any tracked subject in the first preceding identification interval, the technology disclosed determines if there is a missing tracked subject who was located and tracked in the second preceding identification interval but was missing in the first preceding identification interval following the second preceding identification interval. If the system identifies a missing tracked subject who is tracked in the second preceding identification interval but is missing in the first preceding identification interval, the process continues at operation 516. Otherwise, if the system does not identify a missing tracked subject in the second preceding identification interval, the system starts tracking the candidate located subject located from the current identification interval by assigning this subject a new tracking identifier. This is the case when all tracked subjects in the first preceding identification interval match corresponding tracked subjects in the second preceding identification interval.

Figure 4C:
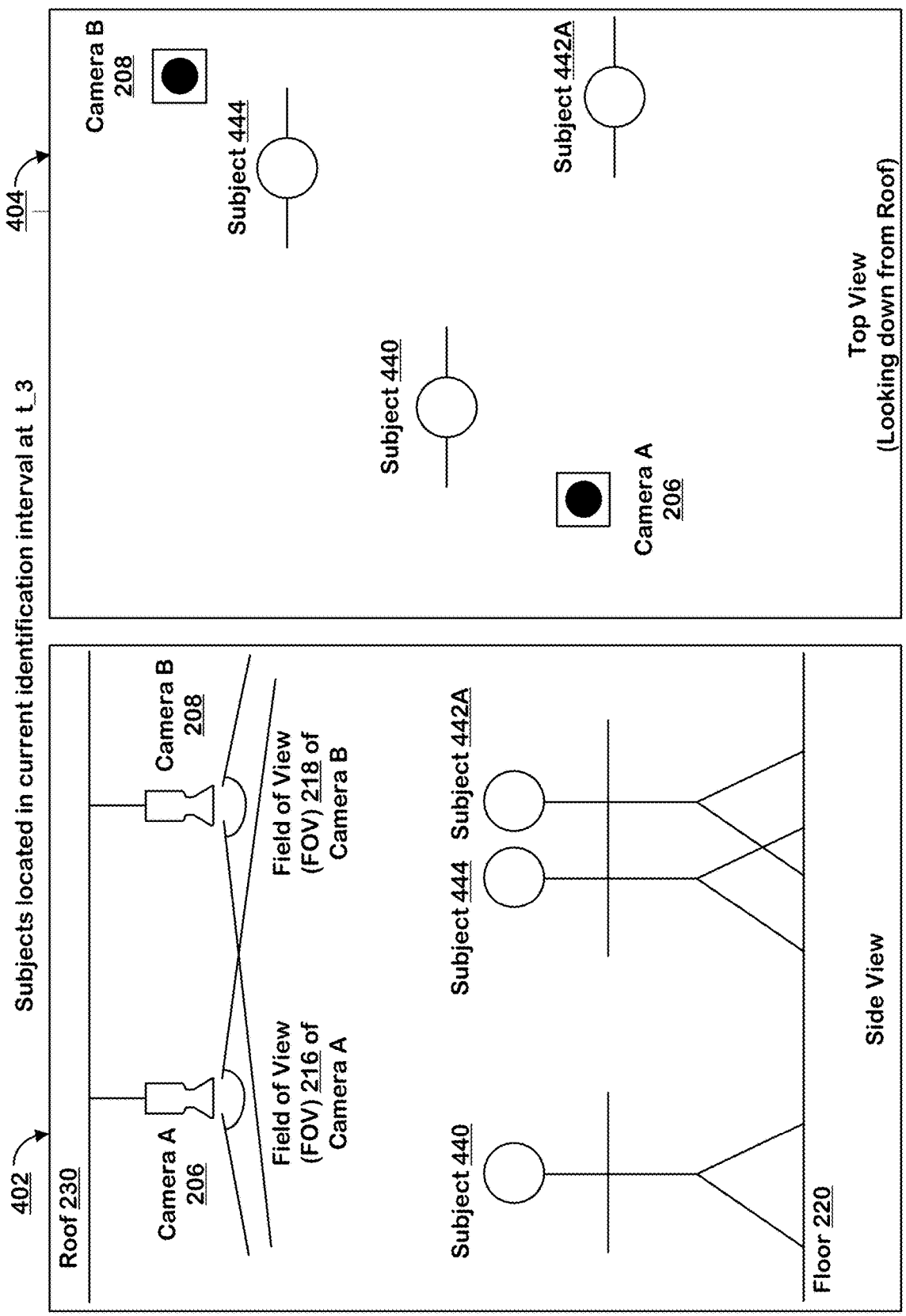
FIG. 4C shows subjects located in an area of real space in a current identification interval in which a candidate subject is located.

In the example presented in FIGS. 4A to 4C, the subject 442A (shown in FIG. 4C) is the candidate located subject located from the current identification interval and the subject 442 (shown in FIG. 4A) is the missing tracked subject. If the system determines that there is no missing tracked subject at operation 512, the candidate located subject 442A is assigned a unique tracking identifier and the system starts tracking the subject during the current identification interval.

The process to match the missing tracked subject and the candidate located subject is described in the following steps of the process flow. In operation 516, the system applies a time constraint heuristic before matching the location of the candidate located subject located from the current identification interval to the location of the missing tracked subject in the second preceding identification interval. The system calculates for example a difference in a timestamp of location of the candidate located subject and a timestamp of location of the missing tracked subject. The timestamps can be identifiers of the identification intervals, or can be specific timestamps within an identification interval that includes a plurality of image capture cycles. The timestamp, for example, can be represented as $t\_2$ for the candidate subject located from the current identification interval, and $t\_0$ for the missing tracked subject located in the second preceding identification interval. If an identification interval matches an image capture cycle of the cameras, the timestamps can match the time at which the images are captured in the image capture cycles. The difference between the timestamps i.e., $t\_2-t\_0$ is compared with a timing threshold. In one example, the timing threshold is 10 seconds. It is understood that other values of timing threshold greater or less than 10 seconds can be used. The timestamps of detection of joints of the subjects at image capture cycles can also be used for calculation of this time difference. If the difference in timestamps is less than the timing threshold then the system matches locations of the candidate located subject and the missing tracked subject.

The system calculates a distance between a location of the candidate located subject ($p\_2$) and a location of the missing tracked subject ($p\_0$) in the area of real space, i.e., ($p\_2-p\_1$). In one implementation using joints analysis as described above, the distance is calculated using locations of joints in the constellations of joints of the candidate located subject and the missing tracked subject. The distance can be calculated as a Euclidean distance between two points representing the corresponding joints in the respective constellations of joints. The Euclidean distance can be calculated both in the 3D real space and the 2D image space. The Euclidean distance represents the distance the subject has moved from an initial position in the second preceding identification interval to a new position in the current identification interval. This distance is then compared with a distance threshold. If the distance is less than the distance threshold then the candidate located subject is matched to the missing tracked subject. An example of the distance threshold distance is 1 meter. Other values for the distance threshold, greater than 1 meter or less than 1 meter can be used. If the difference between the timestamps of the location of the candidate located subject and the missing tracked subject is greater than the timing threshold or the distance between the candidate located subject and the missing tracked subject is greater than the distance threshold (operation 518), the system start does not match the candidate subject to the missing tracked subject, and can identify it as a new located subject at operation 514. Otherwise, the process to link the candidate located subject and the missing tracked subject continues at operation 520.

At operation 520, before linking the candidate located subject located from the current identification interval to the missing tracked subject located in the second preceding identification interval, the system applies "sink" constraints. Sink constraints can include calculating distances between locations of the candidate located subject and of the missing tracked subject to locations in the area of real space that can provide sources and sinks of subjects, such as entrances or exits from the area of the real space. In one implementation, the distance calculation uses a boundary location of the entrance or exit region. The distance of the candidate located subject to the location i.e., $d(p\_2-sink)$ and the distance of the missing tracked subject to the location i.e., $d(p\_0-sink)$ are compared with a distance threshold. If either of these distances is less than the distance threshold, (step 522) and the system can start tracking candidate located subject at step 514. An example of distance threshold at operation 520 is 1 meter, in other implementations, distance threshold values greater than 1 meter or less than 1 meter can be used. In one implementation, the threshold depends on the length (or time duration) of the identification intervals and the distance a subject can move in that time duration. If the sink constraints are satisfied, i.e., both the candidate located subject and the missing tracked subject are positioned farther from entrance and exits by more than the distance threshold, the system can update the missing tracked subject in the database using the candidate located subject located from the current identification interval (operation 524). The process ends at operation 526.

Multiple New Subjects Persistence Analysis

The second example scenario for performing subject persistence analysis using the technology disclosed is presented in FIGS. 6A and 6B. This example considers the scenario in which the set of tracked subjects from a first preceding identification interval includes N members, and the set of located subjects from the current identification interval includes N members plus one or more candidate located subjects. The system can employ logic to make the process of linking N members of the set of located subjects from the current identification interval to N members of the set of tracked subjects from the first preceding identification interval, more efficient. This improvement in efficiency can be achieved by prioritizing members of the set of located subjects from the current identification interval to identify a set of N located subjects to link to the set of N tracked subjects from the first preceding identification interval using relative locations of the located subjects. In one implementation, the prioritization of the members of the set of located subjects from the current identification interval to identify the set of N located subjects can include calculating distance between pairs of located subjects from the current identification interval. The system then identifies the set of N located subjects by comparing the calculated distance with a distance second threshold such as 1 meter. Located members satisfying the distance threshold can be evaluated for matching with tracked member for the preceding identification interval with higher priority than those that do not meet the distance threshold.

The example presented in FIGS. 6A and 6B illustrates this scenario by tracking three subjects 640, 642 and 644 in the first preceding identification interval at $t\_1$ as shown in FIG. 6A. The three tracked subjects 640, 642, and 644 are stored in the subject database 150 with their unique tracking identifiers. Five subjects 640A, 642A, 644A, 646 and 648 are located in the current identification interval at $t\_2$ as shown in FIG. 6B. The set of subjects located in the current identification interval has more than one member subjects not tracked in the first preceding identification interval. The system compares the set of tracked subjects present in the database that are tracked in preceding identification intervals to detect the condition that more than one subjects not tracked in preceding identification intervals are located in the current identification interval.

The system prioritizes the set of subjects (N plus more than one candidate located subjects) located from the current identification interval to determine a set S of located subjects in the current identification interval. In one implementation, the cardinality of the set S is equal to the cardinality of the set N of tracked subjects in preceding identification interval. In other implementation, the cardinality of the set S can be less than the set N of tracked subjects in preceding identification intervals. In one implementation, the membership of set S is determined such that the three dimensional or two dimensional Euclidean distance between any two members in the set S is less than a distance threshold. An example of the distance threshold is 1 meter. In FIG. 6B, a circle 610 identifies the set S of located subjects in the current identification interval which includes subjects 640A, 642A, and 644A. In this example, the cardinality of the set S equals the cardinality of the set N of tracked subjects in the preceding identification interval.

The system includes logic that matches a member of the set S of located subjects in the current identification interval to members of the set N of tracked subjects in the first preceding identification interval. If a member of the set S matches a member of the set N of tracked subjects, the system links the matched located subjects to the matched tracked subjects and updates the tracked subject in the database using the matched located subject. In one implementation, members of the set S of located subjects are matched to members of the set N of tracked subjects in the first preceding identification interval using positions of joints in their respective constellation of joints. The distance between positions of joints of members of the set S of located subjects and the set N of tracked subjects are compared with the second threshold (e.g., 1 meter). If there is a unique match for each member of the set S of located subjects in the current identification interval to a tracked subject in the first preceding identification interval then the system updates the tracked subject in the database using the matched member of the set S of located subjects. Before linking the tracked subject to the located subject in the current identification interval, the system can apply sink constraints as discussed above to the matched located and tracked subjects to determine that they are away from the exits and entrances to the area of real space by more than a third threshold distance.

Figure 7:
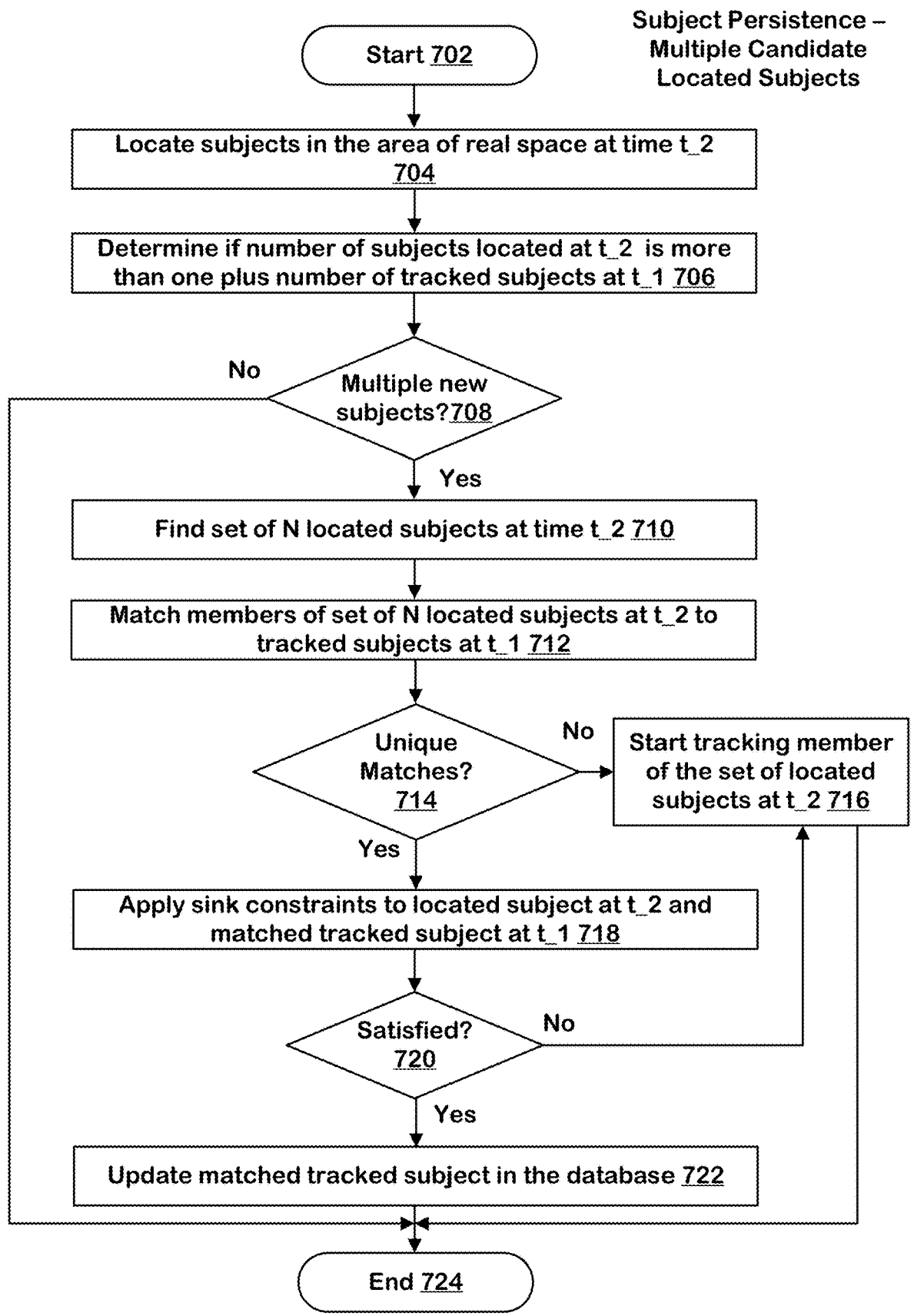
FIG. 7 is an example flow chart illustrating operations for matching subjects located in the current identification interval to tracked subjects in the first preceding identification interval when more than one located subjects in the current identification interval are not matched with any tracked subject in the first preceding identification interval.

FIG. 7 presents a process flowchart to perform subject persistence in the above described scenario. The process starts at operation 702. The system locates subjects in the area of real space in the current identification interval at operation 704. The number of located subjects in the current identification interval is compared to the number of tracked subjects in the first preceding identification interval at operation 706. For example, consider the example illustration in FIG. 6B indicating five subjects located in the current identification interval. Suppose there were three subjects tracked in the first preceding identification interval. By comparing the number of located subjects in the current identification interval to the number of tracked subjects in the first preceding identification interval, the system determines that more than one candidate subjects are located in the current identification interval (operation 708). In one implementation, the system compares the number of located subjects in the current identification interval to the number of tracked subjects in preceding identification interval to determine that more than one candidate subjects are located in the current identification interval at operation 706. In other words, the number of located subjects in the current identification interval is more than one plus the number of tracked subjects in the preceding identification interval. If there is only one additional member in the current identification interval, then the technique presented above in FIG. 5 can be applied. If there is only one additional member in the current identification interval and that member is positioned close to a designated unmonitored location in the area of real space (such as a restroom) then the technique presented below in FIG. 9 can be used.

The system identifies a set S of located subjects in the current identification interval (step 710) as explained in the following example. Consider M_2 subjects are located in the current identification interval at time t_2, whereas the subjects M_2 are indexed as 0, 1, 2, . . . , M_2−1 and M_0 subjects are tracked in the first preceding identification interval at time t_1, indexed as 0, 1, 2, . . . , M_0−1. Further, suppose that locations of the located subjects in the current identification interval are represented as p_{2, i} for i=0, 1, 2, . . . , M_2−1 and locations of the tracked subjects in the first preceding identification interval are represented as q_{0, i} for i=0, 1, 2, . . . , M_0−1. At the step 710, a set S of located subjects in the current identification interval is determined such that for any two subjects p_{2, i} and p_{2, j} the distanced (p_{2, i}, p_{2, j}) is less than a second threshold, e.g., 1 meter. The distance can be calculated in the 3D real space or 2D image space using locations of joints in the constellation of joints of respective subjects. It is understood that other values of the distance threshold greater than or less than 1 meter can be used.

The members of the set S of located subjects are then matched to tracked subjects in the first preceding identification interval at operation 712. The location of each located subjects p_{2, i} member of the set S is matched to locations of tracked subjects q_{0, j} in the first preceding identification interval to determine the distance d (p_{2, i}, q_{0, j}). If the distance "d" is less than a second threshold, such as 1 meter, and one member p_{2, i} in the set S of located subjects matches to only one tracked subject q_{0, j} using the above threshold, then the system determines that there is a match between the located subject and tracked subject located in the preceding identification interval (operation 714).

If a member of the set S of located subjects does not match to a tracked subject in the above process step, the located subject can be assigned a new tracking identifier at operation 716. The system can then start tracking the located subject in the current identification interval. The subject is stored in the subject database with a unique tracking identifier.

When a member of the set S of located subjects in the current identification interval is matched to a tracked subject in the first preceding identification interval, the system determines that no other member of the set S of located subjects matches that tracked subject. For a member p_{2, i} of the set S of located subjects that uniquely matches to a tracked subject q_{0, j}, the sink constraints are applied at operation 718. The sink constraints determine if the member of the set S of located subjects or the tracked subject are closer to an entrance to or exit from the area of real space by a third threshold distance as described in operation 520 in the flowchart in FIG. 5. If the sink constraint is satisfied (operation 720) for the member of the set S of the located subjects and the tracked subject (i.e., both the member of the set S of located subjects and the tracked subject are farther from the sink than the third threshold), the tracked subject q_{0, j} in the first preceding identification interval is updated in the database using the member p_{2, i} of the set S of located subjects (operation 722). The process ends at operation 724.

Subject Persistence Analysis for Designated Unmonitored Location

Figure 8A:
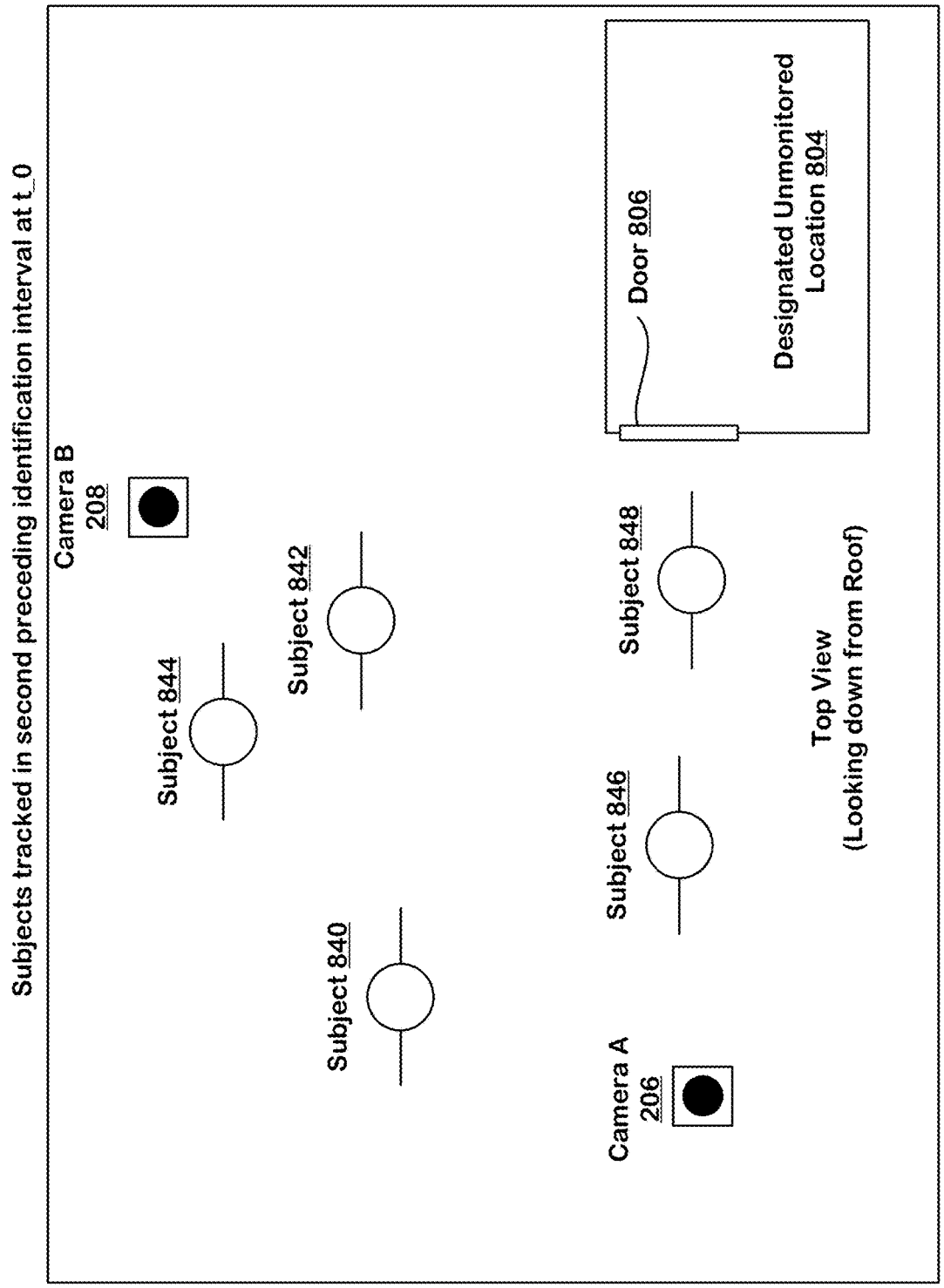
FIG. 8A shows an area of real space with a designated unmonitored location and a tracked subject located in a second preceding identification interval, positioned close to the designated unmonitored location.
Figure 8B:
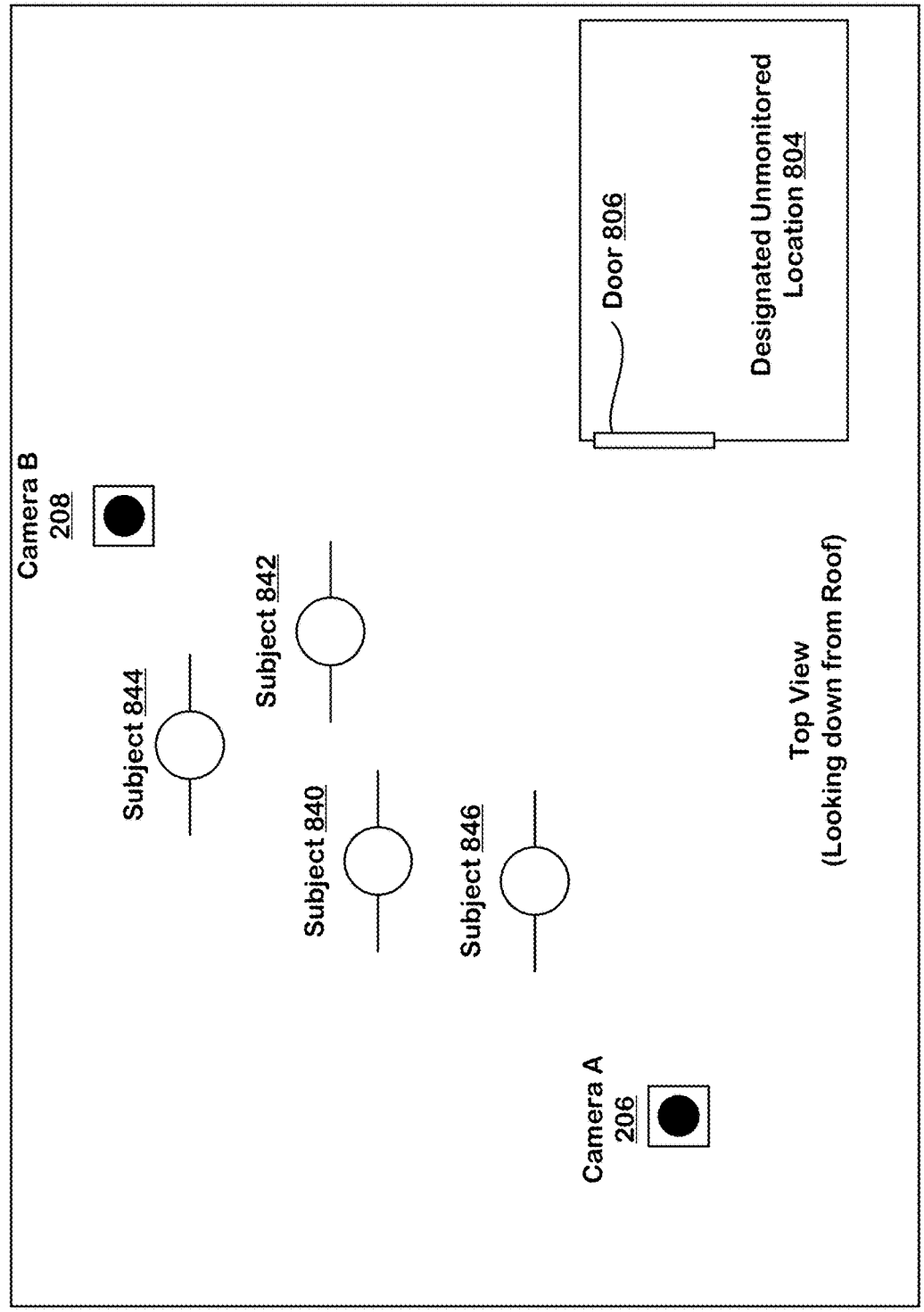
FIG. 8B shows the area of real space with tracked subjects located in a first preceding identification interval and the tracked subject of FIG. 8A positioned close to the designated unmonitored location missing in the first preceding identification interval.
Figure 8C:
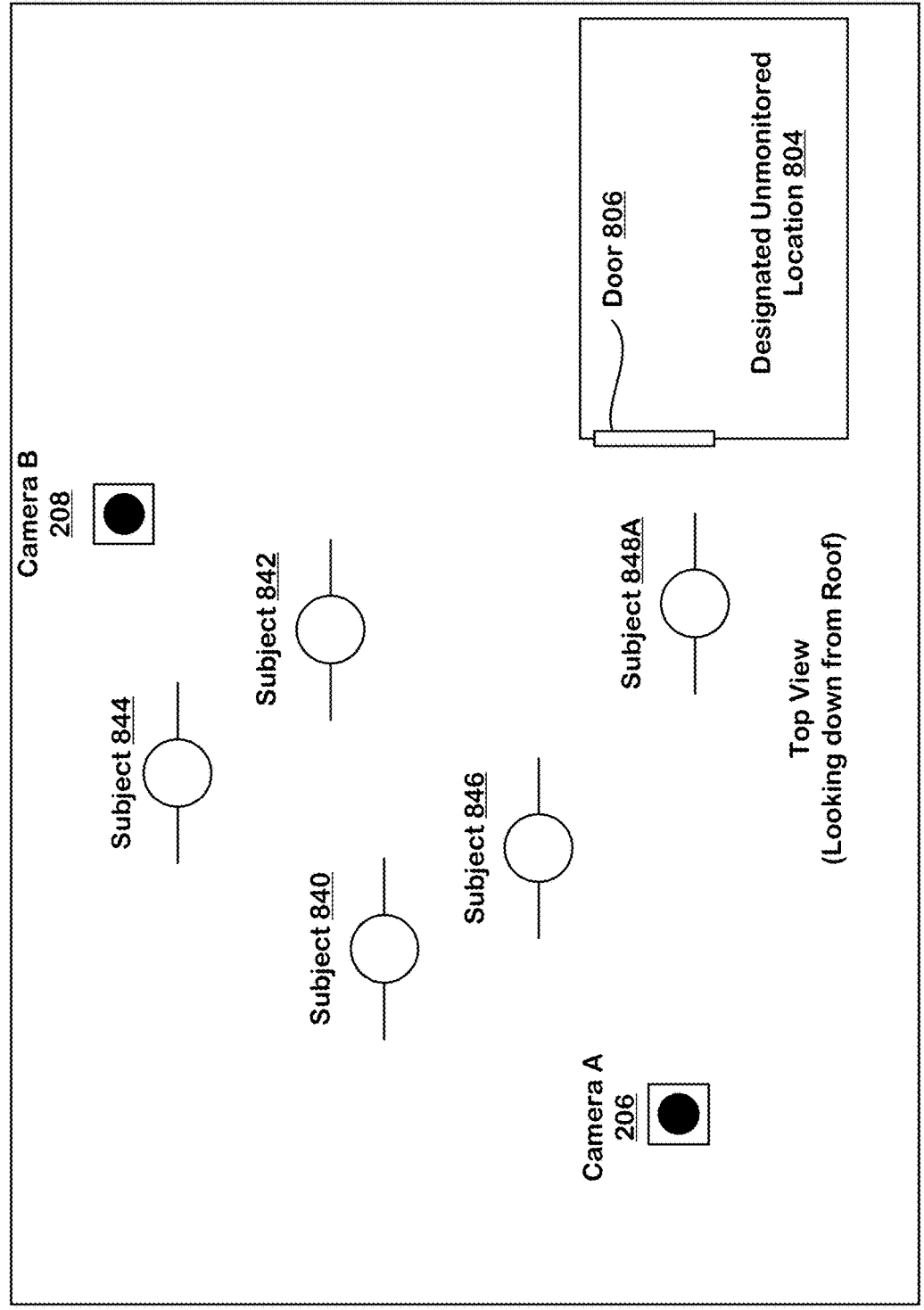
FIG. 8C shows subjects located in the current identification interval in the area of real space including a candidate located subject positioned close to the designated unmonitored location.

A third example scenario for performing subject persistence analysis using the technology disclosed is presented in FIGS. 8A to 8C. This example illustrates subject persistence when a subject moves to a designated unmonitored location, such as a restroom, in the area of real space. The subject is then not tracked in the following one or more identification intervals during which the subject is present in the designated unmonitored location. The system again locates the missing tracked subject during a following identification interval in which the subject moves out of the designated unmonitored location and is positioned in the field of view of one or more cameras 114.

FIG. 8A illustrates a top view (looking downwards) of an area of real space that includes a designated unmonitored location 804 such as a restroom. The designated unmonitored location 804 is not in the field of view of cameras 114. Subjects can enter or leave the designated unmonitored location through a door 806. There are five subjects 840, 842, 844, 846, and 848 in the set of tracked subjects in a second preceding identification interval at time t_0 as shown in FIG. 8A. In a first preceding identification interval at time t_1, there are four tracked subjects 840, 842, 844, and 846 in the set of tracked subjects as shown in FIG. 8B. The tracked subject 848 in the second preceding identification interval is missing in the first preceding identification interval. The location of the missing tracked subject 848 is close to the designated unmonitored location in the second preceding identification interval before the first preceding identification interval in which the subject 848 is missing.

FIG. 8C shows a candidate located subject 848A positioned near the designated unmonitored location 804 in a current identification interval at time t_2 after the first preceding identification interval at time t_1. Before starting to track the candidate located subject 848A in the current identification interval, the technology disclosed performs the subject persistence analysis to link the candidate located subject 848A to the missing tracked subject 848. The missing tracked subject 848 was located in the second preceding identification interval but was not located in the first preceding identification interval following the second preceding identification interval. Before the candidate located subject is matched to the missing tracked subject, the technology disclosed can determine that no subject (other than the missing tracked subject 848) was present close to the designated unmonitored location in the second preceding identification interval and no other subject (other than the missing tracked subject 848) entered the designated unmonitored location in the first preceding identification interval.

The system matches the locations of all tracked subjects in the second preceding identification interval to the location of designated unmonitored location to determine that only the missing tracked subject 848 is positioned close to the unmonitored location in the second preceding identification interval. In one implementation, a distance is calculated between locations of the tracked subjects in the second preceding identification interval and a point (in 3D real space or 2D image space) on the door 806. The system determines which tracked subjects are close to the designated unmonitored location 804 by comparing their respective distances to the designated unmonitored location with a third threshold. An example value of the third threshold distance is 1 meter. If missing tracked subject 848 is the only subject close to the door 806 in the second preceding identification interval and the candidate subject 848A is the only candidate located subject located from the current identification interval who is positioned close to the designated unmonitored location, then the system links the missing tracked subject 848 to the candidate located subject 848A. The system updated the missing tracked subject 848 in the database using the candidate located subject 848A in the current identification interval and continues tracking the subject 848 in the current identification interval.

Figure 9:
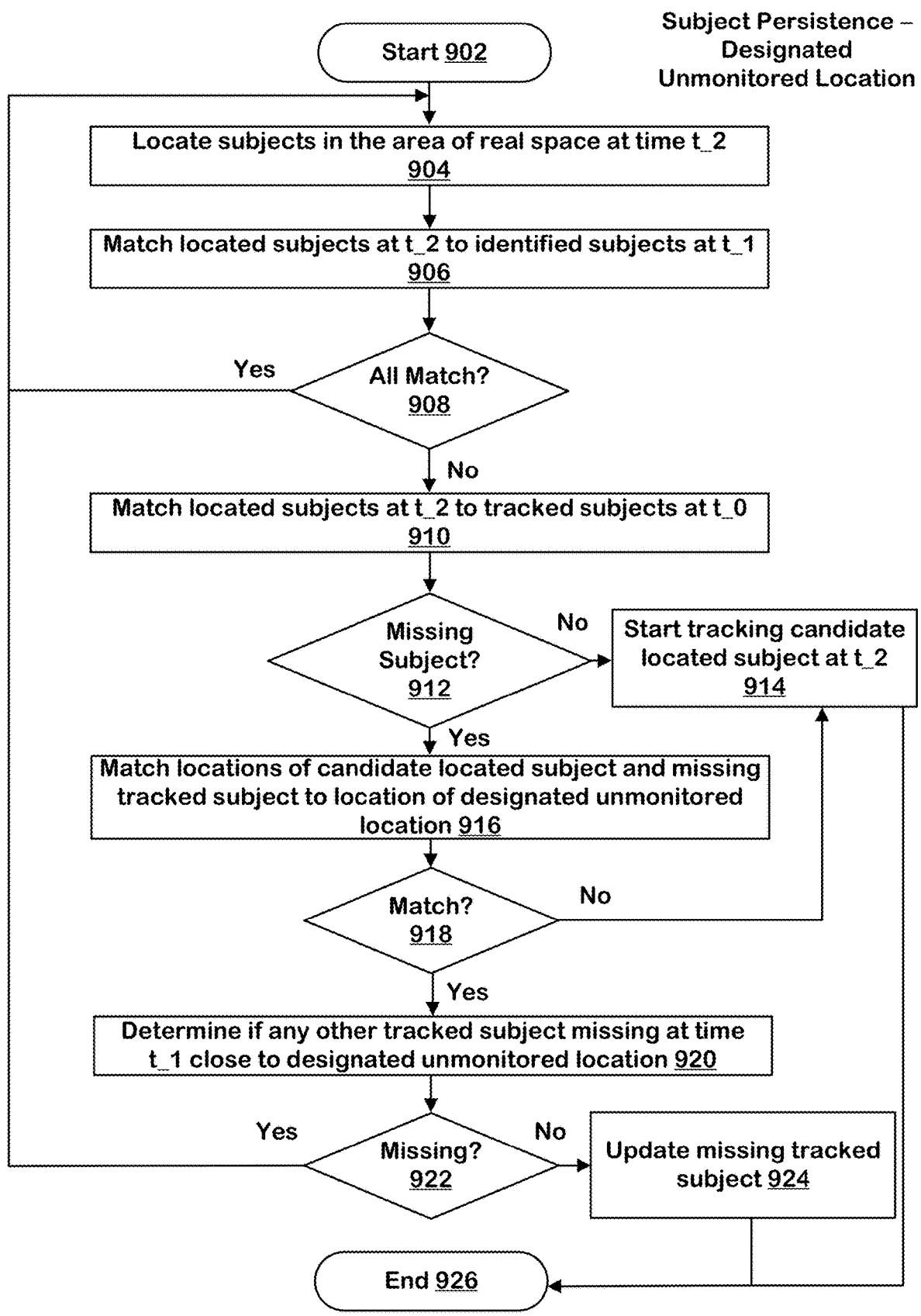
FIG. 9 is an example flow chart presenting operations to match the candidate located subject close to the designated unmonitored location to a missing tracked subject.

FIG. 9 is a flowchart presenting operations to link a candidate located subject located from the current identification interval to a missing tracked subject in the second preceding identification interval if both the candidate located subject and the missing tracked subject are positioned close to the designated unmonitored location in respective identification intervals. The process starts at operation 902. Operations 904, 906, 908, 910, and 912 perform similar operations as described for operations 504, 506, 508, 510, and 512 respectively. At operation 916, the distances of the tracked subjects in the second preceding identification interval and the located subjects in the current identification interval to a designated unmonitored location are calculated. Suppose there are M_0 subjects in the set of tracked subjects in the second preceding identification interval and the tracked subjects are indexed as 0, 1, 2, . . . , k−1. The locations of the tracked subjects are given as p_0, p_1, p_2, . . . , p_{k−1}, respectively. The system calculates distances of the tracked subjects to location of the designated unmonitored location as d(p_i, B) where B is the location of the designated unmonitored location in the three dimensional real space or two dimensional image space.

The distances of the tracked subjects to the designated unmonitored location are compared with a distance threshold such as 1 meter. If only one tracked subject in the second preceding identification interval is positioned closer to the designated unmonitored location than the third threshold, a similar distance calculation between locations of subjects located in the current identification interval and location of the designated unmonitored location is performed. If only one subject located in the current identification interval is positioned closer to the unmonitored designated location, then the condition at operation 918 becomes true. Otherwise, the system can assign a new tracking identifier to the candidate located subject located from the current identification interval and starts tracking the subject (operation 914).

As part of linking the missing tracked subject located in the second preceding identification interval to the candidate located subject located from the current identification interval, additional constraints can be checked at operation 920. It is determined that no other tracked subjects from the second preceding identification interval and the first preceding identification intervals who were located closer to the designated unmonitored location than the distance threshold (other than the missing tracked subject at operation 910) are missing in the current identification interval. This is to avoid incorrect matching of the candidate located subject to the missing tracked subject. If only one tracking subject positioned close to the designated unmonitored location in the second preceding identification interval is not tracked in the first preceding identification interval and only one candidate subject is located close to the designated unmonitored location in the current identification interval, then the system checks the following constraint. The system determines that no other tracked subject entered the designated unmonitored location (operation 922) by performing operations 904 to

912. If no other tracked subject entered the designated unmonitored location in the second preceding identification interval and the first preceding identification interval then the system links the missing tracked subject located in the second preceding identification interval using the candidate located subject located from the current identification interval (operation 924). The system then continues tracking the missing tracked subject in the current identification interval using the location of the candidate located subject. The process ends at operation 926.

Network Configuration

Figure 10:
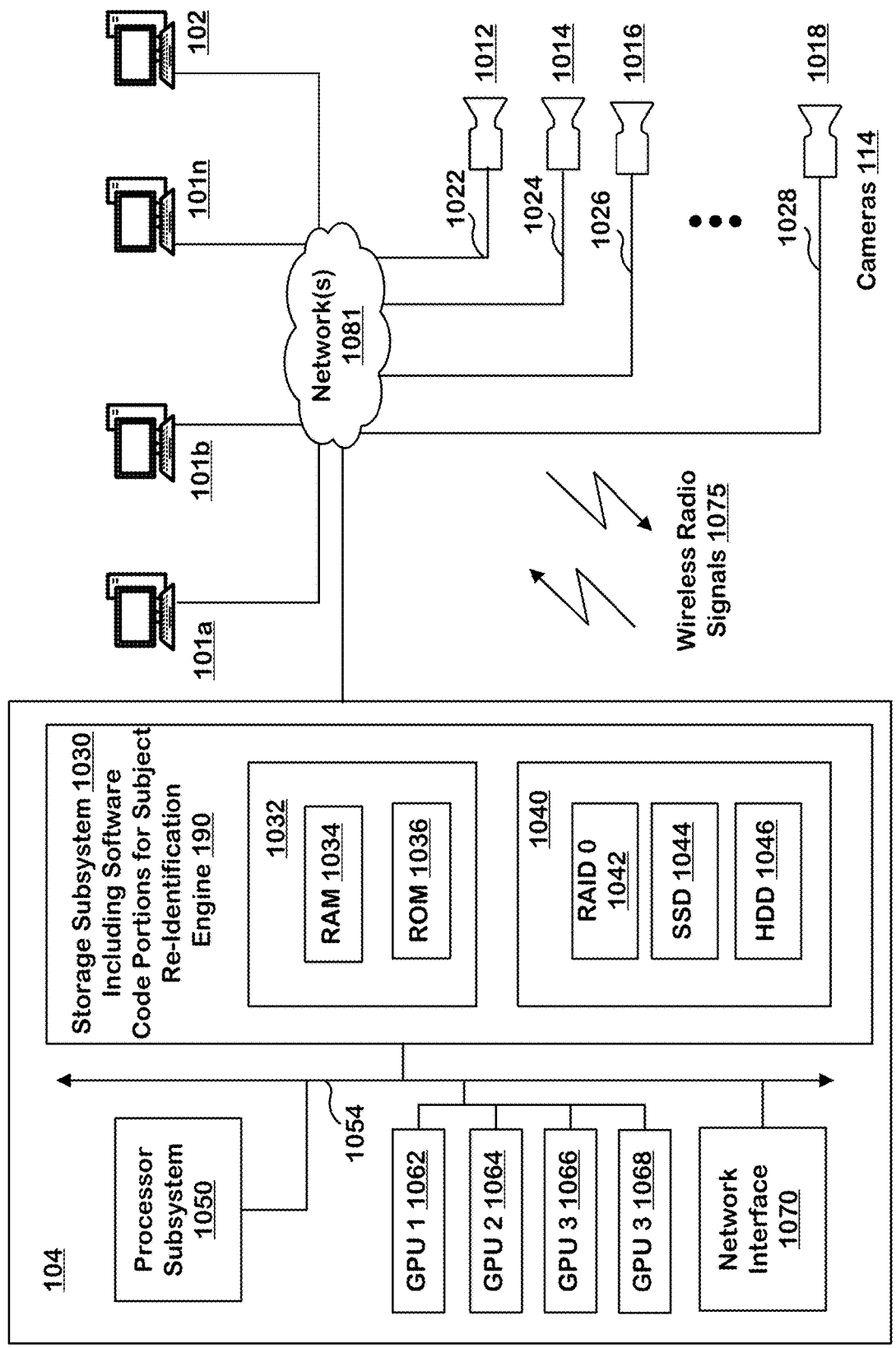
FIG. 10 is a camera and computer hardware arrangement configured for hosting the subject persistence processing engine of FIG. 1.

FIG. 10 presents architecture of a network hosting the subject re-identification engine 190 which is hosted on the network node 105. The system includes a plurality of network nodes 101*a*, 101*b*, 101*n*, and 102 in the illustrated implementation. In such an implementation, the network nodes are also referred to as processing platforms. Processing platforms (network nodes) 101*a*, 101*b*, 101*n*, 102, 103, 104, and 105 and cameras 1012, 1014, 1016, . . . , 1018 are connected to network(s) 1081.

FIG. 10 shows a plurality of cameras 1012, 1014, 1016, . . . , 1018 connected to the network(s). A large number of cameras can be deployed in particular systems. In one implementation, the cameras 1012 to 1018 are connected to the network(s) 1081 using Ethernet-based connectors 1022, 1024, 1026, and 1028, respectively. In such an implementation, the Ethernet-based connectors have a data transfer speed of 1 gigabit per second, also referred to as Gigabit Ethernet. It is understood that in other implementations, cameras 114 are connected to the network using other types of network connections which can have a faster or slower data transfer rate than Gigabit Ethernet. Also, in alternative implementations, a set of cameras can be connected directly to each processing platform, and the processing platforms can be coupled to a network.

Storage subsystem 1030 stores the basic programming and data constructs that provide the functionality of certain implementations of the technology disclosed. For example, the various modules implementing the functionality of the subject re-identification engine 190 may be stored in storage subsystem 1030. The storage subsystem 1030 is an example of a computer readable memory comprising a non-transitory data storage medium, having computer instructions stored in the memory executable by a computer to perform all or any combination of the data processing and image processing functions described herein including logic to detect tracking errors and logic to re-identify subjects with incorrect track_IDs, logic to link subjects in an area of real space with a user account, to determine locations of tracked subjects represented in the images, match the tracked subjects with user accounts by identifying locations of mobile computing devices executing client applications in the area of real space by processes as described herein. In other examples, the computer instructions can be stored in other types of memory, including portable memory, that comprise a non-transitory data storage medium or media, readable by a computer.

These software modules are generally executed by a processor subsystem 1050. A host memory subsystem 1032 typically includes a number of memories including a main random access memory (RAM) 1134 for storage of instructions and data during program execution and a read-only memory (ROM) 1036 in which fixed instructions are stored. In one implementation, the RAM 1034 is used as a buffer for storing re-identification vectors generated by the subject re-identification engine 190.

A file storage subsystem 1040 provides persistent storage for program and data files. In an example implementation, the storage subsystem 1040 includes four 120 Gigabyte (GB) solid state disks (SSD) in a RAID 0 (redundant array of independent disks) arrangement identified by a numeral 1042. In the example implementation, maps data in the maps database 140, subjects data in the subjects database 150, heuristics in the persistence heuristics database 160, training data in the training database 162, account data in the user database 164 and image/video data in the image database 166 which is not in RAM, is stored in RAID 0. In the example implementation, the hard disk drive (HDD) 1046 is slower in access speed than the RAID 0 1042 storage. The solid state disk (SSD) 1044 contains the operating system and related files for the subject re-identification engine 190.

In an example configuration, four cameras 1012, 1014, 1016, 1018, are connected to the processing platform (network node) 103. Each camera has a dedicated graphics processing unit GPU 1 1062, GPU 2 1064, GPU 3 1066, and GPU 4 1068, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1050, the storage subsystem 1030 and the GPUs 1062, 1064, and 1066 communicate using the bus subsystem 1054.

A network interface subsystem 1070 is connected to the bus subsystem 1054 forming part of the processing platform (network node) 104. Network interface subsystem 1070 provides an interface to outside networks, including an interface to corresponding interface devices in other computer systems. The network interface subsystem 1070 allows the processing platform to communicate over the network either by using cables (or wires) or wirelessly. The wireless radio signals 1075 emitted by the mobile computing devices 120 in the area of real space are received (via the wireless access points) by the network interface subsystem 1170 for processing by the account matching engine 170. A number of peripheral devices such as user interface output devices and user interface input devices are also connected to the bus subsystem 1154 forming part of the processing platform (network node) 104. These subsystems and devices are intentionally not shown in FIG. 10 to improve the clarity of the description. Although bus subsystem 1054 is shown schematically as a single bus, alternative implementations of the bus subsystem may use multiple busses.

In one implementation, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300–∞, a field of view field of view with a ⅓" sensor of 98.2°–23.8°. The cameras 114 can be any of Pan-Tilt-Zoom cameras, 360-degree cameras, and/or combinations thereof that can be installed in the real space.

Subject Identification Analysis

The following description provides examples of algorithms for identifying tracked subjects by matching them to their respective user accounts. As described above, the technology disclosed links located subjects in the current identification interval to tracked subjects in preceding identification intervals by performing subject persistence analysis. In the case of a cashier-less store the subjects move in the aisles and open spaces of the store and take items from shelves. The technology disclosed associates the items taken by tracked subjects to their respective shopping cart or log data structures. The technology disclosed uses one of the following check-in techniques to identify tracked subjects and match them to their respective user accounts. The user accounts have information such as preferred payment method for the identified subject. The technology disclosed can automatically charge the preferred payment method in the user account in response to identified subject leaving the shopping store. In one implementation, the technology disclosed compares located subjects in current identification interval to tracked subjects in previous identification intervals in addition to comparing located subjects in current identification interval to identified (or checked in) subjects (linked to user accounts) in previous identification intervals. In another implementation, the technology disclosed compares located subjects in current identification interval to tracked subjects in previous intervals in alternative to comparing located subjects in current identification interval to identified (or tracked and checked-in) subjects (linked to user accounts) in previous identification intervals.

Figure 11:
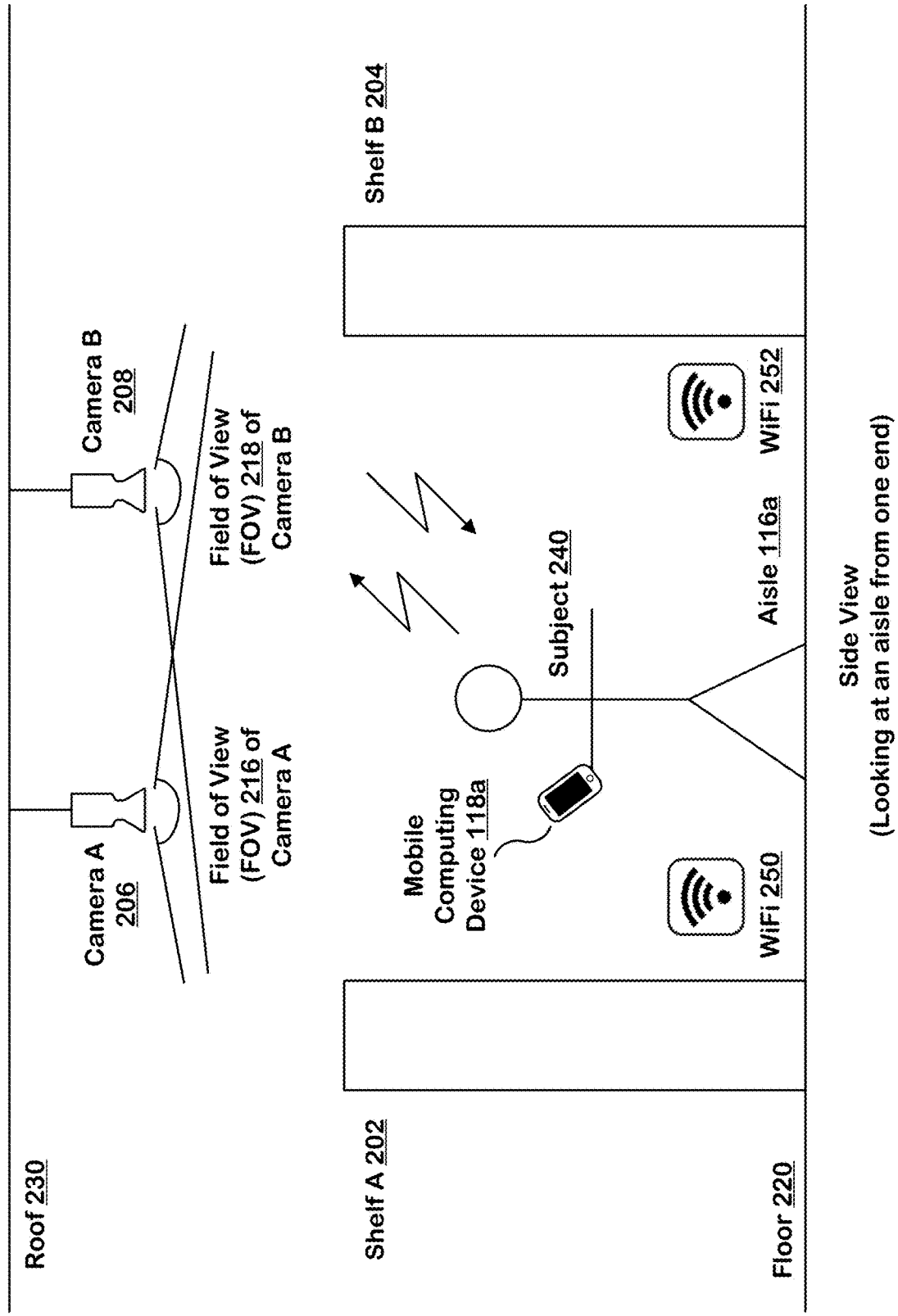
FIG. 11 is a side view of an aisle in a shopping store illustrating a subject with a mobile computing device and a camera arrangement.

In a shopping store, the shelves and other inventory display structures can be arranged in a variety of manners, such as along the walls of the shopping store, or in rows forming aisles or a combination of the two arrangements. FIG. 11 shows an arrangement of shelves, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelves. The cameras 114 comprise cameras disposed over and having fields of view encompassing respective parts of the inventory display structures and floor area in the real space. The coordinates in real space of members of a set of candidate joints, located as a subject, identify locations of the subject in the floor area. In FIG. 11, the subject 240 is holding the mobile computing device 118a and standing on the floor 220 in the aisle 116a. The mobile computing device can send and receive signals through the wireless network(s) 181. In one example, the mobile computing devices 120 communicate through a wireless network using for example a Wi-Fi protocol, or other wireless protocols like Bluetooth, ultra-wideband, and ZigBee, through wireless access points (WAP) 250 and 252.

In the example implementation of the shopping store, the real space can include all of the floor 220 in the shopping store from which inventory can be accessed. Cameras 114 are placed and oriented such that areas of the floor 220 and shelves can be seen by at least two cameras. The cameras 114 also cover at least part of the shelves 202 and 204 and floor space in front of the shelves 202 and 204. Camera angles are selected to have both steep perspective, straight down, and angled perspectives that give more full body images of the customers. In one example implementation, the cameras 114 are configured at an eight (8) foot height or higher throughout the shopping store.

In FIG. 11, the cameras 206 and 208 have overlapping fields of view, covering the space between a shelf A 202 and a shelf B 204 with overlapping fields of view 216 and 218, respectively. A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration.

Figure 12:
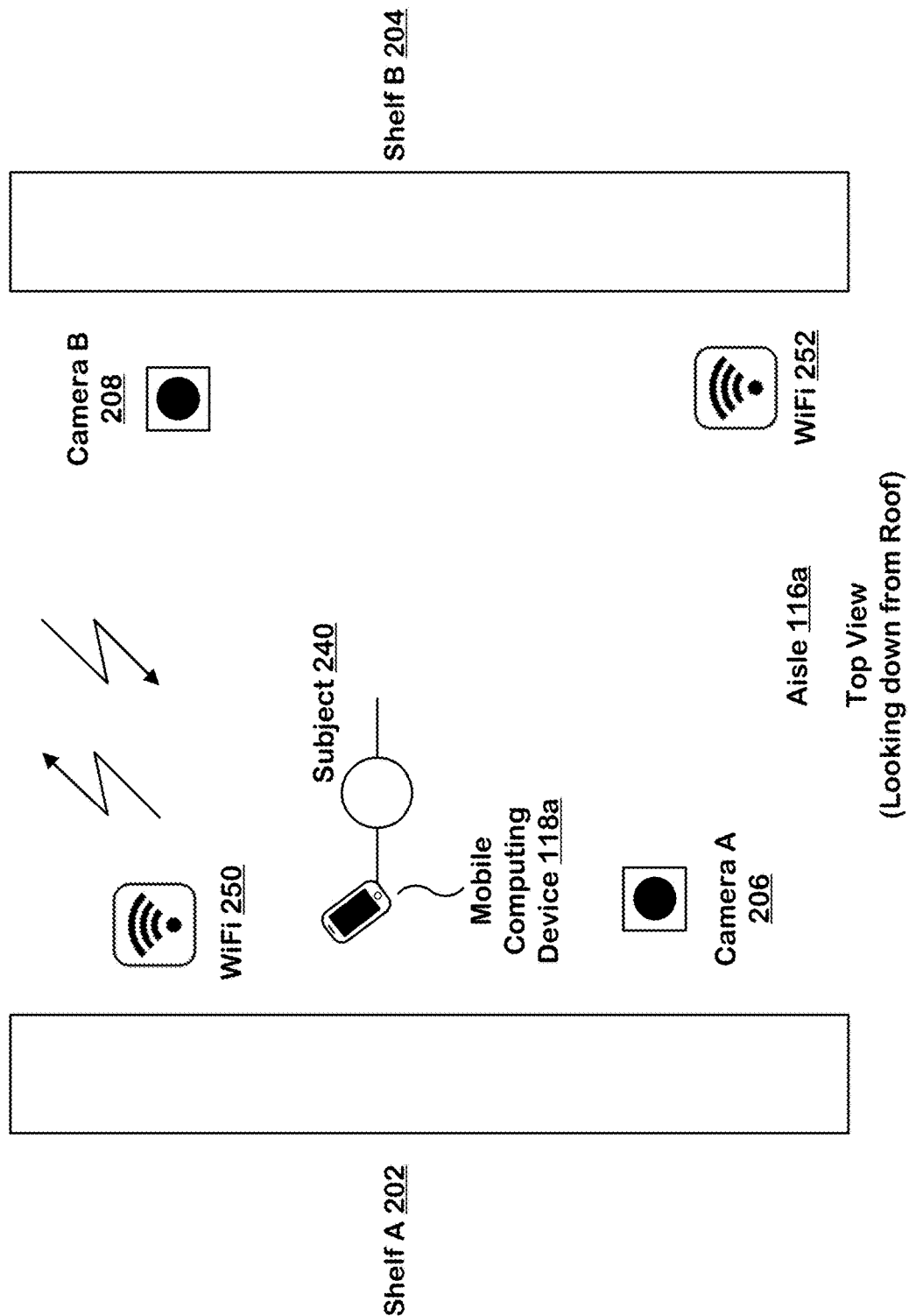
FIG. 12 is a top view of the aisle of FIG. 11 in a shopping store illustrating the subject with the mobile computing device and the camera arrangement.

FIG. 12 illustrates the aisle 116a viewed from the top of FIG. 11, further showing an example arrangement of the positions of cameras 206 and 208 over the aisle 116a. The cameras 206 and 208 are positioned closer to opposite ends of the aisle 116a. The camera A 206 is positioned at a predetermined distance from the shelf A 202 and the camera B 208 is positioned at a predetermined distance from the shelf B 204. In another implementation, in which more than two cameras are positioned over an aisle, the cameras are positioned at equal distances from each other. In such an implementation, two cameras are positioned close to the opposite ends and a third camera is positioned in the middle of the aisle. It is understood that a number of different camera arrangements are possible.

Account Matching Engine

The account matching engine 170 includes logic to identify tracked subjects by matching them with their respective user accounts by identifying locations of mobile devices (carried by the tracked subjects) that are executing client applications in the area of real space. In one implementation, the account matching engine 170 uses multiple techniques, independently or in combination, to match the tracked subjects with the user accounts. The system can be implemented without maintaining biometric identifying information about users, so that biometric information about account holders is not exposed to security and privacy concerns raised by distribution of such information.

In one implementation, a customer (or a subject) logs in to the system using a client application executing on a personal mobile computing device upon entering the shopping store, identifying an authentic user account to be associated with the client application on the mobile device. The system then sends a "semaphore" image selected from the set of unassigned semaphore images in the image database 166 to the client application executing on the mobile device. The semaphore image is unique to the client application in the shopping store as the same image is not freed for use with another client application in the store until the system has matched the user account to a tracked subject. After that matching, the semaphore image becomes available for use again. The client application causes the mobile device to display the semaphore image, which display of the semaphore image is a signal emitted by the mobile device to be detected by the system. The account matching engine 170 uses the image recognition engines 112a, 112b, and 112n or a separate image recognition engine (not shown in FIG. 1) to recognize the semaphore image and determine the location of the mobile computing device displaying the semaphore in the shopping store. The account matching engine 170 matches the location of the mobile computing device to a location of a tracked subject. The account matching engine 170 then links the tracked subject (stored in the subject database 150) to the user account (stored in the user account database 164 or the user database 164) linked to the client application for the duration in which the subject is present in the shopping store. No biometric identifying information is used for identifying the subject by matching the tracking subject with the user account, and none is stored in support of this process. That is, there is no information in the sequences of images used to compare with stored biometric information for the purposes of matching the tracked subjects with user accounts in support of this process.

In other implementations, the account matching engine 170 uses other signals in the alternative or in combination from the mobile computing devices 120 to link the tracked subjects to user accounts. Examples of such signals include a service location signal identifying the position of the mobile computing device in the area of the real space, speed and orientation of the mobile computing device obtained from the accelerometer and compass of the mobile computing device, etc.

In some implementations, though implementations are provided that do not maintain any biometric information about account holders, the system can use biometric information to assist matching a not-yet-linked tracked subject to a user account. For example, in one implementation, the system stores "hair color" of the customer in his or her user account record. During the matching process, the system might use for example hair color of subjects as an additional input to disambiguate and match the tracked subject to a user account. If the user has red colored hair and there is only one subject with red colored hair in the area of real space or in close proximity of the mobile computing device, then the system might select the subject with red hair color to match the user account. The details of account matching engine are presented in U.S. patent application Ser. No. 16/255,573, entitled, "Systems and Methods to Check-in Shoppers in a Cashier-less Store," filed on 23 Jan. 2019, now issued as U.S. Pat. No. 10,650,545, which is fully incorporated into this application by reference.

The flowcharts in FIGS. 13 to 16C present operations of four techniques usable alone or in combination by the account matching engine 170.

Semaphore Images

Figure 13:
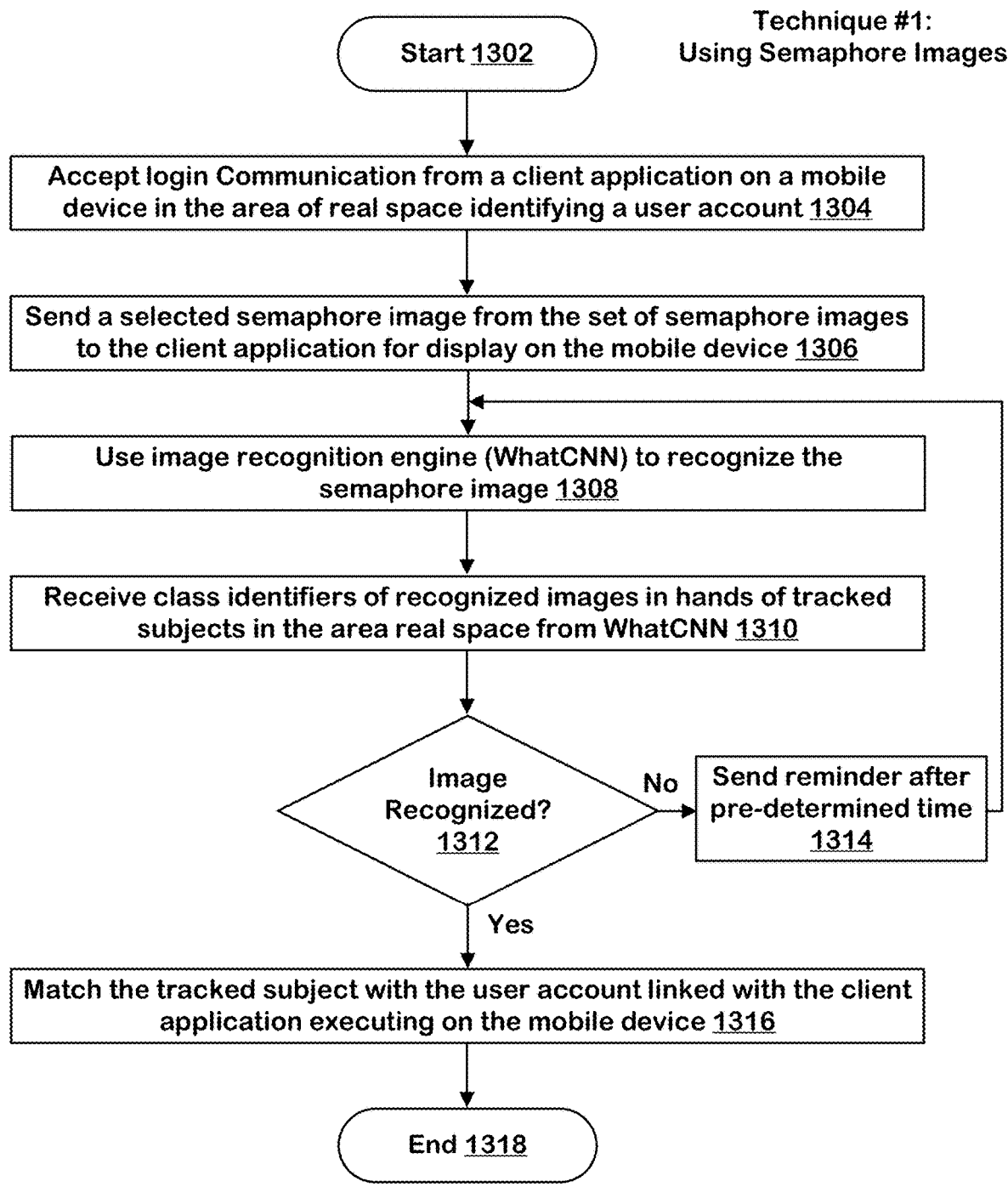
FIG. 13 is a flowchart showing operations for identifying a subject by matching the tracked subject to a user account using a semaphore image displayed on a mobile computing device.

FIG. 13 is a flowchart 1300 presenting operations for a first technique to identify subject by matching tracked subjects in the area of real space with their respective user accounts. In the example of a shopping store, the subjects are customers (or shoppers) moving in the store in aisles between shelves and other open spaces. The process starts at operation 1302. As a subject enters the area of real space, the subject opens a client application on a mobile computing device and attempts to login. The system verifies the user credentials at operation 1304 (for example, by querying the user account database 164) and accepts login communication from the client application to associate an authenticated user account with the mobile computing device. The system determines that the user account of the client application is not yet linked to a tracked subject. The system sends a semaphore image to the client application for display on the mobile computing device at operation 1306. Examples of semaphore images include various shapes of solid colors such as a red rectangle or a pink elephant, etc. A variety of images can be used as semaphores, preferably suited for high confidence recognition by the image recognition engine. Each semaphore image can have a unique identifier. The processing system includes logic to accept login communications from a client application on a mobile device identifying a user account before matching the user account to a tracked subject in the area of real space, and after accepting login communications sends a selected semaphore image from the set of semaphore images to the client application on the mobile device.

In one implementation, the system selects an available semaphore image from the image database 160 for sending to the client application. After sending the semaphore image to the client application, the system changes a status of the semaphore image in the image database 166 as "assigned" so that this image is not assigned to any other client application. The status of the image remains as "assigned" until the process to match the tracked subject to the mobile computing device is complete. After matching is complete, the status can be changed to "available." This allows for rotating use of a small set of semaphores in a given system, simplifying the image recognition problem.

The client application receives the semaphore image and displays it on the mobile computing device. In one implementation, the client application also increases the brightness of the display to increase the image visibility. The image is captured by one or more cameras 114 and sent to an image processing engine, referred to as WhatCNN. The system uses WhatCNN at operation 1308 to recognize the semaphore images displayed on the mobile computing device. In one implementation, WhatCNN is a convolutional neural network trained to process the specified bounding boxes in the images to generate a classification of hands of the tracked subjects. One trained WhatCNN processes image frames from one camera. In the example implementation of the shopping store, for each hand joint in each image frame, the WhatCNN identifies whether the hand joint is empty. The WhatCNN also identifies a semaphore image identifier (in the image database 166) or an SKU (stock keeping unit) number of the inventory item in the hand joint, a confidence value indicating the item in the hand joint is a non-SKU item (i.e., it does not belong to the shopping store inventory) and a context of the hand joint location in the image frame.

As mentioned above, two or more cameras with overlapping fields of view capture images of subjects in real space. Joints of a single subject can appear in image frames of multiple cameras in a respective image channel. A What-CNN model per camera identifies semaphore images (displayed on mobile computing devices) in hands (represented by hand joints) of subjects. A coordination logic combines the outputs of WhatCNN models into a consolidated data structure listing identifiers of semaphore images in left hand (referred to as left_hand_classid) and right hand (right_hand_classid) of tracked subjects (operation 1310). The system stores this information in a dictionary mapping tracking_id to left_hand_classid and right_hand_classid along with a timestamp, including locations of the joints in real space. The details of WhatCNN are presented in U.S. patent application Ser. No. 15/907,112, entitled, "Item Put and Take Detection Using Image Recognition," filed on 27 Feb. 2018, now issued as U.S. Pat. No. 10,133,933 which is fully incorporated into this application by reference.

At step 1312, the system checks if the semaphore image sent to the client application is recognized by the WhatCNN by iterating the output of the WhatCNN models for both hands of all tracked subjects. If the semaphore image is not recognized, the system sends a reminder at operation 1314 to the client application to display the semaphore image on the mobile computing device and repeats operations 1308 to 1312. Otherwise, if the semaphore image is recognized by WhatCNN, the system matches a user_account (from the user account database 164) associated with the client application to tracking_id (from the subject database 150) of the tracked subject holding the mobile computing device (operation 1316). In one implementation, the system maintains this mapping (tracking_id-user_account) until the subject is present in the area of real space. In one implementation, the system assigns a unique subject identifier (e.g., referred to by subject_id) to the identified subject and stores a mapping of the subject identifier to the tuple tracking_id-user_account. The process ends at operation 1318.

Service Location

Figure 14:
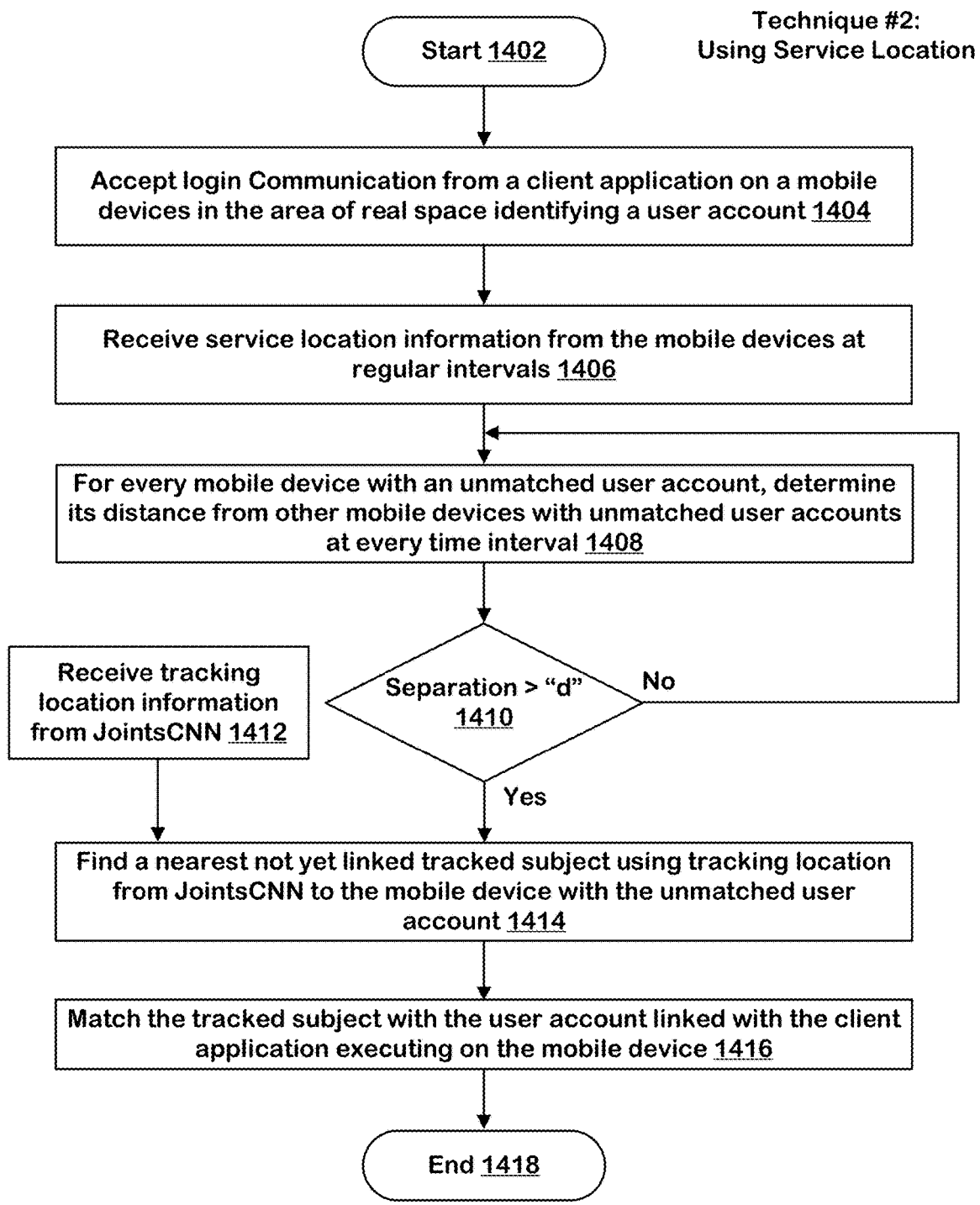
FIG. 14 is a flowchart showing operations for identifying a subject by matching a tracked subject to a user account using service location of a mobile computing device.

The flowchart 1400 in FIG. 14 presents operations for a second technique for identifying subjects by matching tracked subjects with user accounts. This technique uses radio signals emitted by the mobile devices indicating location of the mobile devices. The process starts at operation 1402, the system accepts login communication from a client application on a mobile computing device as described above in operation 1404 to link an authenticated user account to the mobile computing device. At operation

1406, the system receives service location information from the mobile devices in the area of real space at regular intervals. In one implementation, latitude and longitude coordinates of the mobile computing device emitted from a global positioning system (GPS) receiver of the mobile computing device are used by the system to determine the location. In one implementation, the service location of the mobile computing device obtained from GPS coordinates has an accuracy between 1 to 3 meters. In another implementation, the service location of a mobile computing device obtained from GPS coordinates has an accuracy between 1 to 5 meters.

Other techniques can be used in combination with the above technique or independently to determine the service location of the mobile computing device. Examples of such techniques include using signal strengths from different wireless access points (WAP) such as 250 and 252 shown in FIGS. 11 and 12 as an indication of how far the mobile computing device is from respective access points. The system then uses known locations of wireless access points (WAP) 250 and 252 to triangulate and determine the position of the mobile computing device in the area of real space. Other types of signals (such as Bluetooth, ultra-wideband, and ZigBee) emitted by the mobile computing devices can also be used to determine a service location of the mobile computing device.

The system monitors the service locations of mobile devices with client applications that are not yet linked to a tracked subject at operation 1408 at regular intervals such as every second. At operation 1408, the system determines the distance of a mobile computing device with an unmatched user account from all other mobile computing devices with unmatched user accounts. The system compares this distance with a pre-determined threshold distance "d" such as 3 meters. If the mobile computing device is away from all other mobile devices with unmatched user accounts by at least "d" distance (operation 1410), the system determines a nearest not yet linked subject to the mobile computing device (operation 1414). The location of the tracked subject is obtained from the output of the JointsCNN at operation 1412. In one implementation the location of the subject obtained from the JointsCNN is more accurate than the service location of the mobile computing device. At operation 1416, the system performs the same process as described above in flowchart 1300 to match the tracking_id of the tracked subject with the user_account of the client application. The process ends at operation 1418.

No biometric identifying information is used for matching the tracked subject with the user account, and none is stored in support of this process. That is, there is no information in the sequences of images used to compare with stored biometric information for the purposes of matching the tracked subjects with user account in support of this process. Thus, this logic to match the tracked subjects with user accounts operates without use of personal identifying biometric information associated with the user accounts.

Speed and Orientation

Figure 15:
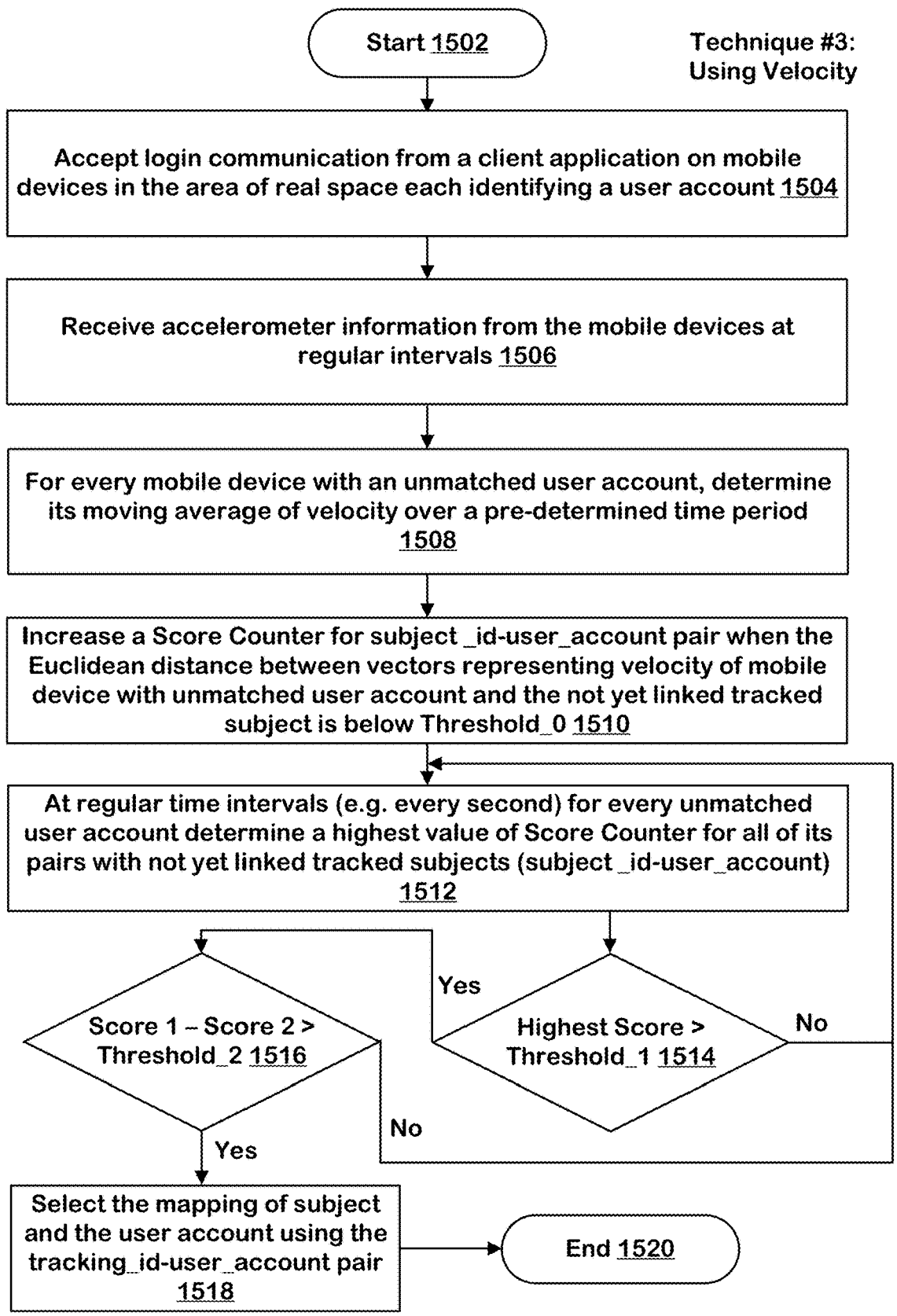
FIG. 15 is a flowchart showing operations for identifying a subject by matching a tracked subject to a user account using velocity of subjects and a mobile computing device.

The flowchart 1500 in FIG. 15 presents operations for a third technique to identify subject by matching tracked subjects with user accounts. This technique uses signals emitted by an accelerometer of the mobile computing devices to match tracked subjects with client applications. The process starts at operation 1502. The process starts at operation 1504 to accept login communication from the client application as described above in the first and second techniques. At operation 1506, the system receives signals emitted from the mobile computing devices carrying data from accelerometers on the mobile computing devices in the area of real space, which can be sent at regular intervals. At operation 1508, the system calculates an average velocity of all mobile computing devices with unmatched user accounts.

The accelerometers provide acceleration of mobile computing devices along the three axes (x, y, z). In one implementation, the velocity is calculated by taking the accelerations values at small time intervals (e.g., at every 10 milliseconds) to calculate the current velocity at time "t" i.e., $v_t = v_0 + a_t$, where $v_0$ is initial velocity. In one implementation, the $v_0$ is initialized as "0" and subsequently, for every time t+1, $v_t$ becomes $v_0$. The velocities along the three axes are then combined to determine an overall velocity of the mobile computing device at time "t." Finally at operation 1508, the system calculates moving averages of velocities of all mobile computing devices over a larger period of time such as 3 seconds which is long enough for the walking gait of an average person, or over longer periods of time.

At operation 1510, the system calculates Euclidean distance (also referred to as L2 norm) between velocities of all pairs of mobile computing devices with unmatched client applications to not yet linked tracked subjects. The velocities of subjects are derived from changes in positions of their joints with respect to time, obtained from joints analysis and stored in respective subject data structures 320 with timestamps. In one implementation, a location of center of mass of each subject is determined using the joints analysis. The velocity, or other derivative, of the center of mass location data of the subject is used for comparison with velocities of mobile computing devices. For each tracking_id-user_account pair, if the value of the Euclidean distance between their respective velocities is less than a threshold_0, a score_counter for the tracking_id-user_account pair is incremented. The above process is performed at regular time intervals, thus updating the score_counter for each tracking_id-user_account pair.

At regular time intervals (e.g., every one second), the system compares the score_counter values for pairs of every unmatched user account with every not yet linked tracked subject (operation 1512). If the highest score is greater than threshold_1 (operation 1514), the system calculates the difference between the highest score and the second highest score (for pair of same user account with a different subject) at operation 1516. If the difference is greater than threshold_2, the system selects the mapping of user_account to the tracked subject at operation 1518 and follows the same process as described above in operation 1516. The process ends at operation 1520.

In another implementation, when JointsCNN recognizes a hand holding a mobile computing device, the velocity of the hand (of the tracked subject) holding the mobile computing device is used in above process instead of using the velocity of the center of mass of the subject. This improves performance of the matching algorithm. To determine values of the thresholds (threshold_0, threshold_1, threshold_2), the system uses training data with labels assigned to the images. During training, various combinations of the threshold values are used and the output of the algorithm is matched with ground truth labels of images to determine its performance. The values of thresholds that result in best overall assignment accuracy are selected for use in production (or inference).

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Network Ensemble

Figure 16A:
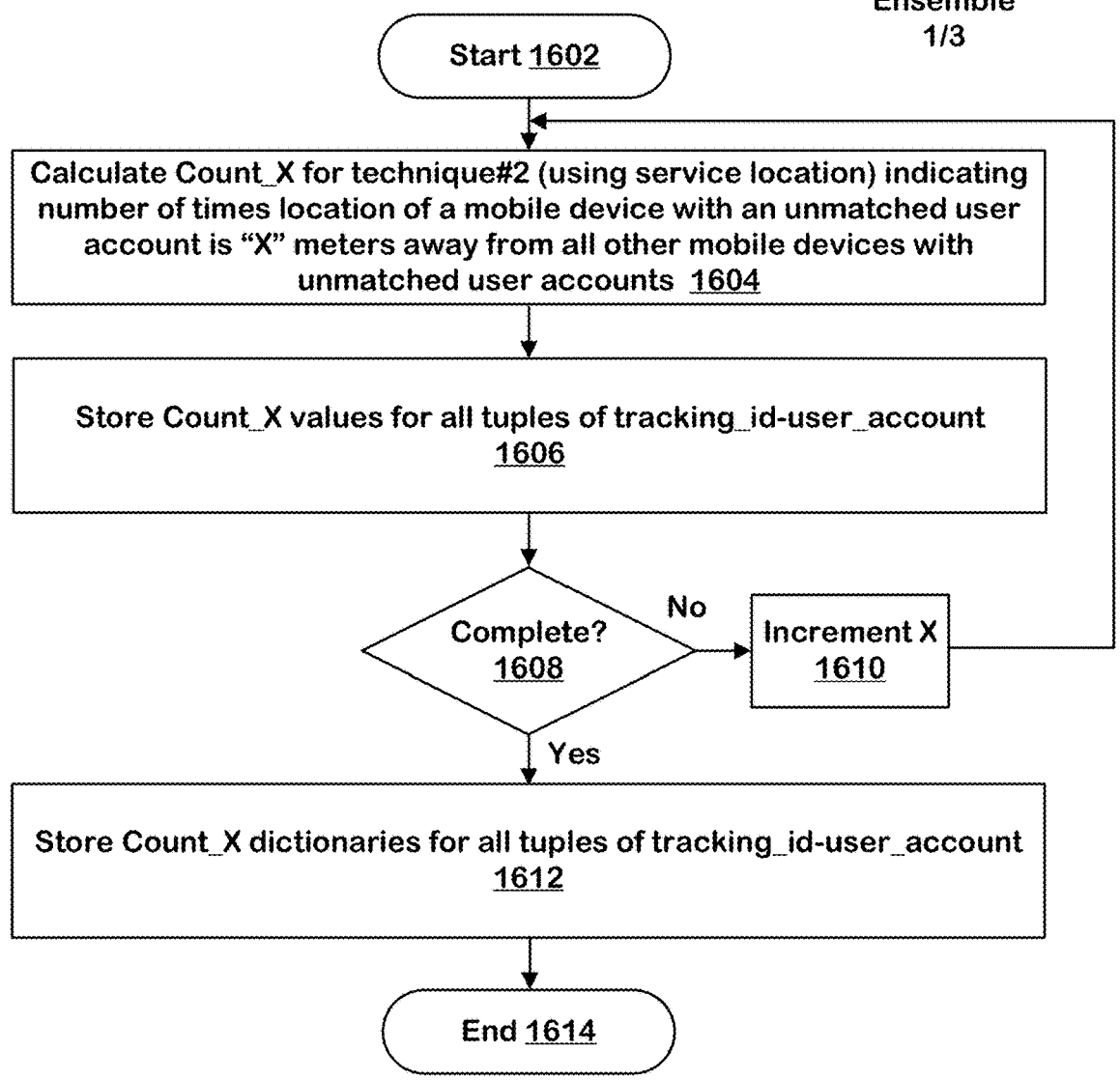
FIG. 16A is a flowchart showing a first part of operations for matching a tracked subject to a user account using a network ensemble.
Figure 16B:
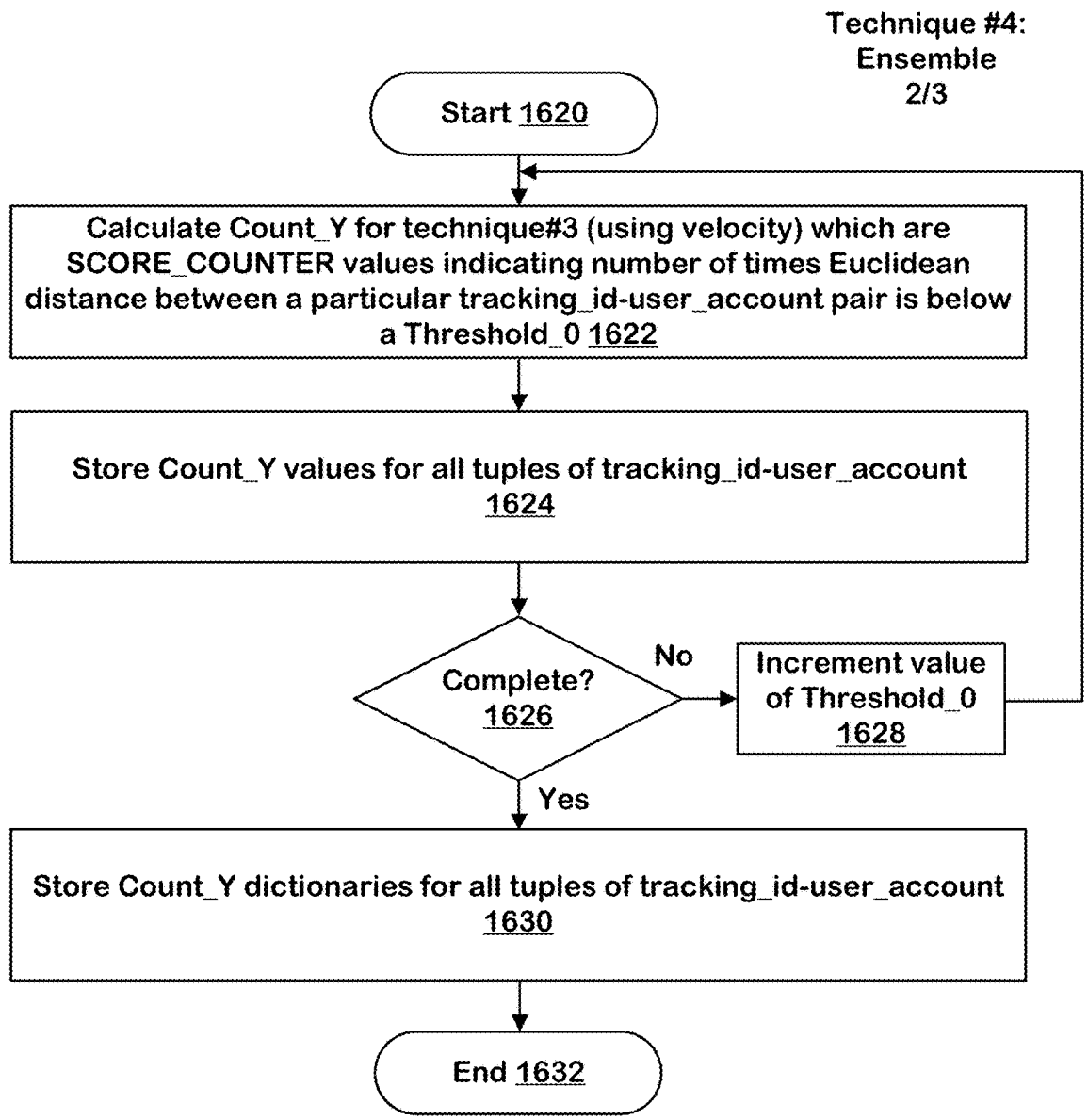
FIG. 16B is a flowchart showing a second part of operations for matching a tracked subject to a user account using a network ensemble.
Figure 16C:
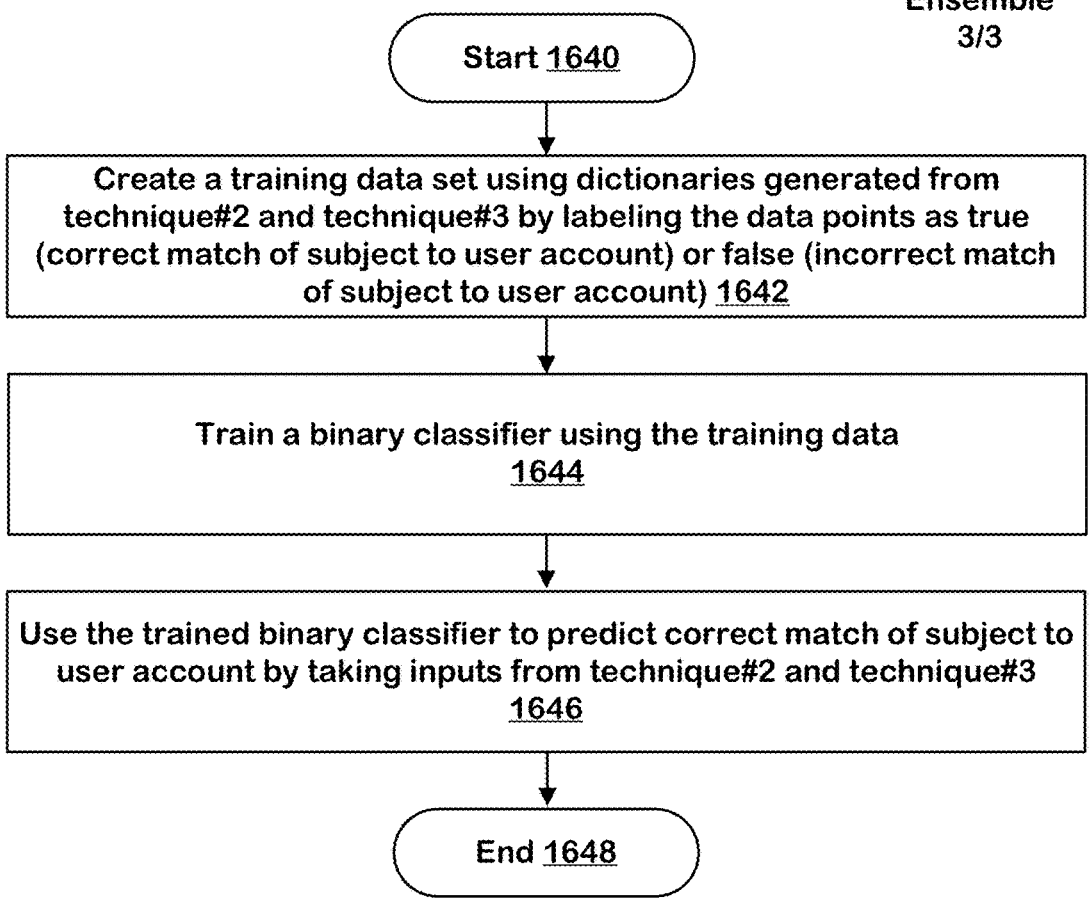
FIG. 16C is a flowchart showing a third part of operations for matching a tracked subject to a user account using a network ensemble.

A network ensemble is a learning paradigm where many networks are jointly used to solve a problem. Ensembles typically improve the prediction accuracy obtained from a single classifier by a factor that validates the effort and cost associated with learning multiple models. In the fourth technique to match user accounts to not yet linked tracked subjects, the second and third techniques presented above are jointly used in an ensemble (or network ensemble). To use the two techniques in an ensemble, relevant features are extracted from application of the two techniques. FIGS. 16A-16C present operations (in a flowchart 1600) for extracting features, training the ensemble and using the trained ensemble to predict match of a user account to a not yet linked tracked subject.

FIG. 16A presents the operations for generating features using the second technique that uses service location of mobile computing devices. The process starts at operation 1602. At operation 1604, a Count_X, for the second technique is calculated indicating a number of times a service location of a mobile computing device with an unmatched user account is X meters away from all other mobile computing devices with unmatched user accounts. At operation 1606, Count_X values of all tuples of tracking_id-user_account pairs is stored by the system for use by the ensemble. In one implementation, multiple values of X are used e.g., 1 m, 2 m, 3 m, 4 m, 5 m (operations 1608 and 1610). For each value of X, the count is stored as a dictionary that maps tuples of tracking_id-user_account to count score, which is an integer. In the example where 5 values of X are used, five such dictionaries are created at operation 1612. The process ends at operation 1614.

FIG. 16B presents the operations for generating features using the third technique that uses velocities of mobile computing devices. The process starts at operation 1620. At operation 1622, a Count_Y, for the third technique is determined which is equal to score_counter values indicating number of times Euclidean distance between a particular tracking_id-user_account pair is below a threshold_0. At operation 1624, Count_Y values of all tuples of tracking_id-user_account pairs is stored by the system for use by the ensemble. In one implementation, multiple values of threshold_0 are used e.g., five different values (operations 1626 and 1628). For each value of threshold_0, the Count_Y is stored as a dictionary that maps tuples of tracking_id-user_account to count score, which is an integer. In the example where 5 values of threshold are used, five such dictionaries are created at operation 1630. The process ends at operation 1632.

The features from the second and third techniques are then used to create a labeled training data set and used to train the network ensemble. To collect such a data set, multiple subjects (shoppers) walk in an area of real space such as a shopping store. The images of these subject are collected using cameras 114 at regular time intervals. Human labelers review the images and assign correct identifiers (tracking_id and user_account) to the images in the training data. The process is described in a flowchart 1600 presented in FIG. 16C. The process starts at operation 1640. At operation 1642, features in the form of Count_X and Count_Y dictionaries obtained from second and third techniques are compared with corresponding true labels assigned by the human labelers on the images to identify correct matches (true) and incorrect matches (false) of tracking_id and user_account.

As there are only two categories of outcome for each mapping of tracking_id and user_account: true or false, a binary classifier is trained using this training data set (operation 1644). Commonly used methods for binary classification include decision trees, random forest, neural networks, gradient boost, support vector machines, etc. A trained binary classifier is used to categorize new probabilistic observations as true or false. The trained binary classifier is used in production (or inference) by giving as input Count_X and Count_Y dictionaries for tracking_id-user_account tuples. The trained binary classifier classifies each tuple as true or false at operation 1646. The process ends at operation 1648.

If there is an unmatched mobile computing device in the area of real space after application of the above four techniques, the system sends a notification to the mobile computing device to open the client application. If the user accepts the notification, the client application will display a semaphore image as described in the first technique. The system will then follow the steps in the first technique to check-in the shopper (match tracking_id to user_account). If the customer does not respond to the notification, the system will send a notification to an employee in the shopping store indicating the location of the unmatched customer. The employee can then walk to the customer, ask him to open the client application on his mobile computing device to check-in to the system using a semaphore image.

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Architecture

Figure 17:
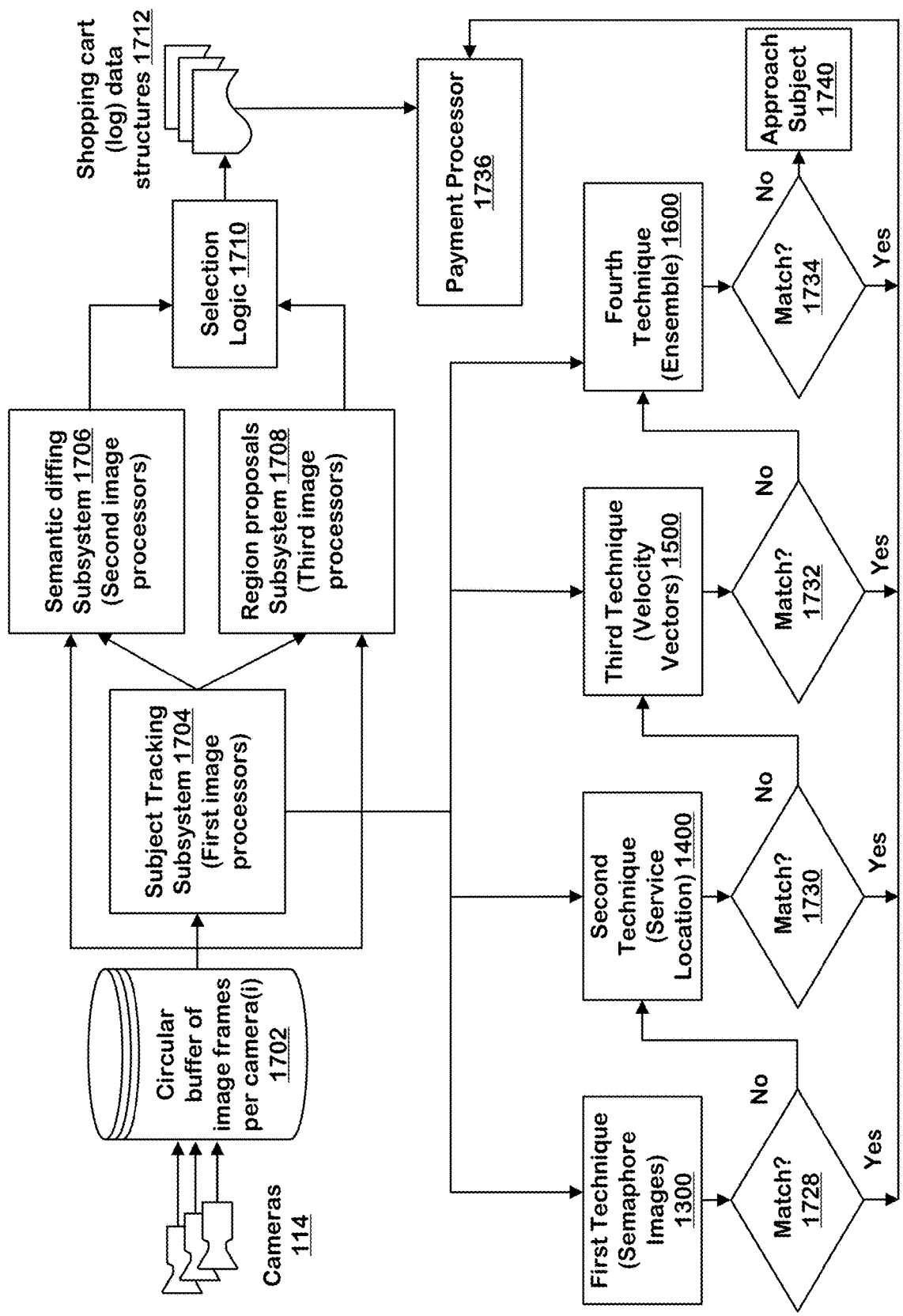
FIG. 17 is an example architecture in which the four techniques presented in FIGS. 13 to 16C are applied in an area of real space to reliably match a tracked subject to a user account.

An example architecture of a system in which the four techniques presented above are applied to identify subjects by matching a user_account to a not yet linked tracked subject in an area of real space is presented in FIG. 17. Because FIG. 17 is an architectural diagram, certain details are omitted to improve the clarity of description. The system presented in FIG. 17 receives image frames from a plurality of cameras 114. As described above, in one implementation, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space. The images are stored in a circular buffer of image frames per camera 1702.

A "subject tracking" subsystem 1704 (also referred to as first image processors) processes image frames received from cameras 114 to locate and track subjects in the real space. The first image processors include subject image recognition engines such as the JointsCNN above.

A "semantic diffing" subsystem 1706 (also referred to as second image processors) includes background image recognition engines, which receive corresponding sequences of images from the plurality of cameras and recognize semantically significant differences in the background (i.e. inventory display structures like shelves) as they relate to puts and takes of inventory items, for example, over time in the images from each camera. The second image processors receive output of the subject tracking subsystem 1704 and image frames from cameras 114 as input. Details of "semantic diffing" subsystem are presented in U.S. patent application Ser. No. 15/945,466, entitled, "Predicting Inventory Events using Semantic Diffing," filed on 4 Apr. 2018, now issued as U.S. Pat. No. 10,127,438, and U.S. patent application Ser. No. 15/945,473, entitled, "Predicting Inventory Events using Foreground/Background Processing," filed on 4 Apr. 2018, now issued as U.S. Pat. No. 10,474,988, both of which are fully incorporated into this application by reference. The second image processors process identified background changes to make a first set of detections of takes of inventory items by tracked subjects and of puts of inventory items on inventory display structures by tracked subjects. The first set of detections are also referred to as background detections of puts and takes of inventory items. In the example of a shopping store, the first detections identify inventory items taken from the shelves or put on the shelves by customers or employees of the store. The semantic diffing subsystem includes the logic to associate identified background changes with tracked subjects.

A "region proposals" subsystem 1708 (also referred to as third image processors) includes foreground image recognition engines, receives corresponding sequences of images from the plurality of cameras 114, and recognizes semantically significant objects in the foreground (i.e. shoppers, their hands and inventory items) as they relate to puts and takes of inventory items, for example, over time in the images from each camera. The region proposals subsystem 1708 also receives output of the subject tracking subsystem 1704. The third image processors process sequences of images from cameras 114 to identify and classify foreground changes represented in the images in the corresponding sequences of images. The third image processors process identified foreground changes to make a second set of detections of takes of inventory items by tracked subjects and of puts of inventory items on inventory display structures by tracked subjects. The second set of detections are also referred to as foreground detection of puts and takes of inventory items. In the example of a shopping store, the second set of detections identifies takes of inventory items and puts of inventory items on inventory display structures by customers and employees of the store. The details of a region proposal subsystem are presented in U.S. patent application Ser. No. 15/907,112, entitled, "Item Put and Take Detection Using Image Recognition," filed on 27 Feb. 2018, now issued as U.S. Pat. No. 10,133,933, which is fully incorporated into this application by reference.

The system described in FIG. 17 includes a selection logic 1710 to process the first and second sets of detections to generate log data structures including lists of inventory items for tracked subjects. For a take or put in the real space, the selection logic 1710 selects the output from either the semantic diffing subsystem 1706 or the region proposals subsystem 1708. In one implementation, the selection logic 1710 uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 1712 (also referred to as a shopping cart data structure) including a list of inventory items (and their quantities) associated with tracked subjects.

To process a payment for the items in the log data structure 1712, the system in FIG. 17 applies the four techniques for matching the tracked subject (associated with the log data) to a user_account which includes a payment method such as credit card or bank account information. In one implementation, the four techniques are applied sequentially as shown in the figure. If the operations in flowchart 1300 for the first technique produces a match between the subject and the user account then this information is used by a payment processor 1736 to charge the customer for the inventory items in the log data structure. Otherwise (operation 1728), the operations presented in flowchart 1400 for the second technique are followed and the user account is used by the payment processor 1736. If the second technique is unable to match the user account with a subject (1730) then the operations presented in flowchart 1500 for the third technique are followed. If the third technique is unable to match the user account with a subject (1732) then the operations in flowchart 1600 for the fourth technique are followed to match the user account with a subject.

If the fourth technique is unable to match the user account with a subject (1734), the system sends a notification to the mobile computing device to open the client application and follow the operations presented in the flowchart 1300 for the first technique. If the customer does not respond to the notification, the system will send a notification to an employee in the shopping store indicating the location of the unmatched customer. The employee can then walk to the customer, ask him to open the client application on his mobile computing device to check-in to the system using a semaphore image (step 1740). It is understood that in other implementations of the architecture presented in FIG. 17, fewer than four techniques can be used to match the user accounts to not yet linked tracked subjects.

Subject Re-Identification Process

Figure 18:
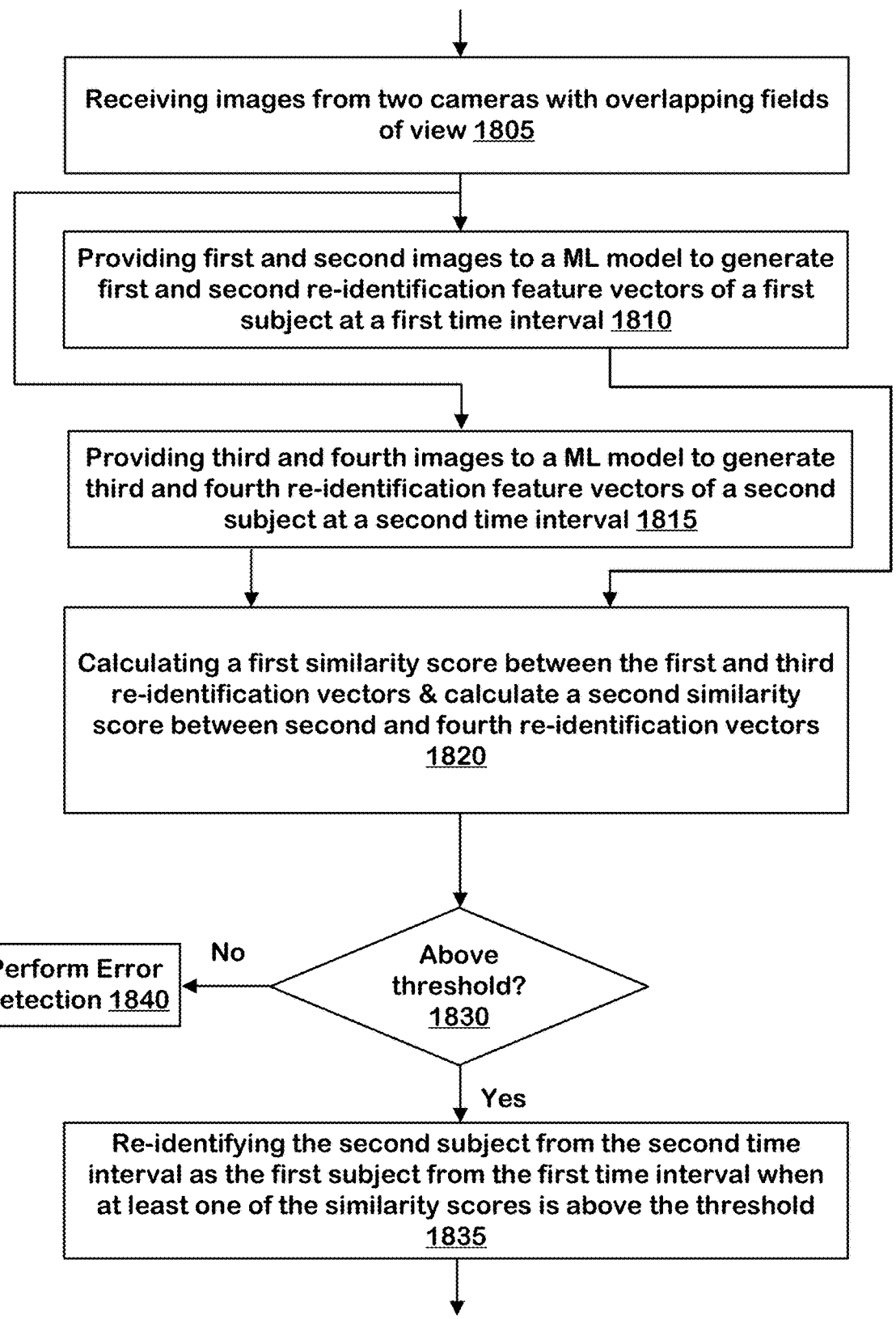
FIG. 18 is a flowchart presenting operations for calculating similarity scores for re-identifying a subject.

FIG. 18 presents a flowchart including operations to re-identify a subject in a second time interval by calculating similarity scores. The operations can be implemented by the network node 105 hosting the subject re-identification engine 190. The process starts at operation 1805 at which the network node 105 receives first and second sequences of images of corresponding fields of view in the area of real space. Two or more cameras 114 or sensors can be used to collect images of the area of real space. The cameras 114 can have overlapping fields of view.

The subject re-identification engine 190 includes logic to generate first and second re-identification feature vectors of a first subject identified from a first time interval (operation 1810). The first and second reidentification feature vectors are generated respectively from the first and second images of the subject captured respectively from first and second cameras with overlapping fields of view at the first time interval. If more cameras or sensors are used to capture the images of the subject, then more re-identification feature vectors are generated accordingly. The technology disclosed includes logic to provide the images of the subjects at the first time interval to a trained machine learning model to generate re-identification feature vectors.

The subject re-identification engine 190 includes logic to generate third and fourth re-identification feature vectors of a second subject identified from a second time interval (operation 1815). The third and fourth reidentification feature vectors are generated respectively from the third and fourth images of the subject captured respectively from the first and second cameras with overlapping fields of view at the second time interval. If more cameras or sensors are used to capture the images of the subject, then more re-identification feature vectors are generated accordingly. The technology disclosed includes logic to provide the images of the subjects at the second time interval to a trained machine learning model to generate re-identification feature vectors.

In one implementation, the technology disclosed includes logic to detect a pose of a subject in the image captured by a camera. The pose identified from the image can be one of a front pose, a side pose, and/or a back pose etc. The technology disclosed includes logic to place a bounding box around at least a portion of the pose of the identified subject in the image to provide a cropped out image which can be given as input to the machine learning model.

First and second similarity scores are then calculated between the first and the third re-identification feature vectors and the second and the fourth re-identification feature vectors, respectively (operation 1820). The technology disclosed can use different types of measures to represent the similarity between respective re-identification vectors. In one implementation, the technology disclosed can use a cosine similarity measure for representing the first similarity score and the second similarity score. Other types of similarity scores or similarity distance measures can be used such as Euclidean distance, etc.

The first and second similarity scores are compared to a threshold (operation 1830). The second subject from the second time interval is re-identified as the first subject from the first time interval when at least one of the first similarity score and the second similarity score is above a pre-defined threshold. A higher value of a similarity score between two re-identification feature vectors indicates the re-identification feature vectors are similar to each other. This means that there is a high probability that the two re-identification feature vectors represent the same subject from two different time intervals.

A similarity score higher than the threshold indicates that the second subject identified in the second time interval is the same as the first subject identified in the first time interval (operation 1835). The subject re-identification engine 190 can then re-identify the second subject as the first subject and assign the unique identifier and other attributes of the first subject to the subject that was previously identified as the second subject, but is actually the first subject. In one implementation, an average of the first similarity score and the second similarity score is calculated at operation step 1835. The subject re-identification engine 190 re-identifies the second subject identified from the second time interval as the first subject identified from the first time interval when the average similarity score is above the pre-defined threshold. If there are more than two cameras (e.g., X number of cameras), then there can be X number of similarity scores. An average of all of the X number of similarity scores can be used to determine whether or not the threshold is satisfied.

More than one subject can be present within the field of view of the at least two cameras in the area of real space in any given time interval, e.g., up to ten or more subjects can be present within the field of view of at least two cameras in any given time interval. Consider that a third subject is present in the images captured by the at least two cameras in the first time interval. The subject re-identification engine 190 can generate fifth and sixth re-identification feature vectors of the third subject identified from the first time interval by performing operations including providing the fifth and sixth images of the third subject from the respective first and second sequences of images and as obtained from the first time interval, to the trained machine learning model to produce respective fifth and sixth re-identification feature vectors. The subject re-identification engine 190 can match the second subject identified from the second time interval with the first subject and the third subject identified from the first time interval by calculating (i) a third similarity score between the between the fifth and the third re-identification feature vectors and (ii) a fourth similarity score between the sixth and the fourth re-identification feature vectors. The subject re-identification engine 190 can re-identify the second subject identified from the second time interval as the first subject identified from the first time interval when the third similarity score and the fourth similarity score are below the pre-defined threshold and when at least one of the first similarity score and the second similarity score is above the pre-defined threshold.

When all similarity scores calculated in operation 1820 are below the threshold, the technology disclosed includes logic to detect one or more tracking errors in tracking subjects across a plurality of time intervals (operation 1840). Further details of the tracking errors are provided in the following section.

Error Detection in Subject Tracking

The technology disclosed can detect a variety of errors in tracking subjects across a plurality of time intervals in the area of real space. The subject tracking engine 110 includes logic to track subjects in the area of real space and assign unique tracking identifiers to the subjects in the area of real space for tracking purpose. In some cases, the tracking system can assign incorrect tracking identifiers to subjects in a time interval, i.e., the tracking identifiers can be incorrectly swapped between subjects. The technology disclosed can detect such tracking errors when the similarity score is below the threshold, indicating a potential error in tracking of the subjects. Further, when multiple cameras with overlapping fields of view are used to capture images of a subject, the subject re-identification engine 190 calculates similarity score between re-identification feature vectors corresponding to images from a same camera over two or more time intervals. When multiple similarity scores (based on multiple cameras) are below the threshold, there is a higher probability or chance of an error in tracking of subjects. The technology disclosed can detect a variety of errors in tracking of subjects in the area of real space. Some examples of tracking errors that can be detected by the subject re-identification engine 190 are presented below.

Single Swap Error

In a single swap error, a subject from a first time interval is incorrectly matched to another subject in the second time interval. This error can occur when the subject tracking engine 110 incorrectly assigns the tracking identifier (track_ID_X) of the first subject from the first time interval to a second subject in the second time interval. In the single swap error in tracking of subjects, both the first and the second subjects are present in the first and the second time intervals. In some cases, the opposite swap can also occur at the same time. For example, in the opposite swap, the tracking identifier of the second subject (track_ID_Y) is assigned to the first subject in the second time interval. The technology disclosed can detect single swap error in tracking of subjects in the area of real space. Once the error has been identified, it can then be fixed and correct tracking identifiers can be assigned to respective subjects.

Split Error

In a split error in tracking of subjects, a first subject's tracking identifier from a first time interval (track_ID_X) is incorrectly changed to a new tracking identifier (track_

ID_Z) in the second time interval. The new tracking identifier (track_ID_Z) was not being tracked by the subject tracking engine 110 in the first time interval, while the old tracking identifier (track_ID_X) is not being tracked by the subject tracking engine 110 in the second time interval. There is no new subject in the second time interval but the tracking system incorrectly generates a new tracking identifier (track_ID_Z) in the second time interval and assigns it to the first subject in the second time interval assuming that the first subject is a new subject detected for the first time in the area of real space in the second time interval.

Enter-Exit Swap Error

Another type of swap error can occur near the entry/exit areas of the area of real space. This is referred to as an enter-exit swap error in which a subject assigned a tracking identifier (track_ID_X) leaves the area of real space in a second time interval. The subject tracking engine 110 incorrectly assigns the same tracking identifier (track_ID_X) to a new subject who enters the area of real space in the second time interval. For example, suppose the subject tracking engine 110 is tracking a first subject in the area of real space and the first subject is present in the area of real space in the first time interval. In a subsequent time interval such as a second time interval, the first subject has exited the area of real space and a second subject has entered the area of real space. The enter-exit swap error can occur when the second subject who has entered the real space in the second time interval is matched to the first subject from the first time interval and assigned the tracking identifier (track_ID_X) of the first subject. The first subject, however, has left the area of real space in the second time interval. The second subject is a new subject who entered the area of real space in the second time interval and was not present in the area of real space in the first time interval. The technology disclosed can detect enter-exit-swap error and thus correct the error in tracking of subjects. Further details of how the subject re-identification engine 190 identifies the tracking error and corrects these errors are presented in the following section. Note that the enter/exit areas can also include areas near doors to restrooms, elevators or other designated unmonitored areas in the shopping store where subjects are not tracked.

Error Detection Process

Figure 19:
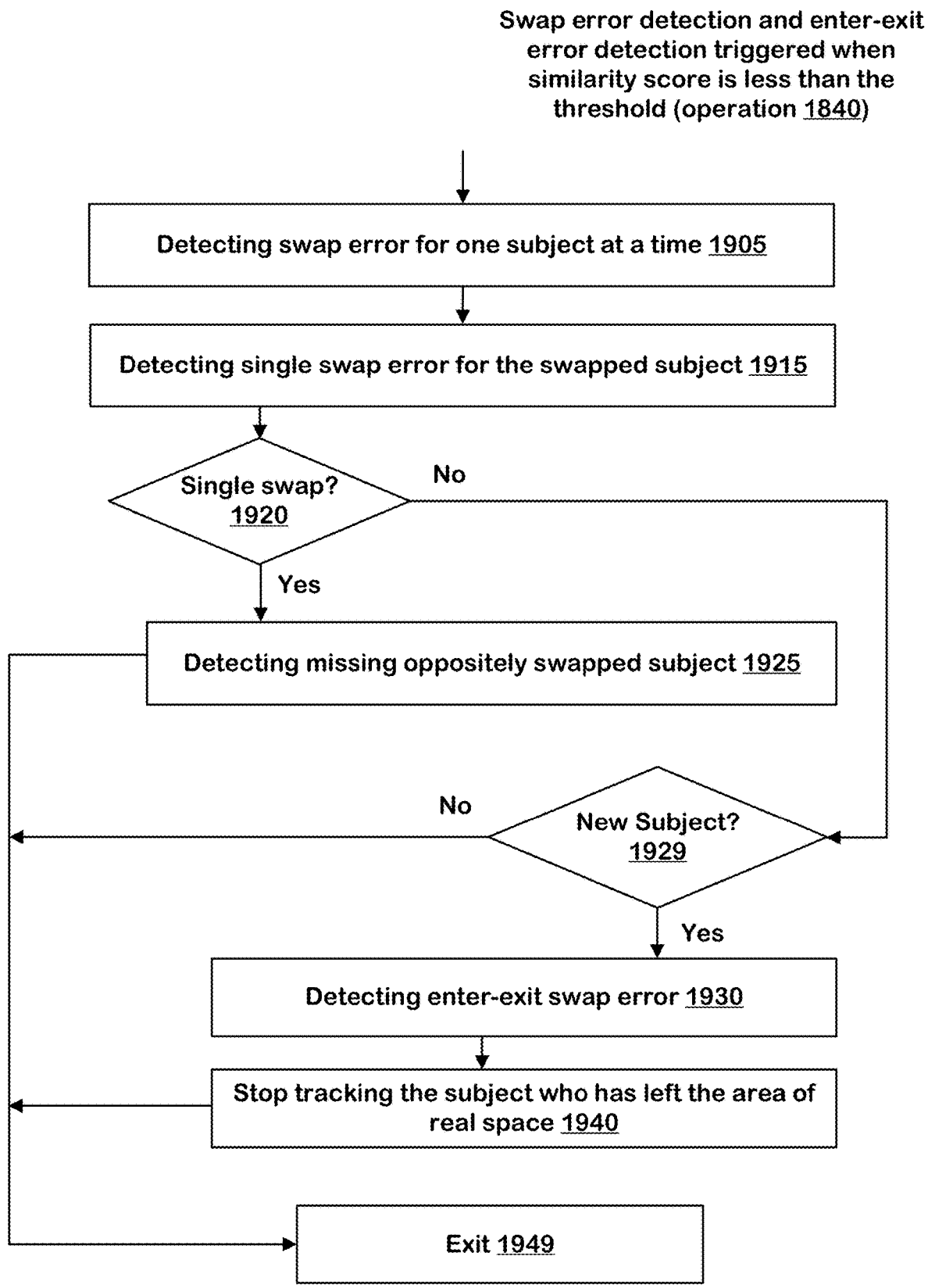
FIG. 19 is a flowchart presenting operations for detecting swap errors and enter-exit errors in tracking of subjects and re-identifying subjects with errors in tracking.

FIG. 19 presents a flowchart illustrating detailed operations for subject tracking error detection. The operations are performed by the technology disclosed to detect various types of errors in tracking of subjects in the area of real space. As shown in flowchart in FIG. 18, the error detection logic for swap errors and enter-exit errors is triggered when the similarity score is below a threshold, e.g., not above the threshold (operation 1840). The flowchart in FIG. 19 presents further details of how these errors in tracking of subjects are detected and resolved by the technology disclosed. The subject tracking engine 110 tracks the subjects as they enter the area of real space. The subject tracking engine 110 assigns tracking identifiers to tracked subjects. Errors can occur in tracking of subjects. Some examples of errors are presented above. The re-identification engine 190 includes logic to detect an error when one or more similarity scores fall below a pre-defined threshold. In one implementation, the error detection logic is triggered when an average similarity score is below a threshold.

Specifically, the error detection process in FIG. 19 presents operations (or sub-operations) that are carried out within the high-level error detection operation 1840 illustrated in FIG. 18. The technology disclosed performs operations 1905 through 1940 to detect swap or enter-exit types of errors in subject tracking. If a swap or an enter-exit type error is detected, the technology disclosed then performs logic to correct the detected subject tracking error.

Figure 20:
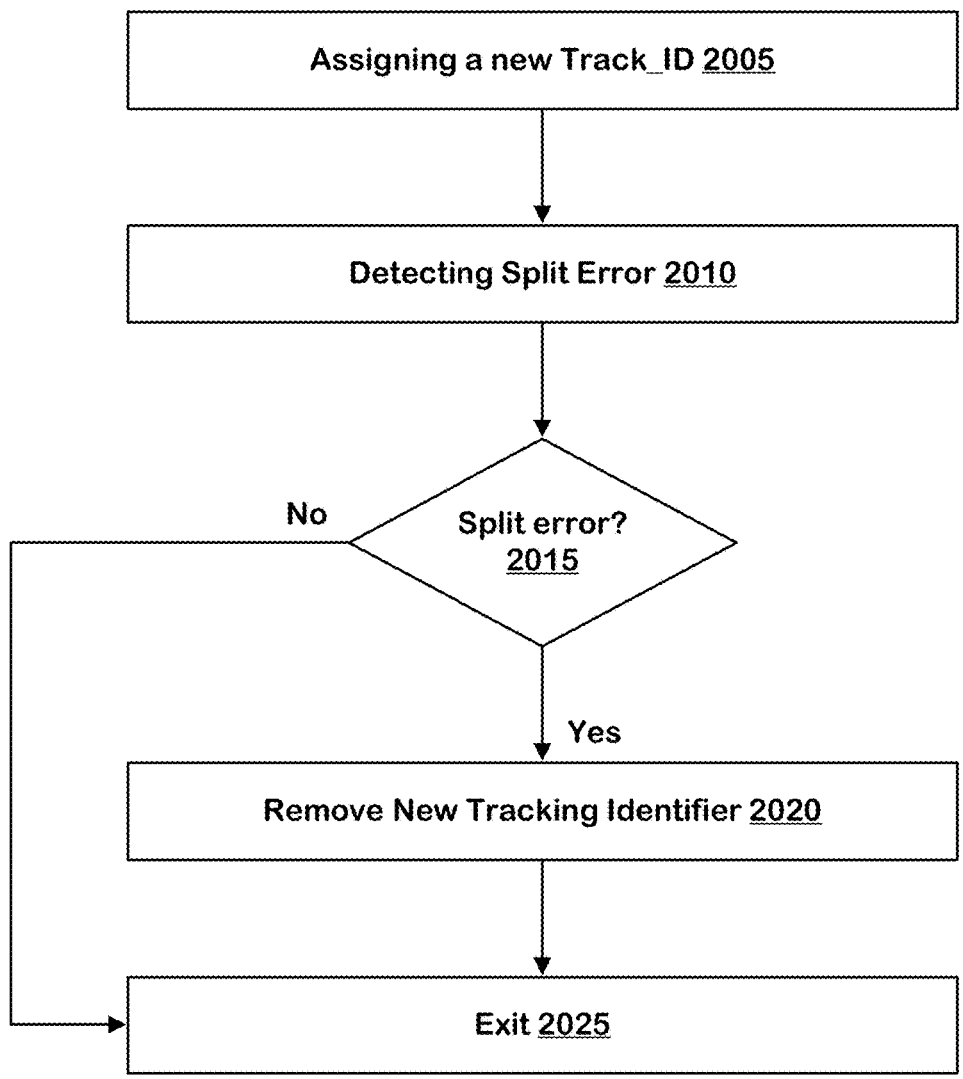
FIG. 20 is a flowchart presenting operations for detecting split errors in tracking of subjects and re-identifying subjects with errors in tracking.

For example, the process flowchart in FIG. 19 presents operations for detecting and correcting (1) swap errors and (2) enter-exit errors. A third type of error in subject tracking is referred to as (3) split errors. The process flowchart in FIG. 20 presents operation for detecting and correcting split type errors. The details of operations in the flowchart in FIG. 19 are presented below.

The operation 1905 in the flowchart in FIG. 19, includes logic to detect a swap error for a subject in the area of real space. The swap detection can be performed one-by-one for all subjects in the area of real space. The subject tracking engine assigns tracking identifiers to all subjects in the area of real space during all time intervals or at all image frames at which the tracking is performed. The swap error occurs when an incorrect tracking identifier (track_ID) is assigned to a subject. The technology disclosed includes logic to compare the image of each subject in an image frame in a current time interval (or current image cycle) from each camera at any given time interval to all subjects identified in an image captured by the same camera in a previous time interval. The comparison is performed as described in operation steps in FIG. 18, i.e., by producing re-identification feature vectors and calculating similarity scores. An average of similarity scores can be calculated for all similarity scores per camera. If the average similarity score is below a threshold, a swap can be predicted which means that the subject tracking engine 110 has assigned an incorrect track_ID to the subject in the current time interval (or at the current time stamp). The subject re-identification engine 190 generates a set of output data for the swap detected in the current time interval. The output data can include a time stamp for the image frame for which the swap is detected. The output data can also include the time stamp of the previous image frame with which the current frame was compared. The previous image frame can be in one of the earlier time intervals than the current time interval. The output data can include the tracking identifier (track_ID) in the current time interval which is incorrectly assigned to a subject.

The duration of a time interval can be set as a fraction of a second such as one thirtieth (1/30) of a second to a few seconds such as three seconds or more. An image frame can be selected from a time interval at any time stamp. For example, a first, a middle, or a last image frame in a time interval can be selected for evaluation. More than one image frame can also be selected from a time interval. An average of the image frames (such as by taking average of respective pixel intensity values) selected in a time interval can be used for further processing in re-identification of subjects and error detection. In other implementations, comparisons of images from more than one time intervals can be performed for re-identification of subjects and error detection. In the examples presented here, comparisons of single image frames are used in each time interval for re-identification of subjects and detection of tracking errors.

The re-identification engine 190 includes logic to perform the single swap error detection after a swap is detected (operation 1915). Suppose a track_ID with a value "Y" is incorrectly assigned to a subject as detected in operation 1905 at the current time interval or say time interval "t2". The re-identification detection engine 190 compares the feature re-identification vector of the subject with track_ID "Y" at the time interval t2 with feature re-identification vectors of all subjects in a previous time interval "t1". The comparison may not include the subject with a track_ID "Y" in the previous time interval t1 as the system has detected a swap in operation 1905. Similarity scores between feature re-identification vectors of all subjects (all track IDs) in the time interval t1 are then calculated with the feature re-identification vector of the subject with the track_ID "Y" in the current time interval t2. If there are multiple cameras capturing the images of the subjects then the similarity scores for all track IDs in the time interval t1 are calculated with the feature re-identification vector of the subject with track_ID "Y" per camera. In one implementation, the comparisons are performed per camera and similarity scores are calculated per camera. Average similarity scores for each track_ID in all tracks_IDs in the time interval "t1" per camera can be calculated and compared with a threshold. Suppose a subject with a track identifier or track_ID "X" (in time interval "t1") has a highest average similarity score with the subject with the track identifier or track_ID "Y" in time interval "t2". The re-identification engine 190 then matches the subject with the track_ID "X" from time interval t1 with the subject with track_ID "Y" from the time interval t2 and this subject's track_ID is updated to track_ID "X". Therefore, the technology disclosed is able to correct the error in tracking of subjects over multiple time intervals in the area of real space. In one implementation, the operations 1905 and 1915 can be combined into one operation step. If similarity score of no subject in the previous time interval "t1" is greater than the threshold, then the single swap error is not detected (no in operation 1920). This means that no previously existing subject in the previous time interval "t1" matches with the subject in the current time interval "t2", i.e., a new subject has entered the area of real space in the second time interval "t2" and is assigned the track_ID of the existing subject in the previous time interval "t1". Further details of the operations in the "no" branch of operation 1920 are presented after the description of the operations in the "yes" branch of operation 1920 below.

When a single swap of a tracking identifier is detected (yes in operation 1920), the re-identification engine 190 includes logic to detect a subject in time interval "t2" that may not have been assigned any tracking identifier i.e., an oppositely swapped subject that is missing a tracking identifier in time interval "t2" (operation 1925). For example, the subject (say "subject 1") at time interval "t2" is incorrectly assigned track_ID "Y". Referring back to operation 1915, the logic can identify another track_ID "X" which is the correct tracking identifier for this subject. Therefore, the logic of operation 1915 can assign track_ID "X" to subject 1 as opposed to track_ID "Y". It can also happen, in some cases, that track_ID "X" from the first time interval is incorrectly assigned to another subject in the second time interval "t2". In some cases, it can happen that track_ID "X" is not assigned to any subject in the second time interval. Operation 1925 includes logic to detect this scenario and assign a correct tracking identifier to the second subject (say "subject 2") in the second time interval who is missing a tracking identifier.

Table 1 below provides further details of the example in which an oppositely swapped subject is missing a tracking identifier in the second time interval "t2". The correct tracking identifiers of subject 1 and subject 2 are presented in the first column of the table below, which includes the subjects and their tracking identifiers for the first time interval "t1". The correct tracking identifier of subject 1 is track_ID "X" and the correct identifier of subject 2 is "track_ID "Y". In the second time interval "t2" a single swap error results in an assignment of track_ID "Y" to subject 1 as shown in the second column of Table 1 below, which includes the subjects and their tracking identifiers (or lack thereof) for the second time interval "t2". However, it can be seen in the second column that subject 2 (or a subject that we believe to be subject 2) is not assigned any tracking identifier. Therefore, subject 2 is the oppositely swapped subject with a missing tracking identifier (because track_ID "Y" has been swapped away from subject 2). Operation 1925 includes logic to detect this oppositely swapped subject with a missing tracking identifier and assign a correct identifier to this subject. The logic includes determining that a subject is missing a tracking identifier and then assigning a correct tracking identifier for the subject (e.g., subject 2). Specifically, the logic determines that (i) a subject (e.g., subject 1) from the first time interval appears to have a different tracking identifier in the second time interval, (ii) a subject (e.g., subject 2) believed to be from the first time interval does not have a tracking identifier in the second time interval and (iii) there is no subject associated with a previously assigned tracking identifier (e.g., track_ID "X") that has (potentially) left the area of real space. Once these determinations are made, the logic at operation 1925 assigns track_ID "Y" to subject 2 that was missing a tracking identifier using the identification (matching) techniques described herein. The third column of the table below shows correct assignment of tracking identifiers to subjects after operations 1915 and 1925 are completed. Note that the correct assignment of track_ID "X" to subject 1 is performed by the logic in operation 1915 for single swap detection. The logic in operation 1925 correctly assigns track_ID "Y" to subject 2 that was missing the tracking identifier in the second time interval. Hence, the technology disclosed can correctly detect and assign tracking identifiers to an oppositely swapped subject that is not automatically assigned a tracking identifier by the subject tracking engine 110.

TABLE 1

Example of an Oppositely Swapped Subject Missing an Identifier

| Interval t1 | Interval t2 | Re-identification (correction) for Interval t2 |
|---|---|---|
| Subject 1 → track_ID "X" | Subject 1 → track_ID "Y" | Subject 1 → track_ID "X" |
| Subject 2 → track_ID "Y" | Subject 2 → No track_ID | Subject 2 → track_ID "Y" |

The above-described logic supports three-way (3-way) or high frequency swaps of subjects. For example, in a three-way swap, a subject with track_ID "A" from time interval "t1" is assigned a track_ID "B" in the time interval "t2", a subject with track_ID "B" from time interval "t1" is assigned a track_ID "C" in the time interval "t2" and the subject with track_ID "C" from time interval "t1" is assigned a track_ID "A" in the time interval "t2". Three-way swaps can occur when a large number of subjects are present or moving in the field of view of one or more cameras. High-frequency swaps of track identifiers can also occur in crowded spaces. In high-frequency swaps, the track identifiers of subjects can be swapped multiple times over a plurality of time intervals. The technology disclosed can re-identify the subjects and assign correct track identifiers to the subjects in high-frequency swaps.

If a single swap of a tracking identifier is not detected (no in operation 1920), then technology disclosed includes logic to determine whether a new subject has entered the area of real space in the second time interval (operation 1929). The technology disclosed includes logic to match subjects in the second time interval with subjects in the first time interval and when a subject in the second time interval does not match to any subject in the first time interval this can indicate that a new subject has entered the area of real space in the second time interval. In one implementation, the logic implemented in operations 1920 and 1929 can be combined in a single operation.

If a new subject is found in the second time interval that does not match any previously tracked subject in the area of real space (yes in operation 1929) then the technology disclosed performs an operation to detect an enter-exit swap error (operation 1930). If no new subject is found in the second time interval (no in operation 1929) then the error detection process ends (operation 1949). Table 2 below presents a simplified example of detecting and correcting an enter-exit swap error (operation 1930). The first column of the table presents subjects and their respective tracking identifiers in a first time interval "t1". The second column of the table presents subjects and their respective tracking identifiers in a second time interval "t2". There are two subjects being tracked in the first time interval including subject 1 with a tracking identifier "X" and a subject 2 with a tracking identifier "Y". The first row of Table 2 shows that a same tracking identifier i.e., track_ID "X" is correctly assigned to subject 1 in the first and the second time intervals. The second row of Table 2 shows that subject 2 with a tracking identifier track_ID "Y" in time interval "t2" has left the area of real space in time interval "t2". The third row in Table 2 presents a new subject "subject 3" who is detected in time interval "t2" for the first time by the subject tracking engine 110. However, this new subject is assigned track_ID "Y" which was previously assigned to subject 2 in time interval "t1". In some cases, no tracking identifier may yet be assigned to the new subject as the subject tracking system has just detected the newly entered subject in the area of real space. The enter-exit swap error detection logic can detect the enter-exit swap error and assign correct tracking identifier to the newly entered subject in both cases, i.e., with or without a tracking identifier being assigned to the new subject 3 in the second time interval or time interval "t2".

TABLE 2

Example of an Enter-Exit Swap Error in Subject Tracking

| Interval t1 | Interval t2 | Re-identification (correction) for Interval t2 |
|---|---|---|
| Subject 1 → track_ID "X" | Subject 1 → track_ID "X" | Subject 1 → track_ID "X" |
| Subject 2 → track_ID "Y" | Subject 2 → left the area of real space | Stop tracking Subject 2 |
| | Subject 3 → track_ID "Y" New subject detected in "t2" for the first time | Subject 3→ track_ID "Z" New tracking identifier assigned to Subject 3 |

When the subjects in the current time interval or time interval "t2" are matched to subjects in the previous time interval "t1", no subject from the previous time interval "t1" matches the subject with a track_ID "Y" in the time interval "t2". This can indicate that the subject assigned track_ID "Y" in time interval "t2" is a new subject who was not present in the previous time interval. In one implementation, the re-identification engine 190 can attempt to match the subject with track_ID "Y" in time interval "t2" with subjects in a plurality of previous time intervals such as two, three or five previous time intervals. When no subject in one or more previous time intervals matches the subject with track_ID "Y" in time interval "t2", the tracking error is classified as an enter-exit error. In this case, a new tracking identifier such as track_ID "Z" is assigned to subject 3 as shown in the third column of Table 2. This subject (i.e., subject 3) was previously assigned track_ID "Y" in time interval "t2" as shown in the second column of Table 2. Subject 3 has entered the area of real space in time interval "t2". The subject tracking engine 110 then starts tracking this subject in the following time intervals with correct tracking identifier (track_ID "Z").

The subject (subject 2) who was assigned tracking identifier "Y" in a previous time interval "t1" may have left the area of real space during time interval "t2" as shown in the second column of the second row of Table 2. The re-identification engine can attempt to match the subject with tracking identifier "Y" in the previous time interval to all subjects in the current time interval "t2". If there is no match, then it means that the subject with tracking identifier "Y" has left the area of real space and subject tracking engine 110 can then mark the subject accordingly in subject database and the user database. The subject tracking engine 110 can then stop tracking this subject as shown in the third column of the second row of Table 2 (operation 1940), then the error detection process ends (operation 1949). This information can then be used by the technology disclosed to generate an items log (or a receipt) for the subject. This receipt may then be sent to the subject via an email, an SMS message or via an app on a mobile computing device associated with the subject.

FIG. 20 presents process flowchart for detecting and correcting split error detection. The process in FIG. 20 starts when a new tracking identifier (or track_ID) is generated and assigned to a subject in a current time interval e.g., time interval "t2" (operation 2005). The technology disclosed implements logic to detect whether a new subject has entered the area of real space or the new tracking identifier is incorrectly generated due to a split type error in subject tracking. If a split type error is detected, the technology disclosed implements the logic to correct the split error in subject tracking. Further details of the operations in flowchart in FIG. 20 are presented below.

When a new tracking identifier is generated and assigned to a subject in the current time interval (operation 2005), the re-identification engine 190 includes logic to detect a split error in tracking of subjects in the area of real space (operation 2010). In the split error, the subject with tracking identifier "Y" in the previous time interval or time interval "t1" is assigned a new tracking identifier "Z" in the current time interval or time interval "t2". The new tracking identifier "Z" was not being tracked in the previous time interval. The old tracking identifier "Y" is not being tracked in the current time interval.

Table 3 below presents a simplified example to illustrate a split error. The first column of the table presents subjects and their respective tracking identifiers in a first time interval "t1". There are two subjects being tracked in the first time interval including subject 1 with a tracking identifier "X" and a subject 2 with a tracking identifier "Y". In the second time interval "t2", the subject tracking engine incorrectly assigns a new tracking identifier "Z" to subject 2, assuming that subject 2 is a new subject who has entered the area of real space in time interval "t2". Tracking identifier "Y" is not assigned to any subject in the second time interval "t2". The technology disclosed matches the subjects in the second time interval with subjects in the first time interval and determines that subject 2 with tracking identifier "Z" in the second time interval matches subject 2 in the first time interval with a tracking identifier "Y". In one implementation, the technology disclosed matches the subjects in the second time interval "t2" to only those subjects in time interval "t1" who exited the area of real space in the first time interval. For example, in Table 3, the subject with track_ID "Y" exited in time interval "t1" (or is incorrectly marked as exited in time interval "t1" by the subject tracking engine 110). Therefore, the subjects in the second time interval are matched to only the subject with track_ID "Y" in the first time interval. This logic can improve the processing efficiency of the subject re-identification engine 190. When a split error is detected (yes branch of operation 2015), the re-identification logic corrects the tracking identifier of subject 2 by assigning track_ID "Y" to subject 2 in the second time interval as shown in the third column of Table 3 and removes track_ID "Z" as no new subject has entered the area of real space (operation 2020). When no split error is detected (no branch of operation 2015), the error detection process ends (operation 2025).

TABLE 3

Example of a Split Error in Subject Tracking

| Interval t1 | Interval t2 | Re-identification (correction) for Interval t2 |
|---|---|---|
| Subject 1 → track_ID "X" | Subject 1 → track_ID "X" | Subject 1 → track_ID "X" |
| Subject 2 → track_ID "Y" | Subject 2 → track_ID "Z" New ID generated in "t2" | Subject 2 → track_ID "Y" track_ID "Z" removed |

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of re-identifying a previously identified subject in an area of real space, the method including:
receiving, from at least two cameras with overlapping fields of view, respective first and second sequences of images of corresponding fields of view in the area of real space;
generating first and second reidentification feature vectors of a first subject identified from a first time interval by performing operations including:
providing first and second images of the first subject from the respective first and second sequences of images and as obtained from the first time interval, to a trained machine learning model to produce respective first and second reidentification feature vectors; and
matching a second subject identified from a second time interval with the first subject identified from the first time interval by performing operations including:
providing third and fourth images of the second subject, from the respective first and second sequences of images and as obtained from the second time interval, to the trained machine learning model to produce respective third and fourth reidentification feature vectors;
calculating (i) a first similarity score between the first and the third reidentification feature vectors and (ii) a second similarity score between the second and the fourth reidentification feature vectors; and
re-identifying the second subject identified from the second time interval as the first subject identified from the first time interval when at least one of the first similarity score and the second similarity score is above a pre-defined threshold.

2. The method of claim 1, wherein the re-identifying of the second subject identified from the second time interval, further includes:
calculating an average of the first similarity score and the second similarity score and re-identifying the second subject identified from the second time interval as the first subject identified from the first time interval when the average similarity score is above the pre-defined threshold.

3. The method of claim 1, wherein the generating of the first, the second, the third, and the fourth reidentification feature vectors, further includes:
placing first, second, third, and fourth bounding boxes respectively around at least a portion of first, second, third, and fourth poses of the identified subjects, as identified from the first, the second, the third, and the fourth images of the respective sequences of images, to provide first, second, third, and fourth cropped out images as the first, the second, the third, and the fourth images.

4. The method of claim 3, wherein the first pose, as identified from the first image, is identified from the first sequence of images from a first camera, the second pose, as identified from the second image, is identified from the second sequence of images from a second camera, the third pose, as identified from the third image, is identified from the first sequence of images from the first camera, and the fourth pose, as identified from the fourth image, is identified from the second sequence of images from the second camera.

5. The method of claim 3, further including comparing a count of a number of identified subjects in the second time interval with a number of identified subjects in the first time interval and when the count of the number of identified subjects in the second time interval is less than the count of the number of identified subjects in the first time interval, performing a matching of the subjects identified in the second time interval with subjects identified in a time interval preceding the first time interval.

6. The method of claim 1, wherein the first similarity score and the second similarity score are cosine similarity measures respectively between (i) the first and the third reidentification feature vectors and (ii) the second and the fourth reidentification feature vectors.

7. The method of claim 1, further including identifying an error in tracking of the first subject identified from the first time interval, when the first similarity score and the second similarity score are below the pre-defined threshold.

8. The method of claim 7, wherein the error is a single-swap error when the first subject from the first time interval is incorrectly matched to a third subject from the second time interval.

9. The method of claim 7, wherein the error is a split error when the first subject from the first time interval is incorrectly matched to a fourth subject from the second time interval and wherein the fourth subject is identified in the second time interval.

10. The method of claim 7, wherein the error is an enter-exit-swap error indicating that the second subject from the second time interval does not match the first subject from the first time interval and the second subject is a new subject who entered the area of real space in the second time interval and was not in the area of real space in the first time interval and the first subject is not present in the second time interval.

11. The method of claim 1, wherein each of the respective first and second reidentification feature vectors represents learned visual features of the first subject and each of the respective third and fourth reidentification vectors represents learned visual features of the second subject.

12. The method of claim 1, wherein the first, the second, the third and the fourth reidentification feature vectors further comprise first, second, third and fourth visual identifiers concatenated with respective first, second, third and fourth learned visual features, and wherein the visual identifiers represent at least a color of hair of the first subject and the second subject and a color of clothing of the first subject and the second subject captured from the first, the second, the third and the fourth images of the respective sequences of images.

13. The method of claim 1, further including:
generating fifth and sixth reidentification feature vectors of a third subject identified from the first time interval by performing operations including:
providing fifth and sixth images of the third subject from the respective first and second sequences of images and as obtained from the first time interval, to the trained machine learning model to produce respective fifth and sixth reidentification feature vectors; and
matching the second subject identified from the second time interval with the first subject and the third subject identified from the first time interval by performing operations including:
calculating (i) a third similarity score between the between the fifth and the third reidentification feature vectors and (ii) a fourth similarity score between the sixth and the fourth reidentification feature vectors; and
re-identifying the second subject identified from the second time interval as the first subject identified from the first time interval when the third similarity score and the fourth similarity score are below the pre-defined threshold and when at least one of the first similarity score and the second similarity score is above the pre-defined threshold.

14. A system including one or more processors coupled to memory, the memory loaded with computer instructions to re-identify a previously identified subject in an area of real space, the instructions, when executed on the processors, implement actions comprising:
receiving, from at least two cameras with overlapping fields of view, respective first and second sequences of images of corresponding fields of view in the area of real space;
generating first and second reidentification feature vectors of a first subject identified from a first time interval by performing operations including:
providing first and second images of the first subject from the respective first and second sequences of images and as obtained from the first time interval, to a trained machine learning model to produce respective first and second reidentification feature vectors; and
matching a second subject identified from a second time interval with the first subject identified from the first time interval by performing operations including:
providing third and fourth images of the second subject, from the respective first and second sequences of images and as obtained from the second time interval, to the trained machine learning model to produce respective third and fourth reidentification feature vectors;
calculating (i) a first similarity score between the first and the third reidentification feature vectors and (ii) a second similarity score between the second and the fourth reidentification feature vectors; and
re-identifying the second subject identified from the second time interval as the first subject identified from the first time interval when at least one of the first similarity score and the second similarity score is above a pre-defined threshold.

15. The system of claim 14, wherein the re-identifying of the second subject identified from the second time interval, further implementing actions comprising:
calculating an average of the first similarity score and the second similarity score and re-identifying the second subject identified from the second time interval as the first subject identified from the first time interval when the average similarity score is above the pre-defined threshold.

16. The system of claim 14, wherein the generating of the first, the second, the third, and the fourth reidentification feature vectors, further implementing actions comprising:
placing first, second, third, and fourth bounding boxes respectively around at least a portion of first, second, third, and fourth poses of the identified subjects, as identified from the first, the second, the third, and the fourth images of the respective sequences of images, to provide first, second, third, and fourth cropped out images as the first, the second, the third, and the fourth images.

17. The system of claim 16, wherein the first pose of the first subject from the first time interval is one of the at least a front pose, a side pose, and a back pose of the first subject from the first time interval.

18. A non-transitory computer readable storage medium impressed with computer program instructions to re-identify a previously identified subject in an area of real space, the instructions, when executed on a processor, implement a method comprising:
receiving, from at least two cameras with overlapping fields of view, respective first and second sequences of images of corresponding fields of view in the area of real space;

generating first and second reidentification feature vectors of a first subject identified from a first time interval by performing operations including:
  providing first and second images of the first subject from the respective first and second sequences of images and as obtained from the first time interval, to a trained machine learning model to produce respective first and second reidentification feature vectors; and
matching a second subject identified from a second time interval with the first subject identified from the first time interval by performing operations including:
  providing third and fourth images of the second subject, from the respective first and second sequences of images and as obtained from the second time interval, to the trained machine learning model to produce respective third and fourth reidentification feature vectors;
  calculating (i) a first similarity score between the first and the third reidentification feature vectors and (ii) a second similarity score between the second and the fourth reidentification feature vectors; and
  re-identifying the second subject identified from the second time interval as the first subject identified from the first time interval when at least one of the first similarity score and the second similarity score is above a pre-defined threshold.

19. The non-transitory computer readable storage medium of claim 18, wherein the first similarity score and the second similarity score are cosine similarity measures respectively between (i) the first and the third reidentification feature vectors and (ii) the second and the fourth reidentification feature vectors.

20. The non-transitory computer readable storage medium of claim 18, implementing the method further comprising:
  generating fifth and sixth reidentification feature vectors of a third subject identified from the first time interval by performing operations including:
    providing fifth and sixth images of the third subject from the respective first and second sequences of images and as obtained from the first time interval, to the trained machine learning model to produce respective fifth and sixth reidentification feature vectors; and
  matching the second subject identified from the second time interval with the first subject and the third subject identified from the first time interval by performing operations including:
    calculating (i) a third similarity score between the between the fifth and the third reidentification feature vectors and (ii) a fourth similarity score between the sixth and the fourth reidentification feature vectors; and
    re-identifying the second subject identified from the second time interval as the first subject identified from the first time interval when the third similarity score and the fourth similarity score are below the pre-defined threshold and when at least one of the first similarity score and the second similarity score is below the pre-defined threshold.

* * * * *